United States Patent [19]

Maeda et al.

[11] Patent Number: 5,721,791
[45] Date of Patent: Feb. 24, 1998

[54] IMAGE INFORMATION CODING APPARATUS

[75] Inventors: Mitsuru Maeda, Yokohama; Tadashi Yoshida, Ichikawa, both of Japan

[73] Assignee: Canon Kabushiki Kaisha, Tokyo, Japan

[21] Appl. No.: 311,597

[22] Filed: Sep. 23, 1994

Related U.S. Application Data

[62] Division of Ser. No. 881,871, May 12, 1992, Pat. No. 5,384,868, which is a division of Ser. No. 849,839, Mar. 12, 1992, Pat. No. 5,157,743, which is a continuation of Ser. No. 261,276, Oct. 24, 1988, abandoned.

[30] Foreign Application Priority Data

| Oct. 28, 1987 | [JP] | Japan | 62-270232 |
| Dec. 3, 1987 | [JP] | Japan | 62-304612 |
| Dec. 3, 1987 | [JP] | Japan | 62-304613 |
| Dec. 14, 1987 | [JP] | Japan | 62-314093 |
| Dec. 14, 1987 | [JP] | Japan | 62-314094 |
| Dec. 14, 1987 | [JP] | Japan | 62-314095 |
| Dec. 26, 1987 | [JP] | Japan | 62-328430 |

[51] Int. Cl.$^6$ .................................................. G06K 9/36
[52] U.S. Cl. ................................... 382/253; 348/405
[58] Field of Search .............................. 382/56, 43, 232, 382/239, 248, 253, 251; 348/414, 403, 405; 358/261.1, 432, 433

[56] References Cited

U.S. PATENT DOCUMENTS

| 4,006,297 | 2/1977 | Koga | 348/415 |
| 4,319,267 | 3/1982 | Mitsuya et al. | 358/75 |
| 4,567,518 | 1/1986 | Driessen | 382/43 |
| 4,727,421 | 2/1988 | Koga | 358/261.1 |
| 4,797,945 | 1/1989 | Suzuki | 382/56 |
| 4,805,030 | 2/1989 | Tanaka | 382/56 |
| 4,807,053 | 2/1989 | Heijnemans | 358/335 |
| 4,817,182 | 3/1989 | Adelson et al. | 382/56 |
| 4,908,862 | 3/1990 | Kaneko et al. | 380/28 |
| 4,918,541 | 4/1990 | Ishida et al. | 358/433 |

FOREIGN PATENT DOCUMENTS 62-191979  8/1987  Japan.

OTHER PUBLICATIONS

"Adaptive Coding In Transform Domain Using Vector Quantization And Scalar Correction", by G. Tu, et al., IEEE 1987, pp. 418–422.
The Journal Of The Institute Of Television Engineers Of Japan, vol. 39, No. 10, Oct. 1985, pp. 920–925.
Pratt, "Spatial Transform Coding Of Color Images", IEEE Trans. On Comm., vol. COM–19, No. 6, Dec. 1971, p. 980.
Pratt, "Slant Transform Image Coding", IEEE Trans. on Comm., vol. COM–22, No. 8, Aug. 1974, p. 1075.
Omachi, et al., "DCT–VQ Coding Scheme With Adaptive Bond Partition", Inst.Elec.Info.And Comm.Eng., National Convention Record 1987, p. 1131.

*Primary Examiner*—Yon J. Couso
*Attorney, Agent, or Firm*—Fitzpatrick, Cella, Harper & Scinto

[57] ABSTRACT

An image information coding apparatus includes a cut-out or extracting unit for cutting out image information into blocks each having a predetermined size, e.g., 4×4 pixels, a preprocessing unit such as an orthogonal transformation unit (e.g., a Hadamard transformation unit) and a scalar quantization unit for performing predetermined preprocessing of the block as a matrix, a separator for separating a plurality of components (e.g., phase information, amplitude information, and zero information) from each element of the preprocessed matrix, information quantizers for coding individual pieces of information constituted by each component, and a synthesizer for synthesizing coding results.

10 Claims, 53 Drawing Sheets

| $x_{11}$ | $x_{12}$ | $x_{13}$ | $x_{14}$ |
|---|---|---|---|
| $x_{21}$ | $x_{22}$ | $x_{23}$ | $x_{24}$ |
| $x_{31}$ | $x_{32}$ | $x_{33}$ | $x_{34}$ |
| $x_{41}$ | $x_{42}$ | $x_{43}$ | $x_{44}$ |

| $y_{11}$ | $y_{12}$ | $y_{13}$ | $y_{14}$ |
|---|---|---|---|
| $y_{21}$ | $y_{22}$ | $y_{23}$ | $y_{24}$ |
| $y_{31}$ | $y_{32}$ | $y_{33}$ | $y_{34}$ |
| $y_{41}$ | $y_{42}$ | $y_{43}$ | $y_{44}$ |

|  | $p_{12}$ | $p_{13}$ | $p_{14}$ |
|---|---|---|---|
| $p_{21}$ | $p_{22}$ | $p_{23}$ | $p_{24}$ |
| $p_{31}$ | $p_{32}$ | $p_{33}$ | $p_{34}$ |
| $p_{41}$ | $p_{42}$ | $p_{43}$ | $p_{44}$ |

| $a_{11}$ | $a_{12}$ | $a_{13}$ | $a_{14}$ |
|---|---|---|---|
| $a_{21}$ | $a_{22}$ | $a_{23}$ | $a_{24}$ |
| $a_{31}$ | $a_{32}$ | $a_{33}$ | $a_{34}$ |
| $a_{41}$ | $a_{42}$ | $a_{43}$ | $a_{44}$ |

|  | $z_{12}$ | $z_{13}$ | $z_{14}$ |
|---|---|---|---|
| $z_{21}$ | $z_{22}$ | $z_{23}$ | $z_{24}$ |
| $z_{31}$ | $z_{32}$ | $z_{33}$ | $z_{34}$ |
| $z_{41}$ | $z_{42}$ | $z_{43}$ | $z_{44}$ |

FIG. 6A $P_{P(k)}$

|   | − | − | + |
|---|---|---|---|
| − | + | − | − |
| − | + | − | + |
| + | + | − | − |

|   | − | − | + |
|---|---|---|---|
| − | + | 0 | 0 |
| − | 0 | 0 | 0 |
| 0 | 0 | 0 | 0 |

FIG. 6C $P_1$

|   | − | − | + |
|---|---|---|---|
| 0 | + | 0 | 0 |
| 0 | + | 0 | 0 |
| + | + | − | − |

FIG. 6D $P_2$

|   | − | − | 0 |
|---|---|---|---|
| − | + | 0 | 0 |
| − | 0 | 0 | 0 |
| 0 | 0 | 0 | − |

FIG. 7A $\mathbb{P}_{A(\ell)}$

|   | 4 | 2 | 2 |
|---|---|---|---|
| 4 | 1 | 1 | 1 |
| 1 | 1 | 1 | 1 |
| 1 | 1 | 1 | 1 |

|   | 4 | 2 | 3 |
|---|---|---|---|
| 4 | 1 | 0 | 0 |
| 2 | 0 | 0 | 0 |
| 0 | 0 | 0 | 0 |

FIG. 7C $A_1$

|   | 4 | 2 | 2 |
|---|---|---|---|
| 4 | 2 | 0 | 0 |
| 1 | 0 | 0 | 0 |
| 0 | 0 | 0 | 1 |

FIG. 7D $A_2$

|   | 4 | 1 | 2 |
|---|---|---|---|
| 4 | 1 | 1 | 0 |
| 1 | 0 | 0 | 0 |
| 1 | 1 | 0 | 1 |

FIG.8A $\mathbb{P}_{Z(h)}$

|  | * | * | 0 |
|---|---|---|---|
| * | * | 0 | 0 |
| 0 | 0 | 0 | 0 |
| 0 | 0 | 0 | 0 |

FIG.8B $Z$

|  | * | * | * |
|---|---|---|---|
| * | * | 0 | 0 |
| * | 0 | 0 | 0 |
| 0 | 0 | 0 | 0 |

FIG.8C $Z_1$

|  | * | * | 0 |
|---|---|---|---|
| * | * | * | 0 |
| * | 0 | 0 | 0 |
| 0 | 0 | 0 | 0 |

FIG.8D $Z_2$

|  | * | * | 0 |
|---|---|---|---|
| * | * | 0 | 0 |
| 0 | 0 | 0 | 0 |
| 0 | 0 | 0 | * |

| $C_{BW}$ | AVERAGE IN BLOCK $a_{11}$ | PHASE INFORMATION PATTERN CODE k | AMPLITUDE INFORMATION PATTERN CODE $\ell$ | 0 INFORMATION PATTERN CODE h |

FIG. 9

| $C'_{BW}$ | AVERAGE IN BLOCK $a_{11}$ | PHASE INFORMATION PATTERN CODE k | AMPLITUDE INFORMATION PATTERN CODE $\ell$ |

FIG. 13

| $C_C$ | AVERAGE OF LUMINANCE Y INFORMATION IN BLOCK $a_{11}$ | PHASE INFORMATION PATTERN CODE OF LUMINANCE Y INFORMATION k | AMPLITUDE INFORMATION PATTERN CODE OF LUMINANCE Y INFORMATION $\ell$ | ZERO INFORMATION PATTERN CODE OF LUMINANCE Y INFORMATION h | AVERAGE OF COLOR DIFFERENCE I INFORMATION IN BLOCK | AVERAGE OF COLOR DIFFERENCE Q INFORMATION IN BLOCK |

FIG. 15

| $C'_C$ | AVERAGE OF LUMINANCE Y INFORMATION IN BLOCK $a_{11}$ | PHASE INFORMATION PATTERN CODE OF LUMINANCE Y INFORMATION k | AMPLITUDE INFORMATION PATTERN CODE OF LUMINANCE Y INFORMATION $\ell$ | AVERAGE OF COLOR DIFFERENCE I INFORMATION IN BLOCK | AVERAGE OF COLOR DIFFERENCE Q INFORMATION IN BLOCK |

FIG. 17

| $C''_C$ | AVERAGE OF LUMINANCE Y INFORMATION IN BLOCK $a_{11}$ | INTEGRATION RESULT CODE | AVERAGE OF COLOR DIFFERENCE I INFORMATION IN BLOCK | AVERAGE OF COLOR DIFFERENCE Q INFORMATION IN BLOCK |

⇑ ⇑ SEPARATION

Ys:
| 3 | 0 | 0 | 0 |
|---|---|---|---|
| -2 | 0 | 0 | 0 |
| -4 | 1 | 0 | 0 |
| 129 | -4 | -2 | 0 |

⇑

Y:
| 57 | 13 | -3 | -3 |
|---|---|---|---|
| -55 | -15 | -11 | 17 |
| -99 | 17 | 17 | 1 |
| 517 | -59 | -31 | 5 |

⇑

X:
| 156 | 184 | 188 | 200 |
|---|---|---|---|
| 92 | 108 | 132 | 172 |
| 92 | 96 | 116 | 112 |
| 92 | 96 | 104 | 128 |

FIG. 21A
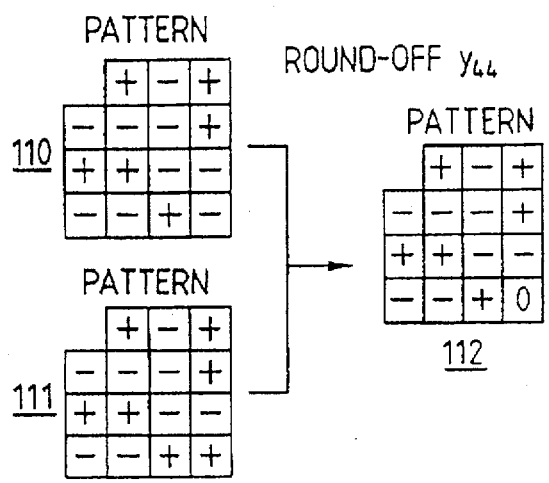
FIG. 21B
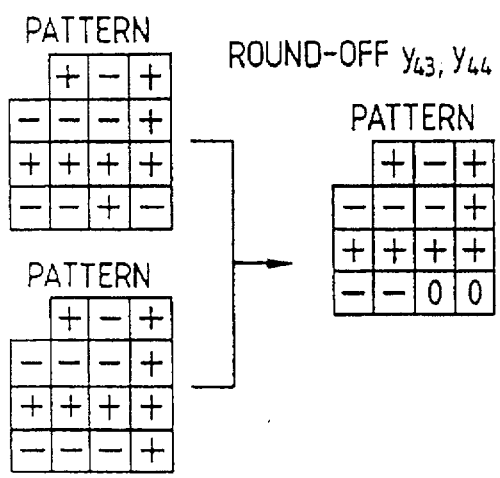
FIG. 21C
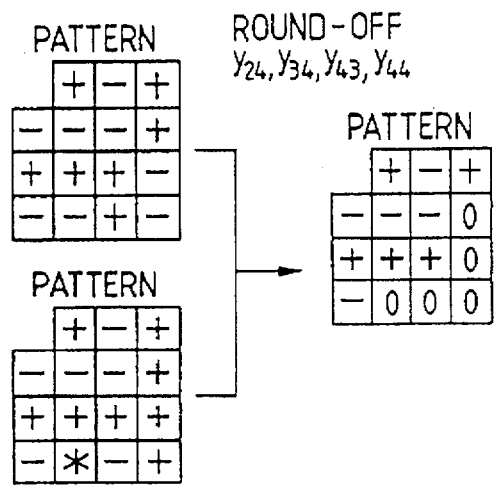
FIG. 21D

| LIGHTNESS MEAN $y_{11}$ | CATEGORY CODE | PATTERN CODE |

| LIGHTNESS MEAN m | VARIANCE IN BLOCK $\sigma$ | CATEGORY CODE | PATTERN CODE |

FIG. 29A

| 2 | 1 | 0 | -1 |
|---|---|---|----|
| 1 | 0 | -1 | -2 |
| 0 | 0 | -1 | -2 |
| 0 | -1 | -2 | -2 |

FIG. 29B

| 0 | 0 | 1 | 2 |
|---|---|---|---|
| -1 | 0 | 0 | 1 |
| -2 | -1 | -1 | 0 |
| -2 | -2 | -2 | -1 |

FIG. 29C

| -2 | -2 | -1 | 0 |
|----|----|----|---|
| -2 | -1 | 0 | 0 |
| -2 | -1 | 0 | 1 |
| -1 | 0 | 1 | 2 |

FIG. 29D

| -1 | -2 | -2 | -2 |
|----|----|----|----|
| 0 | -1 | -1 | -2 |
| 1 | 0 | 0 | -1 |
| 2 | 1 | 0 | 0 |

FIG. 29E

| 2 | 1 | 0 | 0 |
|---|---|---|---|
| 1 | 0 | 0 | -1 |
| 0 | -1 | -1 | -2 |
| -1 | -2 | -2 | -2 |

FIG. 29F

| 0 | -1 | -2 | -2 |
|---|----|----|----|
| 0 | 0 | -1 | -2 |
| 1 | 0 | -1 | -2 |
| 2 | 1 | 0 | -1 |

FIG. 29G

| -2 | -2 | -2 | -1 |
|----|----|----|----|
| -2 | -1 | -1 | 0 |
| -1 | 0 | 0 | 1 |
| 0 | 0 | 1 | 2 |

FIG. 29H

| -1 | 0 | 1 | 2 |
|----|---|---|---|
| -2 | -1 | 0 | 1 |
| -2 | -1 | 0 | 0 |
| -2 | -2 | -1 | 0 |

FIG. 30A, FIG. 30B, FIG. 30C, FIG. 30D, FIG. 30E, FIG. 30F, FIG. 30G, FIG. 30H, FIG. 30I, FIG. 30J, FIG. 30K

| $X_1$ | $X_2$ | $X_3$ | $X_4$ |
|---|---|---|---|
| $X_5$ | $X_6$ | $X_7$ | $X_8$ |
| $X_9$ | $X_{10}$ | $X_{11}$ | $X_{12}$ |
| $X_{13}$ | $X_{14}$ | $X_{15}$ | $X_{16}$ |

| $Y_{11}$ | $Y_{12}$ | $Y_{13}$ | $Y_{14}$ |
|---|---|---|---|
| $Y_{21}$ | $Y_{22}$ | $Y_{23}$ | $Y_{24}$ |
| $Y_{31}$ | $Y_{32}$ | $Y_{33}$ | $Y_{34}$ |
| $Y_{41}$ | $Y_{42}$ | $Y_{43}$ | $Y_{44}$ |

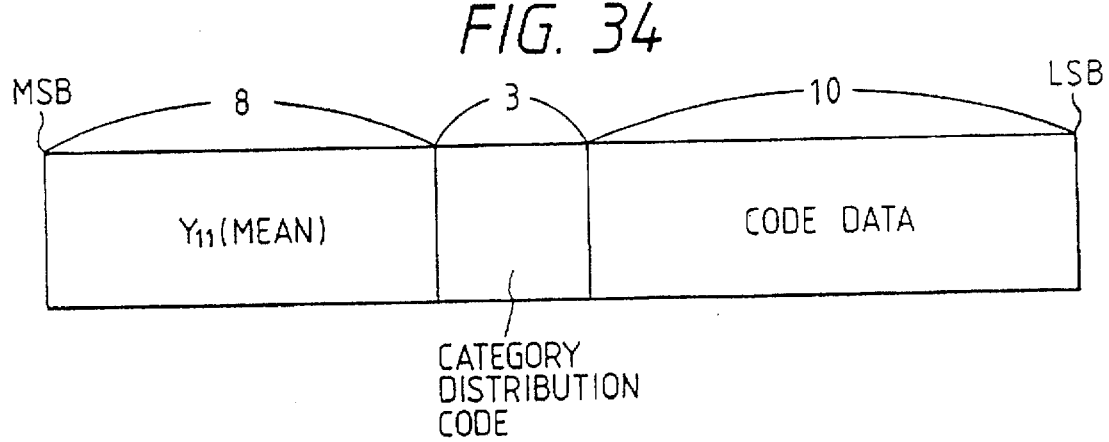

FLAT (3, 0)

DOT FLAT (3, 5)

WEAK EDGE V.

(3, 5)

WEAK EDGE SLANT (3, 6)

WEAK EDGE H (3, 5)

STRONG EDGE V.

(4, 6)

STRONG EDGE SLANT (3, 6)

STRONG EDGE H.

(4, 6)

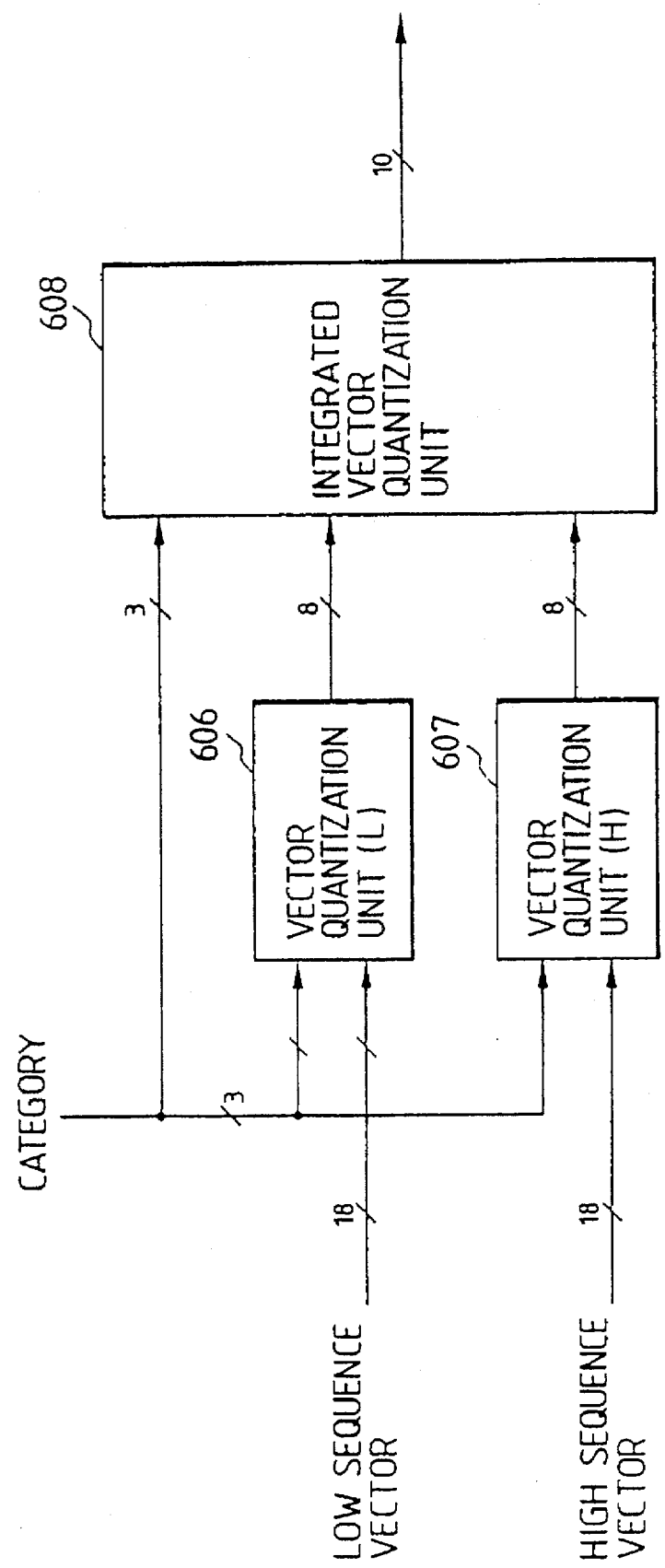

| $Y_{11}$ | $Y_{12}$ | $Y_{13}$ | $Y_{14}$ |
|---|---|---|---|
| $Y_{21}$ | $Y_{22}$ | $Y_{23}$ | $Y_{24}$ |
| $Y_{31}$ | $Y_{32}$ | $Y_{33}$ | $Y_{34}$ |
| $Y_{41}$ | $Y_{42}$ | $Y_{43}$ | $Y_{44}$ |

FIG. 43
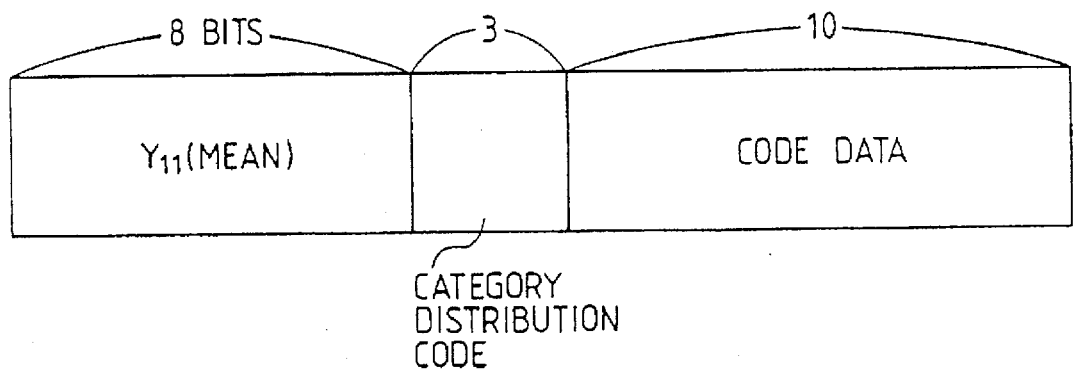
FIG. 44
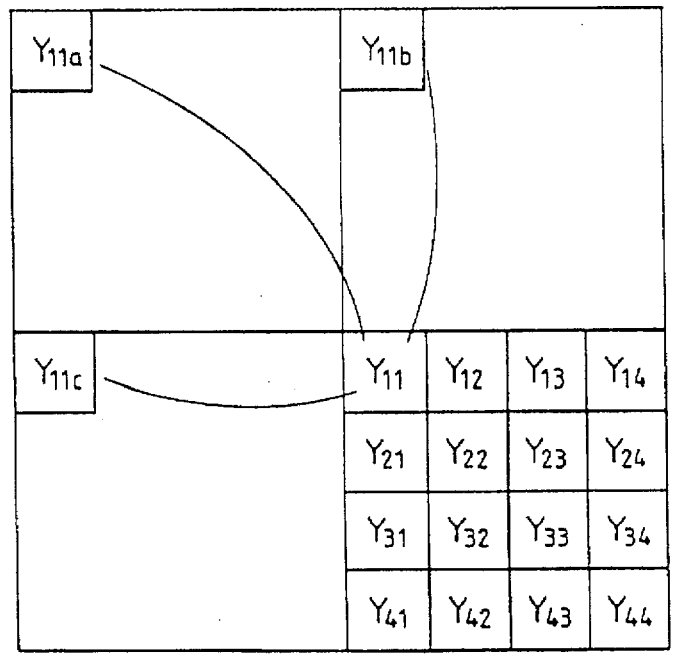
FIG. 45

|  | $E_D \leq T_1$ | $T_1 < E_D \leq T_2$ | $E_D > T_2$ |
|---|---|---|---|
| $Y_{DET} \leq T$ | FLAT ① | DOT FLAT ③ | STRONG EDGE IN BLOCK ⑤ |
| $Y_{DET} > T$ | FLAT IN BLOCK ② | WEAK EDGE ④ | STRONG EDGE ⑥ |

HADAMARD TRANSFORMATION $VEE = |Y_{12}| + |Y_{13}|$ $VLE = |Y_{14}| + |Y_{24}|$ $HEE = |Y_{21}| + |Y_{31}|$ $HLE = |Y_{41}| + |Y_{42}|$ $OTH = |Y_{22}| + |Y_{33}| + |Y_{44}|$ $EF = |VEE - HEE|$ $LF = |VLE - HLE|$

FIG. 49A

| X | | | | | Y | | | |
|---|---|---|---|---|---|---|---|---|
| 0 | 0 | 255 | 255 | → | 510 | -510 | 0 | 0 |
| 0 | 0 | 255 | 255 | | 0 | 0 | 0 | 0 |
| 0 | 0 | 255 | 255 | | 0 | 0 | 0 | 0 |
| 0 | 0 | 255 | 255 | | 0 | 0 | 0 | 0 |

FIG. 49B

| X | | | | | Y | | | |
|---|---|---|---|---|---|---|---|---|
| 255 | 255 | 255 | 255 | → | 510 | 0 | 0 | 0 |
| 255 | 255 | 255 | 255 | | 510 | 0 | 0 | 0 |
| 0 | 0 | 0 | 0 | | 0 | 0 | 0 | 0 |
| 0 | 0 | 0 | 0 | | 0 | 0 | 0 | 0 |

FIG. 49C

| X | | | | | Y | | | |
|---|---|---|---|---|---|---|---|---|
| 0 | 255 | 255 | 0 | → | 510 | 0 | 0 | -510 |
| 0 | 255 | 255 | 0 | | 0 | 0 | 0 | 0 |
| 0 | 255 | 255 | 0 | | 0 | 0 | 0 | 0 |
| 0 | 255 | 255 | 0 | | 0 | 0 | 0 | 0 |

FIG. 49D

| X | | | | | Y | | | |
|---|---|---|---|---|---|---|---|---|
| 0 | 0 | 0 | 0 | → | 510 | 0 | 0 | 0 |
| 255 | 255 | 255 | 255 | | 0 | 0 | 0 | 0 |
| 255 | 255 | 255 | 255 | | 0 | 0 | 0 | 0 |
| 0 | 0 | 0 | 0 | | -510 | 0 | 0 | 0 |

| X | | | | | Y | | | |
|---|---|---|---|---|---|---|---|---|
| 255 | 255 | 255 | 255 |  | 765 | 255 | 0 | 0 |
| 255 | 255 | 0 | 0 | | 255 | -255 | 0 | 0 |
| 255 | 255 | 0 | 0 | | 0 | 0 | 0 | 0 |
| 255 | 255 | 0 | 0 | | 0 | 0 | 0 | 0 |

| X | | | | | Y | | | |
|---|---|---|---|---|---|---|---|---|
| 255 | 255 | 255 | 255 |  | 765 | -255 | 0 | 0 |
| 0 | 0 | 255 | 255 | | 255 | 255 | 0 | 0 |
| 0 | 0 | 255 | 255 | | 0 | 0 | 0 | 0 |
| 0 | 0 | 255 | 255 | | 0 | 0 | 0 | 0 |

| X | | | | | Y | | | |
|---|---|---|---|---|---|---|---|---|
| 255 | 255 | 255 | 255 |  | 637 | 255 | -127 | 0 |
| 0 | 255 | 255 | 255 | | 255 | 127 | 0 | -127 |
| 0 | 0 | 255 | 255 | | 127 | 0 | 127 | 0 |
| 0 | 0 | 0 | 255 | | 0 | 127 | 0 | 127 |

| X | | | | | Y | | | |
|---|---|---|---|---|---|---|---|---|
| 255 | 255 | 255 | 255 |  | 637 | 255 | 127 | 0 |
| 255 | 255 | 255 | 0 | | 255 | -127 | 0 | -127 |
| 255 | 255 | 0 | 0 | | 127 | 0 | -127 | 0 |
| 255 | 0 | 0 | 0 | | 0 | -127 | 0 | 127 |

FIG. 49M

| X | | | | | Y | | | |
|---|---|---|---|---|---|---|---|---|
| 255 | 255 | 255 | 0 | → | 637 | 0 | 0 | -127 |
| 0 | 255 | 255 | 255 | | 0 | 382 | 127 | 0 |
| 0 | 0 | 255 | 255 | | 0 | 127 | -127 | 0 |
| 0 | 0 | 0 | 255 | | -127 | 0 | 0 | 127 |

FIG. 49N

| X | | | | | Y | | | |
|---|---|---|---|---|---|---|---|---|
| 0 | 255 | 255 | 255 | → | 637 | 0 | 0 | 127 |
| 255 | 255 | 255 | 0 | | 0 | -382 | -127 | 0 |
| 255 | 255 | 0 | 0 | | 0 | -127 | 127 | 0 |
| 255 | 0 | 0 | 0 | | 127 | 0 | 0 | -127 |

FIG. 49O

| X | | | | | Y | | | |
|---|---|---|---|---|---|---|---|---|
| 0 | 0 | 255 | 255 | → | 382 | 0 | 0 | 127 |
| 0 | 0 | 0 | 255 | | 0 | -382 | -127 | 0 |
| 255 | 0 | 0 | 0 | | 0 | -127 | 0 | 0 |
| 255 | 255 | 0 | 0 | | 127 | 0 | 0 | 127 |

FIG. 49P

| X | | | | | Y | | | |
|---|---|---|---|---|---|---|---|---|
| 255 | 255 | 0 | 0 | → | 382 | 0 | 0 | 127 |
| 255 | 0 | 0 | 0 | | 0 | 382 | 127 | 0 |
| 0 | 0 | 0 | 255 | | 0 | 127 | -127 | 0 |
| 0 | 0 | 255 | 255 | | 127 | 0 | 0 | -127 |

FIG. 54A
CATEGORY 20
19 bit

|   | 2 | 1 | 2 |
|---|---|---|---|
| 2 | 1 | 2 | 1 |
| 1 | 2 |   |   |
| 2 | 1 |   | 1 |

FIG. 54B
CATEGORY 21
16 bit

|   | 1 | 1 | 1 |
|---|---|---|---|
| 1 | 3 | 1 | 1 |
| 1 | 1 |   |   |
| 1 | 1 |   | 3 |

FIG. 54C
CATEGORY 22
17 bit

|   | 2 | 1 | 2 |
|---|---|---|---|
| 2 | 2 |   | 1 |
| 1 | 1 |   |   |
| 2 | 2 |   | 1 |

FIG. 54D
CATEGORY 23
15 bit

|   | 2 | 1 | 2 |
|---|---|---|---|
| 1 | 1 | 1 | 2 |
| 1 |   |   |   |
| 2 | 1 |   | 1 |

FIG. 54E
CATEGORY 24
18 bit

|   | 2 | 1 | 1 |
|---|---|---|---|
| 3 | 2 |   | 1 |
| 2 | 2 |   |   |
| 2 | 1 |   | 1 |

FIG. 54F
CATEGORY 25
17 bit

|   | 2 | 2 | 2 |
|---|---|---|---|
| 2 | 2 | 2 | 1 |
| 1 |   |   |   |
| 1 | 1 |   | 1 |

FIG. 54G
CATEGORY 30
19 bit

|     | 4 | 2 | 1 |
|-----|---|---|---|
| 4   | 1 |   | 2 |
| 2   |   |   |   |
| 2   | 1 |   |   |

FIG. 54H
CATEGORY 31
18 bit

|     | 4 | 1 | 2 |
|-----|---|---|---|
| 4   |   |   | 2 |
| 1   |   |   |   |
| 2   | 2 |   |   |

FIG. 54I
CATEGORY 32
12 bit

|     | 3 | 1 |   |
|-----|---|---|---|
| 3   |   |   |   |
| 2   |   |   |   |
| 2   | 1 |   |   |

FIG. 54J
CATEGORY 33
12 bit

|     | 3 | 2 | 2 |
|-----|---|---|---|
| 3   |   |   | 1 |
| 1   |   |   |   |
|     |   |   |   |

FIG. 54K
CATEGORY 40
15 bit

|     | 3 |   |   |
|-----|---|---|---|
| 4   | 2 |   |   |
| 2   |   |   |   |
| 2   | 2 |   |   |

FIG. 54L
CATEGORY 41
16 bit

|     | 4 | 3 | 2 |
|-----|---|---|---|
| 3   | 2 |   | 2 |
|     |   |   |   |
|     |   |   |   |

FIG. 54M
CATEGORY 50
17 bit

FIG. 54N
CATEGORY 51
17 bit

FIG. 54O
CATEGORY 52
19 bit

FIG. 54P
CATEGORY 53
19 bit

| P₁ | P₂ | P₃ | P₄ |
|----|----|----|----|
| P₅ | P₆ | P₇ | P₈ |
| P₉ | P₁₀ | P₁₁ | P₁₂ |
| P₁₃ | P₁₄ | P₁₅ | P₁₆ |

HADAMARD TRANSFORMATION

FIG. 59B

| Y₁₁ | Y₁₂ | Y₁₃ | Y₁₄ |
|-----|-----|-----|-----|
| Y₂₁ | Y₂₂ | Y₂₃ | Y₂₄ |
| Y₃₁ | Y₃₂ | Y₃₃ | Y₃₄ |
| Y₄₁ | Y₄₂ | Y₄₃ | Y₄₄ |

FIG. 60
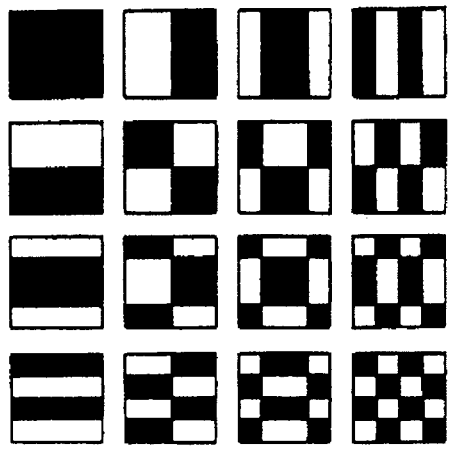
FIG. 61
| $Y_{11}$ | $Y_{12}$ | $Y_{13}$ | $Y_{14}$ |
| --- | --- | --- | --- |
| $Y_{21}$ | $Y_{22}$ | $Y_{23}$ | $Y_{24}$ |
| $Y_{31}$ | $Y_{32}$ | $Y_{33}$ | $Y_{34}$ |
| $Y_{41}$ | $Y_{42}$ | $Y_{43}$ | $Y_{44}$ |
FIG. 62
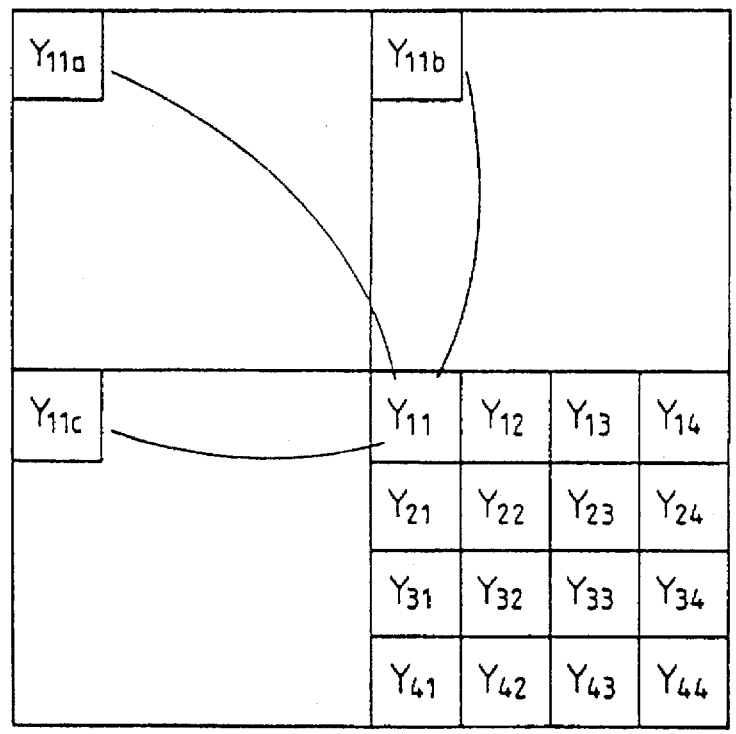

|  | $E_D < T_1$ | $T_1 < E_D \leq T_2$ | $E_D > T_2$ |
|---|---|---|---|
| $Y_{DEF} \leq T$ | FLAT ① | DOT FLAT ③ | STRONG EDGE IN BLOCK ⑤ |
| $Y_{DEF} > T$ | FLAT IN BLOCK ② | WEAK EDGE ④ | STRONG EDGE ⑥ |

IMAGE INFORMATION CODING APPARATUS

This application is a division of application Ser. No. 07/881,871, filed May 12, 1992, now U.S. Pat. No. 5,384, 868, which is a division of application Ser. No. 07/849,839, filed Mar. 12, 1992, now U.S. Pat. No. 5,157,743, issued Oct. 20, 1992, which is a continuation of application Ser. No. 07/261,276, filed Oct. 24, 1988, now abandoned.

BACKGROUND OF THE INVENTION

1. Field of the Invention

The present invention relates to an image information coding apparatus for compressing and coding halftone image information.

2. Related Background Art

According to a typical conventional image transmission and storage technique, information is coded to improve transmission and storage efficiency so as to suppress redundancy (generally called compression).

Along with recent developments of digital image processing techniques and device techniques, an image subjected to transmission and storage is converted from binary data to multivalue data. The type of image also tends to be changed from a monochromatic image to a full-color image. In addition, the resolution of the image to be transmitted and stored has been increasing. As a result, the number of data to be transmitted and stored is increased, and highly efficient coding techniques are required.

However, most of the conventional coding schemes are proposed for binary images, as represented by MH, MR, and MMR schemes used for facsimile communication.

These coding schemes are not essentially suitable for coding of multivalue images. Several coding schemes for multivalue images are available, such as block coding, predictive coding, and orthogonal transformation coding. However, these coding schemes are used especially for television images and are not suitable for coding of general documents, photographs, and graphic images. In particular, in orthogonal transformation coding, pixel blocks of an image are simply orthogonally transformed to obtain quantized scalar values. Therefore, redundancy of the image cannot be satisfactorily suppressed.

In order to further improve coding efficiency, vector quantization is proposed as a coding scheme which is close to maximum coding efficiency in principle. A so-called code book is required in vector quantization. The number of input patterns to be vector-quantized is dramatically increased. It is difficult to perform vector quantization by using a conventional code book generation method.

Vector quantization poses the following problems.

The first problem is a way of calculating optimum reproduction vectors of an image. In conventional vector quantization, various images having different frequencies are used to perform a training sequence, thereby calculating reproduction vectors. Reproduction vectors having minimum distortion are found for an input image, thereby coding the input image. A vector quantization algorithm called an LBG scheme is generally used to obtain optimum solutions of the reproduction vectors. However, when vector quantization of various image data having different frequencies are performed by the LBG method, reproduction vectors for image data which frequently appear in the training sequence are obtained as the optimum solutions of vector quantization. Therefore, when an image is vector-quantized by this method, a characteristic image portion having a low generation frequency is typically degraded, resulting in poor appearance.

The second problem is bulky hardware when vector quantization is realized by hardware. That is, in order to perform vector quantization in units of blocks, a large look-up table (LUT) for receiving all image data within each block and outputting codes of corresponding reproduction vectors is required. For this reason, a block size for vector quantization is limited. When the block size is small, a correlation between the images cannot be conveniently utilized, and therefore a compression ratio is undesirably kept low.

SUMMARY OF THE INVENTION

It is an object of the present invention to provide an image information coding apparatus capable of eliminating the conventional drawbacks described above and improving coding efficiency without causing typical degradation of multivalue data of an image.

It is another object of the present invention to provide an image information coding apparatus capable of maintaining characteristic features of image blocks and performing efficient vector coding.

It is still another object of the present invention to provide an image information coding apparatus capable of efficiently coding image data representing a halftone image.

It is still another object of the present invention to provide an image information coding apparatus capable of efficiently coding image data representing a color image.

The above and other objects, features, and advantages of the present invention will be apparent from the following detailed description in conjunction with the accompanying drawings.

BRIEF DESCRIPTION OF THE DRAWINGS

FIG. 3A is a matrix showing a data format used in the above embodiments;

FIG. 3B is a matrix showing a format of data which is preprocessed by orthogonal transformation or the like;

FIGS. 4A to 4C are matrices showing data formats of components extracted from the preprocessed data, respectively;

FIGS. 6, 7, and 8 are mapping matrices of vector quantization so as to explain each embodiment described above;

FIG. 9 is a format of data coded by the first embodiment;

FIG. 10 is a flow of decoding according to the first embodiment;

FIG. 12 is a flow of changes when the respective components are extracted from the initial data according to the second embodiment;

FIG. 13 is a format of data coded by the second embodiment;

FIG. 15 is a format of data coded by the third embodiment;

FIG. 17 is a format of data coded by the fourth embodiment;

FIG. 18 is a format of data coded by a fifth embodiment;

FIGS. 20 and 21A to 21D are views for explaining code book generation procedures;

FIGS. 29A to 29H and 30A to 30K are views for explaining a second method of generating a code book;

FIG. 34 shows a structure of block code data of the eighth embodiment;

FIG. 35A is a matrix for explaining a category distribution method of the eighth embodiment;

FIGS. 35A to 35C are matrices for explaining distribution methods for weak and strong edge portions, respectively;

FIG. 37 is a block diagram showing a vector quantizing means of the eighth embodiment;

FIG. 43 is a format of coded data of 4×4 pixels;

FIG. 44 is a matrix showing a method of defining an edge amount;

FIG. 45 is a matrix for determining the presence/absence of an edge;

FIGS. 54A to 54P are views showing results of scalar quantization;

FIG. 58 is a matrix showing a division of an input image into 4×4 blocks of the eleventh embodiment;

FIGS. 59A and 59B are views for explaining the principle of Hadamard transformation according to the eleventh embodiment;

FIG. 60 is a view showing sequence components of the eleventh embodiment;

FIG. 61 is a matrix for explaining definition of an edge amount of the eleventh embodiment;

FIG. 62 is a matrix for explaining comparison of mean values between blocks of the eleventh embodiment;

DESCRIPTION OF THE PREFERRED EMBODIMENTS

Preferred embodiments of the present invention will be described with reference to the accompanying drawings. An order of a description is given as follows:

I: Vector Quantization

II: Hadamard Transformation

III: First Embodiment of Coding

IV: Second Embodiment of Coding

V: Third Embodiment of Coding

VI: Fourth Embodiment of Coding

VII: Fifth Embodiment of Coding

VIII: First Method of Generating Code Book

IX: Sixth Embodiment of Coding

X: Second Method of Generating Code Book (Vector Quantization)

In image coding of this embodiment, multivalue image information is cut or divided into blocks each having m×n pixels. Preprocessing (Hadamard transformation and block coding in this embodiment) of each block is performed. The preprocessed results are vector-quantized to determine mapping vectors for vector quantization of image coding. Common vector quantization is performed in all embodiments to be described below.

Vector quantization is essentially an excellent coding method and can greatly improve quantization distortion or errors as compared with scalar quantization.

Figure 2:
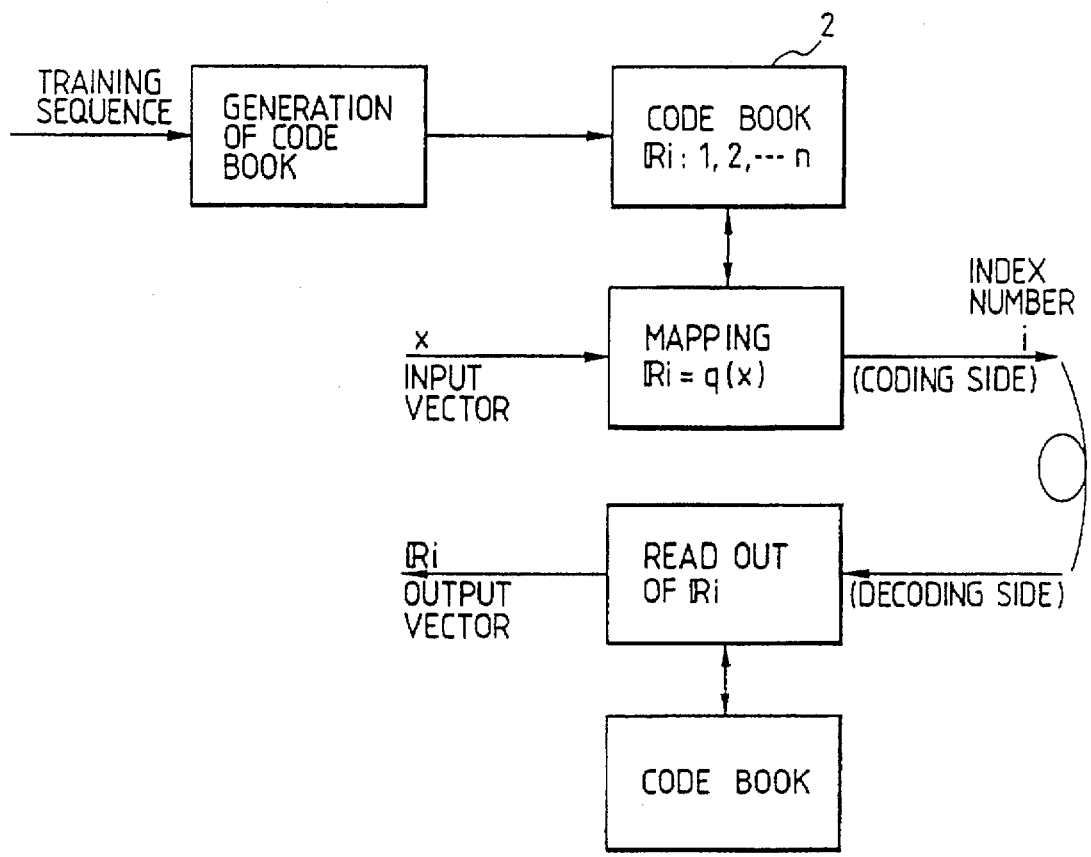
FIG. 2 is a functional block diagram for explaining the principle of vector quantization.

The principle of vector quantization will be briefly described with reference to FIG. 2. Input signals are grouped into blocks in units of K signals, and each block is represented by a K-dimensional vector X. Therefore, vector quantization can be defined as mapping of the vector X into a set of N vectors prepared beforehand. These N vectors are called output vectors, and their set is called a code book (or an output vector set). FIG. 2 shows the basic functional block of vector quantization.

K samples of the input signal train are formatted into a block which is then defined as an input vector as follows:

$$X = (x_1, x_2, x_3, \ldots x_k)$$

The set of these vectors constitutes a K-dimensional Euclidean signal space $R_k$. This space $R_k$ is divided into n partial spaces $P_i$ by a predetermined algorithm (training) beforehand. Vectors constituting the space $P_i$ are known. This partial space is used as a constituting vector and selects a representative vector $RR_i$ of the partial space $R_i$. If $$X \in R_i$$

then its index (index number) i represents the input vector X. By transmitting or storing the index numbers i, compression/coding can be performed. On the decoding side, the following K-dimensional vector $$R_i = (r_1, r_2, r_3, \ldots r_k)$$

stored at the same ith address of the code book on the coding side is output as a reproduction vector of the input vector X. Therefore $$X \rightarrow R_i$$

Such mapping Q $$Q: R_i = q(X)$$

is called vector quantization.

This mapping is performed to minimize mapping distortion when X is mapped onto $R_i$. That is, the code book is generated to minimize the mean distortion in accordance with a predetermined training sequence.

Vector quantization is a technique for quantizing the input signal in units of blocks. The actual data compression ratio can become close to a theoretical data compression limit by increasing the number of dimensions, i.e., the size of the block. In addition, since quantization errors can be random, reproduction quality having a relatively high S/N ratio can be obtained for an image signal.

(Hadamard Transformation)

Hadamard transformation used in the embodiments of the present invention will be described below. This Hadamard transformation is one form of an orthogonal transformation. Such an orthogonal transformation is suitable as preprocessing of vector quantization.

Assume that an image to be coded is given as a monochromatic multivalue image, and that each pixel is represented by 8-bit data. The Hadamard transformation is performed for, e.g., a block having 4×4 pixels, as shown in FIG. 3A. Reference symbol $x_{ij}$ (i=1, ..., 4 and j=1, ..., 4) represents a pixel of an image. When the pixel $x_{ij}$ is represented by using a matrix X, $$X = [X_{11}, X_{12}, X_{13}, X_{14}, X_{21}, X_{22}, X_{23}, X_{24}, X_{31}, X_{32}, X_{33}, X_{34}, X_{41}, X_{42}, X_{43}, X_{44}]^T \quad (1)$$

where T is the transposed matrix. The results obtained by Hadamard-transforming the matrix X are transformed values $y_{ij}$ (i=1, ..., 4 and j=1, ..., 4) shown in FIG. 3B. A matrix Y represented by $y_{ij}$ is given as follows:

$$Y = [y_{11}, y_{12}, y_{13}, y_{14}, y_{21}, y_{22}, y_{23}, y_{24}, y_{31}, y_{32}, y_{33}, y_{34}, y_{41}, y_{42}, y_{43}, y_{44}]^T \quad (2)$$

A transformation from the matrix X to the matrix Y can be represented by equation (3) below:

$$Y = (1/16)^{1/2} \cdot H_{16} \cdot X \quad (3)$$

where $H_{16}$ is a 16-dimensional Hadamard matrix and can be represented as follows:

$$H_{16} = \begin{vmatrix}
1 & 1 & 1 & 1 & 1 & 1 & 1 & 1 & 1 & 1 & 1 & 1 & 1 & 1 & 1 & 1 \\
1 & -1 & -1 & 1 & 1 & -1 & -1 & 1 & 1 & -1 & -1 & 1 & 1 & -1 & -1 & 1 \\
1 & -1 & -1 & 1 & 1 & -1 & -1 & 1 & 1 & -1 & -1 & 1 & 1 & -1 & -1 & 1 \\
1 & -1 & 1 & -1 & 1 & -1 & 1 & -1 & 1 & -1 & 1 & -1 & 1 & -1 & 1 & -1 \\
1 & 1 & 1 & 1 & 1 & 1 & 1 & 1 & -1 & -1 & -1 & -1 & -1 & -1 & -1 & -1 \\
1 & 1 & -1 & -1 & 1 & 1 & -1 & -1 & -1 & -1 & 1 & 1 & -1 & -1 & 1 & 1 \\
1 & -1 & -1 & 1 & 1 & -1 & -1 & 1 & -1 & 1 & 1 & -1 & -1 & 1 & 1 & -1 \\
1 & -1 & 1 & -1 & 1 & -1 & 1 & -1 & -1 & 1 & -1 & 1 & -1 & 1 & -1 & 1 \\
1 & 1 & 1 & 1 & -1 & -1 & -1 & -1 & -1 & -1 & -1 & -1 & 1 & 1 & 1 & 1 \\
1 & 1 & -1 & -1 & -1 & -1 & 1 & 1 & 1 & 1 & -1 & -1 & -1 & -1 & 1 & 1 \\
1 & -1 & -1 & 1 & -1 & 1 & 1 & -1 & 1 & -1 & -1 & 1 & -1 & 1 & 1 & -1 \\
1 & -1 & 1 & -1 & -1 & 1 & -1 & 1 & 1 & -1 & 1 & -1 & -1 & 1 & -1 & 1 \\
1 & 1 & 1 & 1 & -1 & -1 & -1 & -1 & 1 & 1 & 1 & 1 & -1 & -1 & -1 & -1 \\
1 & 1 & -1 & -1 & -1 & -1 & 1 & 1 & -1 & -1 & 1 & 1 & 1 & 1 & -1 & -1 \\
1 & -1 & -1 & 1 & -1 & 1 & 1 & -1 & -1 & 1 & 1 & -1 & 1 & -1 & -1 & 1 \\
1 & -1 & 1 & -1 & -1 & 1 & -1 & 1 & -1 & 1 & -1 & 1 & 1 & -1 & 1 & -1
\end{vmatrix}$$

The transformed elements $y_{ij}$ will be checked in detail below. The element $y_{11}$ represents a value four times the mean value in the block and can take a positive integer of 0 to 1,020. The element $y_{11}$ is given as 10-bit data. Other elements $y_{12}$ to $y_{44}$ can take positive or negative integers of −510 to 510. The decimal parts are rounded off.

(First Embodiment of Coding)

Figure 1:
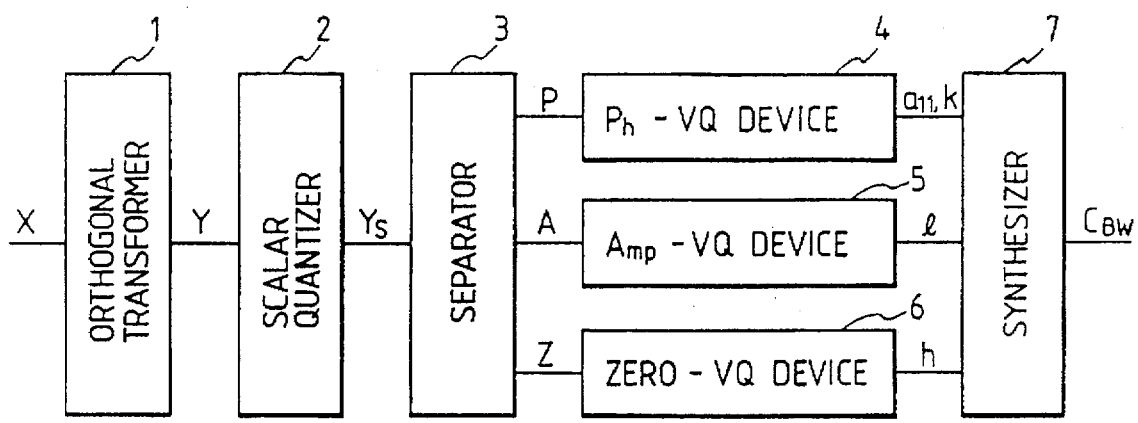
FIGS. 1, 11, 14, 16, 25, and 28 are block diagrams of coding apparatuses according to first, second, third, fourth, sixth, and seventh embodiments of the present invention, respectively.

FIG. 1 is a block diagram of an image information coding apparatus according to the first embodiment. The coding apparatus includes an orthogonal transformer 1, a scalar quantizer 2, and a separator 3. The orthogonal transformer 1 performs orthogonal transformation in units of blocks, and the transformed output of each pixel in each block is subjected to scalar quantization. Each coefficient in the block which is quantized by the scalar quantizer 2 is separated by the separator 3 into:

positive/negative code (phase) information P;

absolute value information A; and zero or nonzero information (zero information Z).

The separated pieces of information are supplied to vector quantization devices, i.e., a Ph-VQ device 4, an Amp-VQ device 5, and a zero-VQ device 6. These quantization devices will be briefly described below. The Ph-VQ device 4 vector-quantizes the phase information constituted by the positive/negative code of each element and outputs a quantization result. The Amp-VQ device 5 vector-quantizes the amplitude information constituted by an absolute value of each element in the same manner as in the Ph-VQ device 4 and outputs a quantization result. The zero-VQ device 6 vector-quantizes the zero information as binary data representing that each element is zero or not zero (nonzero) in the same manner as in the Ph-VQ device 4 and outputs a quantization result. These quantization results are input to a synthesizer 7 and are synthesized as one code.

Operations of the respective functional blocks will be described below.

Orthogonal Transformer

In the orthogonal transformer 1, image data is cut or divided into blocks (FIG. 3A) each consisting of 4×4 pixels each consisting of 8-bit data. The Hadamard transformation is performed for each block. The Hadamard transformation has been described above.

Scalar Quantization

The matrix Y consisting of Hadamard-transformed values is transformed by the scalar quantizer 2 into scalar quantization values in units of elements. Scalar quantization is performed as follows in consideration of the distribution range and generation frequency distribution of the values of the respective elements. The distribution range of values is divided into several intervals, and each interval is substituted with one representative value. This interval is called a slice width.

The scalar quantization results thus obtained are numbered from "1" in an order of results having smaller absolute values. If the scalar quantization result is "0", its number is "0".

Detailed Operations

Figure 5:
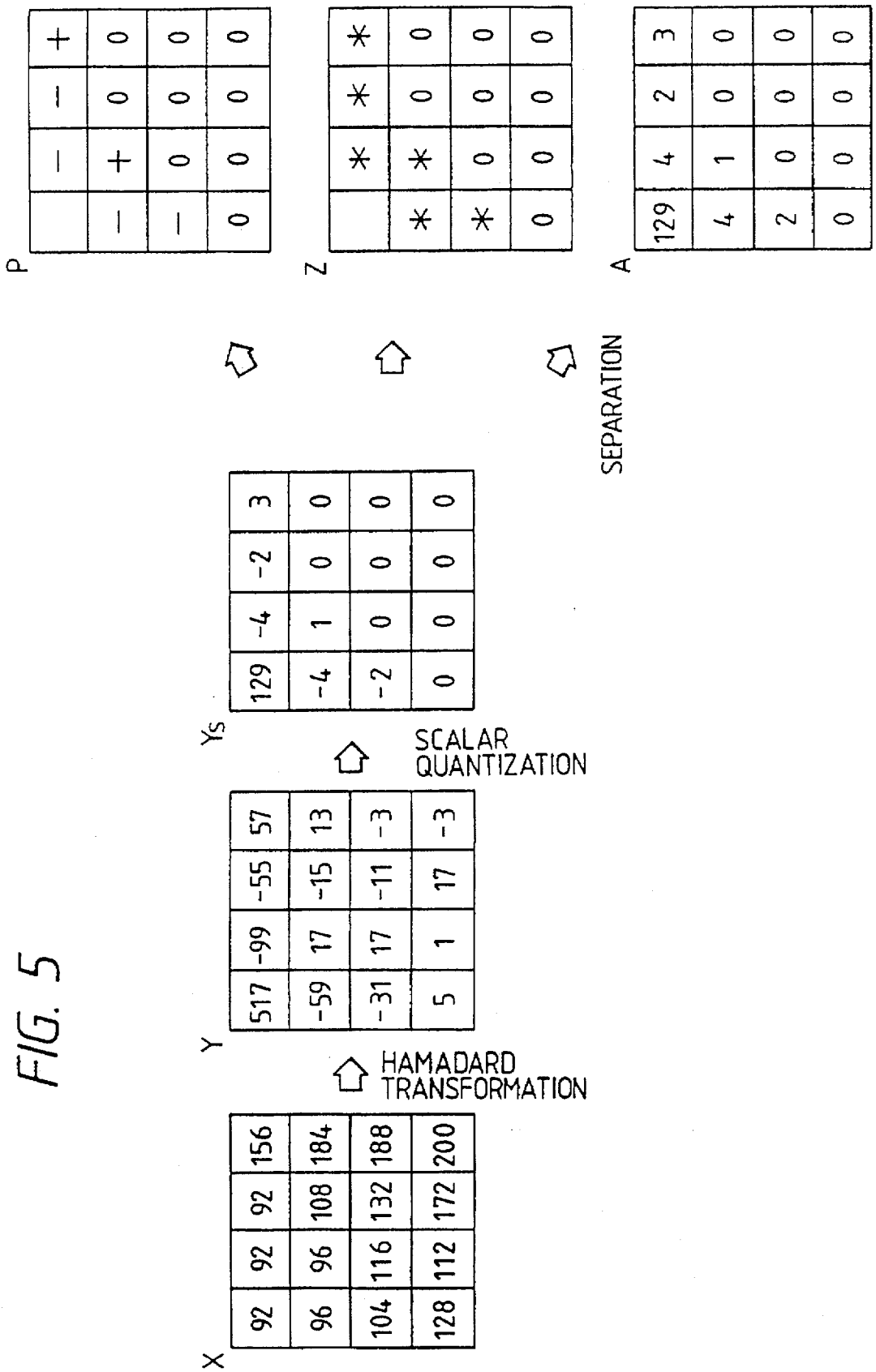
FIG. 5 is a flow showing changes in components when the respective components are extracted from initial data in the first embodiment.

FIG. 5 shows a detailed operation of transformation from orthogonal transformation into scalar quantization. Assume that density values of pixels represented by the right pixel block X in FIG. 5 are input. The input data X is Hadamard-transformed to obtain the matrix Y. The matrix Y is then subjected to scalar quantization. That is, the result obtained by numbering the elements of the matrix Y is shown as $Y_s$. In this case, linear scalar quantization is performed such that $y_{ij}$ is divided by the slice width $s_{ij}$. For example, $y_{13}=-55$ is divided by the scalar width $s_{12}=32$, and a quotient is rounded off, thereby obtaining a linear scalar quantization result $Y_{s12}=-2$. In decoding of the scalar quantization result, $Y_{s12}=-2$ is multiplied with a representative value $d_{12}=32$ to obtain a decoded value $y'_{12}=-64$.

Separator

The numbered scalar quantization result $Y_s$ is separated by the separator 3 into the phase information P shown in FIG. 4A, the amplitude information A shown in FIG. 4B, and the zero information Z shown in FIG. 4C. The P, A, and Z values are represented as follows:

$$P=[p_{12},p_{13},p_{14},p_{21},p_{22},p_{23},p_{24},p_{31},p_{32},\ p_{33},p_{34},p_{41},p_{42},p_{43},p_{44}] \quad (5)$$

$$A=[a_{11},a_{12},a_{13},a_{14},a_{21},a_{22},a_{23},a_{24},a_{31},a_{32},\ a_{33},a_{34},a_{41},a_{42},\\ a_{43},a_{44}] \quad (6)$$

$$Z=[z_{11},z_{12},z_{13},z_{14},z_{21},z_{22},z_{23},z_{24},z_{31},z_{32},\ z_{33},z_{34},z_{41},z_{42},z_{43},z_{44}] \quad (7)$$

The numbered elements $y_{sij}$ are defined as a function of $p_{ij}$, $a_{ij}$, and $z_{ij}$ as follows:

$$y_{sij}=p_{ij}a_{ij}z_{ij} \quad (8)$$

for (i=1, ... 4; j=1, ..., 4)

As a result of the Hadamard transformation, the amplitude information $a_{11}$ represents the mean value in the block, serves as an important parameter for determining gradation in the block and must be preserved without changes. The information $a_{11}$ is not taken into consideration for the zero information Z. Since the amplitude information $a_{11}$ represents a positive integer excluding 0, it is not taken into consideration for the phase information P, either.

The scalar quantization result $y_{s12}$ is separated into P, Z, and A components by the separator 3. The phase information P is positive/negative code information of the $y_s$ component. Each element $p_{ij}$ is represented by three-value data, +, −, and 0. The zero information Z is information representing whether each element is zero or not. Each element $z_{ij}$ is represented by binary data and represents that the value is zero or not zero (represented by mark "*" in FIG. 5). Finally, the amplitude information A is information of an absolute value. The pieces of the amplitude information A are multivalue data different in the respective elements.

Vector Quantization

The information P, the information A, and the information Z are input to the Ph-VQ device 4, the Amp-VQ device 5, and the zero-VQ device 6, respectively. The principle of vector quantization has been described above.

The functions of the respective vector quantization devices, i.e. the Ph-VQ device 4, the Amp-VQ device 5, and the zero-VQ device 6 will be described below. A method of generating a code book indispensable to vector quantization will be described later.

First, the Ph-VQ device 4 for quantizing the phase information P will be described. A set $\mathbf{P}_p$ of vectors of the phase information P is prepared by extracting codes of patterns (output vectors) of $\mathbf{P}_{P(k)}$ in advance, wherein k is the index number of the code book as previously described. A method of extracting the code book may be replaced with a method of selecting $N_P$ codes having higher generation frequencies.

If pieces of phase information are given as P, $P_1$, and $P_2$ shown in FIG. 6, these inputs are mapped onto this pattern $\mathbf{P}_{P(k)}$. In this case, 0 represents a noncode. In this manner, vector quantization of the phase information P is performed.

In each input phase information P, $P_1$, or $P_2$, elements different from those of $\mathbf{P}_{P(k)}$ are decoded into 0, and 0 is decoded as $\mathbf{P}_{P(k)}$ as a noncode. It should be noted that no code (phase information) inversion occur between the elements during reproduction.

The Amp-VQ 5 for quantizing the amplitude information $a_{ij}$ will be described. A set $\mathbf{P}_A$ of output vectors are prepared in advance in the same manner as in the phase information P. Each element $a_{ij}$ obtained by scalar quantization represents a finite positive integer or zero. The element $a_{11}$ is not vector-quantized and will not be taken into consideration. The set $\mathbf{P}_A$ of output vectors include, e.g., a pattern $\mathbf{P}_{A(l)}$ shown in FIG. 7. The input amplitude information, e.g., A, $A_1$, and $A_2$ (FIG. 7) is mapped on this pattern $\mathbf{P}_{A(l)}$.

For example, the input pattern A is mapped as follows. In the portion in which the elements $a_{ij}$ of the pattern A are not zero, the elements $a_{31}$ and $a_{14}$ differ from those of the $\mathbf{P}_{A(l)}$, are substituted with the corresponding elements, and mapped thereon. In the input pattern $A_1$, the element $a_{22}$ differs from that of the $\mathbf{P}_{A(l)}$. In the input pattern $A_2$, the element $a_{13}$ differs from that of the $\mathbf{P}_{A(l)}$.

These elements are substituted or replaced with the corresponding elements of the $\mathbf{P}_{A(l)}$. Degradation can be improved better than that caused by mapping the input pattern elements onto all the elements of the vector set $\mathbf{P}_A$ during actual decoding.

The set $\mathbf{P}_A$ can be obtained in the same manner as in generation of the set $\mathbf{P}_P$. However, actual coding and actual decoding may be performed or $\mathbf{P}_A$ can be optimized from the reproduced image, thereby generating the set $\mathbf{P}_A$.

The zero-VQ 6 for quantizing the zero information Z will be described below. A set $\mathbf{P}_Z$ of vectors is prepared in the same manner as described above. A determination method is the same as in $\mathbf{P}_A$. The set $\mathbf{P}_Z$ includes a pattern $\mathbf{P}_{Z(h)}$, as shown in FIG. 8. Input zero information, e.g., Z, $Z_1$, and $Z_2$, is mapped onto the pattern $\mathbf{P}_{Z(h)}$. This mapping is performed by substituting some of pieces of "nonzero"

information of the input patterns Z, $Z_1$, and $Z_2$ with "0s". For example, mapping from the input pattern Z, element $z_{14}$ is substituted with "0". In mapping from the input pattern $Z_1$, the elements $z_{23}$ and $z_{31}$ are respectively substituted with "0s". In mapping from the input pattern $Z_3$, the element $z_{44}$ is substituted with "0". It should be noted that the "nonzero" (mark "*") may be substituted with "0" but "0" is not substituted with the "nonzero". If "0" is substituted with the "nonzero", the image is greatly degraded.

The Ph-VQ device 4, the Amp-VQ device 5, and zero-VQ device 5 perform vector quantization by mapping. The common feature of mapping in vector quantization is a substitution from a high-frequency component. In this case, each element corresponding to the element $y_{44}$ is the highest frequency component. The frequencies are gradually decreased in an order of $y_{34}, y_{43}, \ldots y_{11}$. If the substitution of the high-frequency component is visually performed, discrimination can hardly be made during reproduction. The coding scheme of this embodiment utilizes this phenomenon.

The codes of the mapped patterns are output as the result of vector quantization. The phase information P, the zero information Z, and the amplitude information A in FIG. 5 are mapped onto the patterns $\mathbf{P}_{P(k)}$, $\mathbf{P}_{Z(h)}$, and $\mathbf{P}_{A(l)}$ shown in FIGS. 6, 7, and 8, so that pattern codes k, h, and l (index numbers of the output vectors) are obtained as the result of quantization, respectively.

Synthesis

These pattern codes are input to the synthesizer 7. Coded data $C_{BW}$ shown in FIG. 9 can be obtained as a synthesis result of a block having 4×4 pixels.

Decoding

Figure 10:
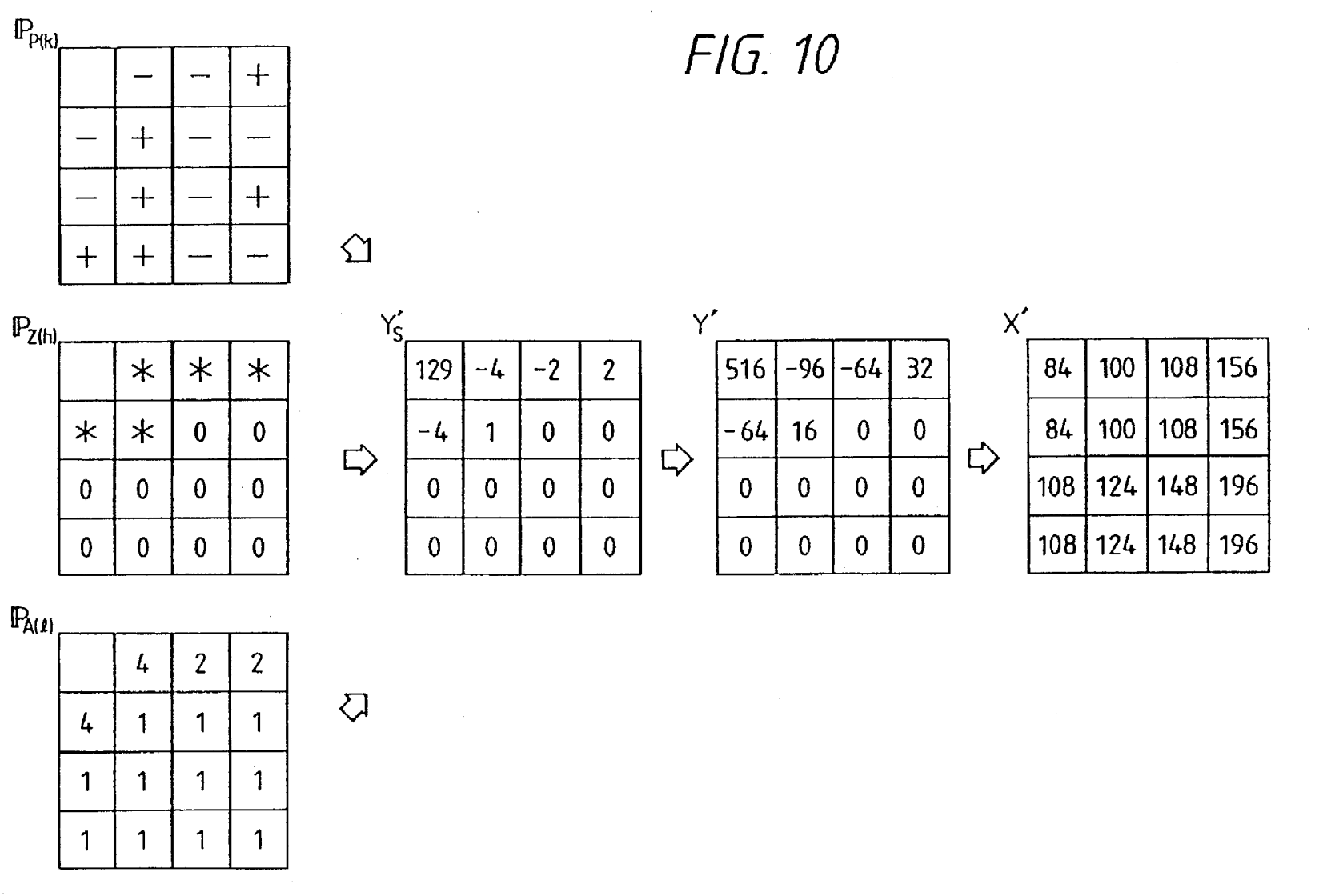

Decoding of the coded data $C_{BW}$ shown in FIG. 9 will be described with reference to FIG. 10. The mean value $a_{11}$ in the block can be decoded from the coded data $C_{BW}$. The patterns $\mathbf{P}_{P(k)}$, $\mathbf{P}_{A(l)}$, and $\mathbf{P}_{Z(h)}$ are obtained from the codes k, l, and h of the patterns of the phase information P, the amplitude information A, and the zero information Z. Each element $y'_{sij}$ of the numbered scalar quantization result $Y'_s$ is represented by using elements $P_{(k)ij}$, $a_{(l)ij}$, and $z_{(h)ij}$ of the respective patterns as follows:

$$\begin{aligned} &y'_{sij} = p_{(k)ij} \cdot a_{(l)ij} \cdot z_{(h)ij} \\ &\text{for } i = 1, \ldots 4; j = 1, \ldots, 4 \text{ except} \\ &\text{for } i = j = 1) \\ &y'_{s11} = a_{11} \end{aligned} \quad (9)$$

The result is multiplied with a representative value (i.e., a slice width) of each element. The resultant Hadamard transformed value Y' is obtained. If inverse Hadamard transformation of the value Y' is performed, decoded image data X' can be obtained. In this case, the inverse Hadamard transformation is the same as the Hadamard transformation. With this arrangement, the techniques and hardware can be commonly used.

Hardware Arrangement

A hardware arrangement of this embodiment will be described below. The orthogonal transformer 1 performs additions and subtractions of input values. Divisions can be performed by shifting bits of the input data. The scalar quantizer 2 or each vector quantization device 4, 5, or 6 can be constituted by a look-up table using a read-only memory (ROM). The separator 3 can be constituted by a complementary transformer. That is, a NOR gate and an adder are connected through a wiring. The synthesizer 7 can be easily constituted by only the wiring.

(Second Embodiment)

Figure 11:
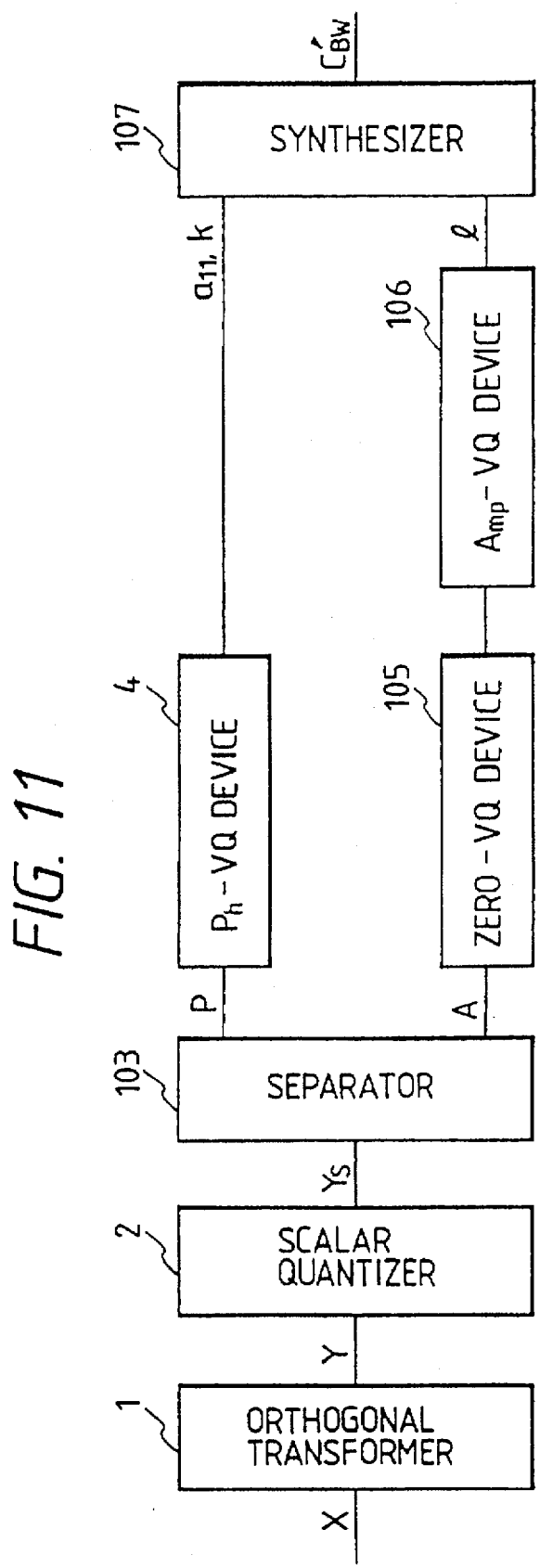

An arrangement of a second embodiment and its flow of data will be described with reference to FIGS. 11 and 12, respectively. In the second embodiment, the zero information Z is included in the amplitude information A to improve compression efficiency.

An image information coding apparatus of the second embodiment comprises an orthogonal transformer 1 and a scalar quantizer 2, which are the same as those in the first embodiment. A separator 103 separates the input pixel data of each block into a positive/negative code P and absolute value information A which are respectively supplied to a Ph-VQ device 4 and a zero-VQ device 105. The Ph-VQ device 4 has the same arrangement as that in the first embodiment.

The zero-VQ device 105 separates zero information Z from the input absolute value information A, vector-quantizes the zero information Z, superposes the vector-quantized zero information Z on the absolute value information A, and outputs the superposed information. The absolute value information A is represented by matrix (6). The zero information Z extracted from the absolute value information A is represented by matrix (7). The zero information Z is mapped onto the pattern $\mathbf{P}_{Z(h)}$ in the set $\mathbf{P}_Z$ of vectors, as previously described. If the pattern $\mathbf{P}_{Z(h)}$ is defined as follows:

$$\mathbf{P}_{Z(h)} = [Z_{12}, Z_{13}, Z_{14}, Z_{21}, Z_{22}, Z_{23}, Z_{24}, Z_{31}, Z_{32}, Z_{33}, Z_{34}, Z_{41}, Z_{42}, Z_{43}, Z_{44}] \quad (10)$$

each element $a'_{ij}$ of amplitude information A' output from the zero-VQ device 105 is given by:

$$\begin{aligned} &a'_{ij} = z_{ij} \cdot a_{ij} \\ &\text{for } i = 1, \ldots 4; j = 1, \ldots, 4 \text{ except for } i = j = 1 \end{aligned} \quad (11)$$

The output from the zero-VQ device 105 is input to an Amp-VQ device 106. The Amp-VQ device 5 performs vector quantization by mapping. In this case, since the zero information is quantized by the zero-VQ device 105 connected to the input of the Amp-VQ device 106, the input patterns of the amplitude information A are limited to specific ones.

The outputs from the Ph-VQ device 4 and the Amp-VQ device 106 are supplied to a synthesizer 107. The synthesizer 107 outputs coded data $C'_{BW}$ (FIG. 13) as a result of coding of the block having 4×4 pixels.

Decoding is performed in the same manner as in the first embodiment. An average $a_{11}$ in the block is obtained from the coded data $C'_{BW}$, and the patterns $\mathbf{P}_{P(k)}$ and $\mathbf{P}_{A(l)}$ are obtained from the phase and amplitude information pattern codes k and l. Each element $y'_{sij}$ of the numbered quantization result $Y'_s$ to be decoded is represented by using the pattern elements $p_{(k)ij}$ and $a_{(l)ij}$:

$$\begin{aligned} &y'_{sij} = p_{(k)ij} \cdot a_{(l)ij} \\ &\text{for } i = 1, \ldots, 4; j = 1, \ldots 4 \text{ except} \\ &\text{for } i = j = 1 \\ &y'_{sij} = a_{ij} \end{aligned} \quad (12)$$

The subsequent operations are the same as those as described above. As a result, image data X' can be obtained.

(Third Embodiment)

A third embodiment will be described in which an image to be coded is a color multivalue image.

In general, a color image is color-separated by a scanner or the like, and R (red), G (green), and B (blue) components are input. Assume that R, G, and B pixels have a total of 24-bit information, i.e., 8 bits for each color component.

Figure 14:
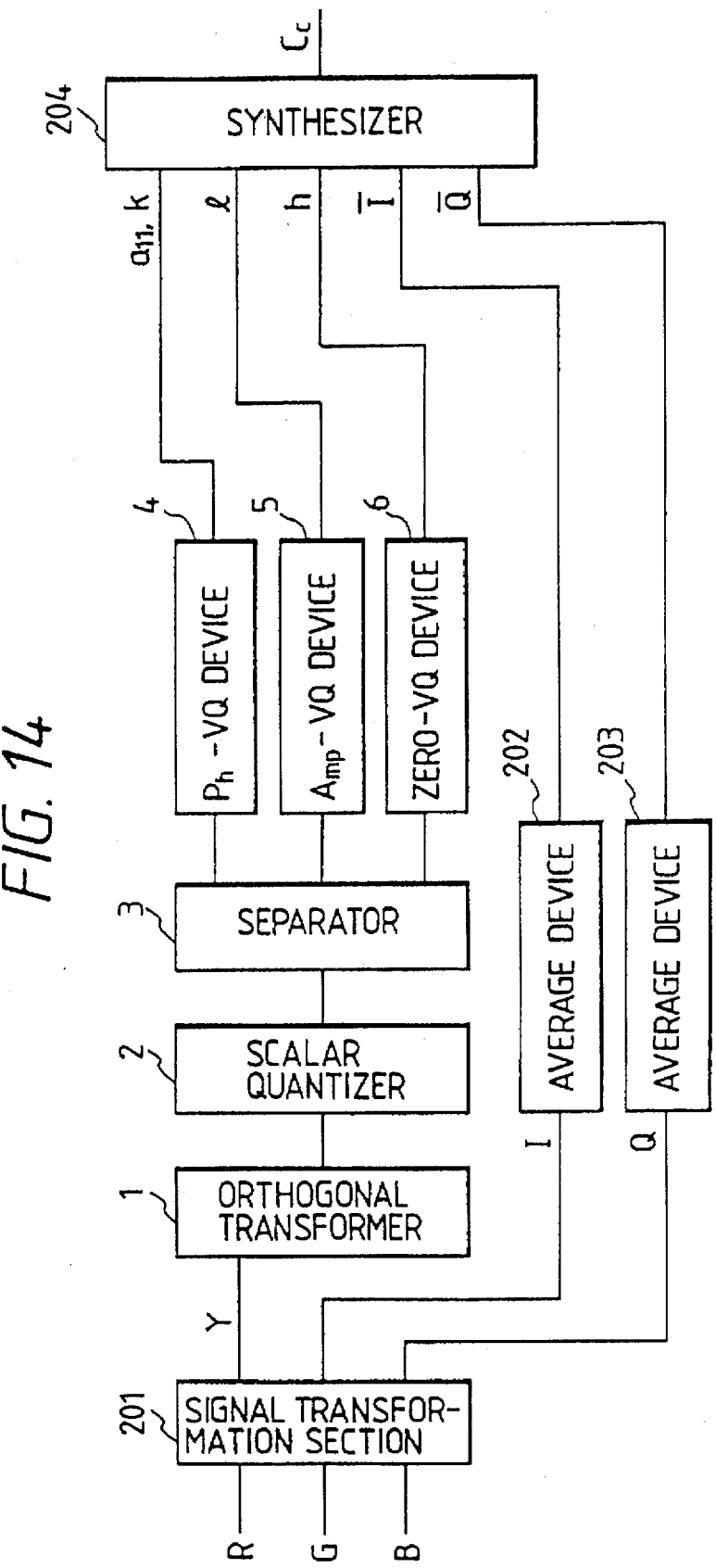

FIG. 14 shows an arrangement of an image information coding apparatus according to the third embodiment of the present invention. A signal transformation section 201 receives R, G, and B signals of the input pixels $x_{ij}$ and transforms them into Y, I, and Q signals. The Y, I, and Q signals are generally used as television transmission signals. The Y signal is a luminance signal, and the I and Q signals are color difference signals. The Y, I, and Q signals have a low correlation between the luminance and the color difference and can be independently coded. In addition, since color difference information is information representing a relatively low frequency, it can be processed as one information in units of blocks. In the third embodiment, coding of the first embodiment is performed for the Y signal.

First, compression of the Y information will be described. The Y information transformed and obtained by the transformation section 201 is input to an orthogonal transformer 1 as a block having 4×4 pixels. In the same manner as in the monochromatic image, Hadamard transformation is performed. The transformed result is input to and scalar-transformed by a scalar quantizer 2. The quantization result is input to a separator 3 and is separated into phase information P, amplitude information A, and zero information Z. Vector quantization of these pieces of information are performed by a Ph-VQ device 4, an Amp-VQ device 5, and a zero-VQ device 6, respectively, in the same manner as in the first embodiment.

The I information and the Q information are input to average devices 202 and 203, respectively. Averages of the respective blocks are obtained. The synthesizer 205 receives pattern codes k, l, and h from the Ph-VQ device 4, the Amp-VQ device 5, and the zero-VQ device 6, an average $a_{11}$ of the luminance Y information in the block, and averages of color difference I and Q information from the average devices 202 and 203 and outputs coded data $C_c$ (FIG. 15) as a result of coding of the block having 4×4 pixels.

(Fourth Embodiment)

Figure 16:
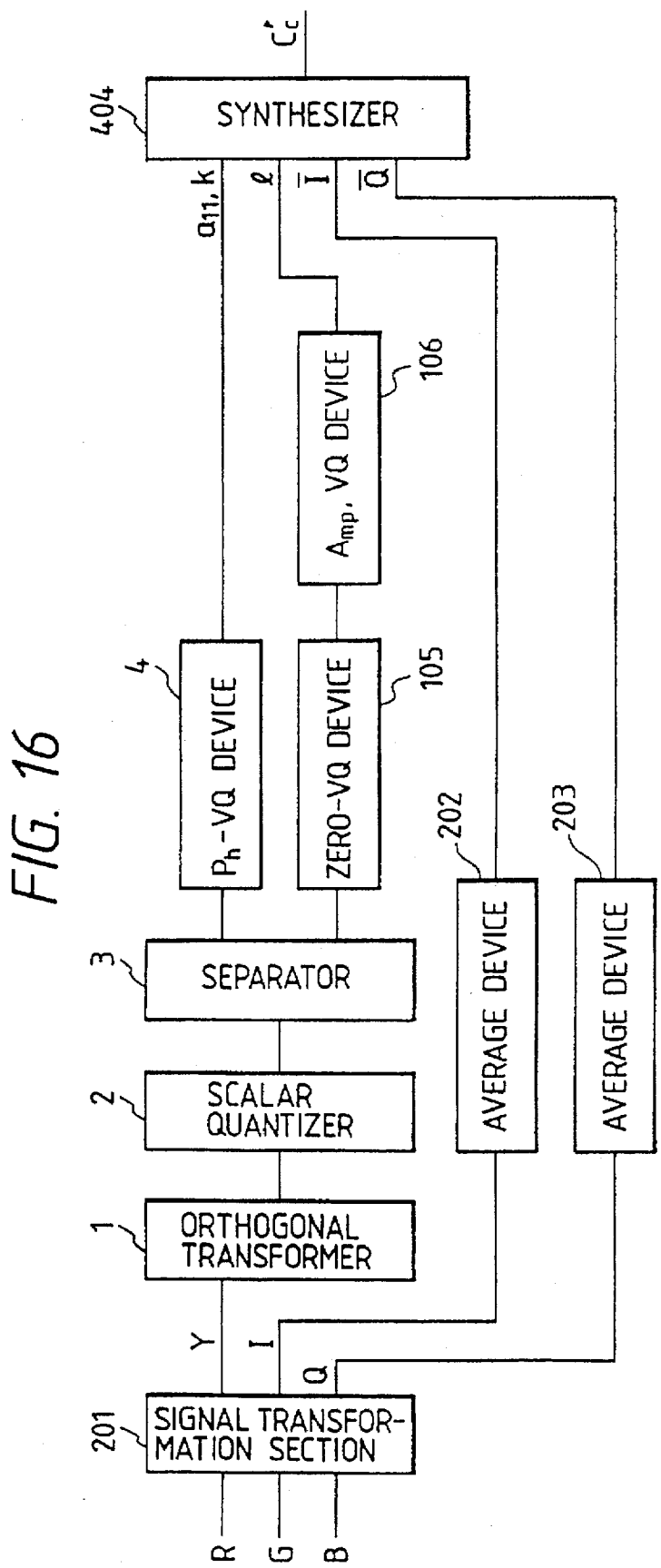

FIG. 16 shows an arrangement of an image information coding apparatus according to a fourth embodiment. In the fourth embodiment, the second embodiment is applied to color signals.

A signal transformation section 201 in FIG. 16 is the same as that in the third embodiment. The signal transformation section 201 receives R, G, and B signals of pixels $x_{ij}$ and transforms them into Y, I, and Q signals. The Y information is input to an orthogonal transformer 1 as a block having 4×4 pixels and is Hadamard-transformed. The result is input to a scalar quantizer 2. A scalar quantization result is input to a separator 3 and is separated into phase information P and amplitude information A.

The phase information P is vector-quantized by a Ph-VQ device 4. A result obtained by vector-quantizing zero information Z by a zero-VQ device 105 is superposed on the amplitude information A. The superposed result is input to an Amp-VQ device 506, thereby vector-quantizing the amplitude information A'.

Average devices 202 and 203, calculate averages of the I and Q information of a block having 4×4 pixels.

The averages of the Y information, the I information, and the Q information in the block, and the pattern codes of the vector quantization results of the phase information P and the amplitude information A are synthesized by a synthesizer 404, thereby obtaining coded data $C'_c$ (FIG. 17) as a result of coding.

(Fifth Embodiment)

In the four embodiments described above, the synthesizers 7, 507, 204, and 404 are used to simply synthesize the coded results. However, if a vector quantizer is arranged in consideration of a generation frequency of combinations of two or three quantization results on an experimental basis, coded data shown in FIG. 17 can be obtained in the fourth embodiment shown in FIG. 16.

(First Method of Generating Code Book)

Generation of a code book for vector quantization according to this embodiment will be described below.

Generation Procedures (Phase Information)

Figure 19:
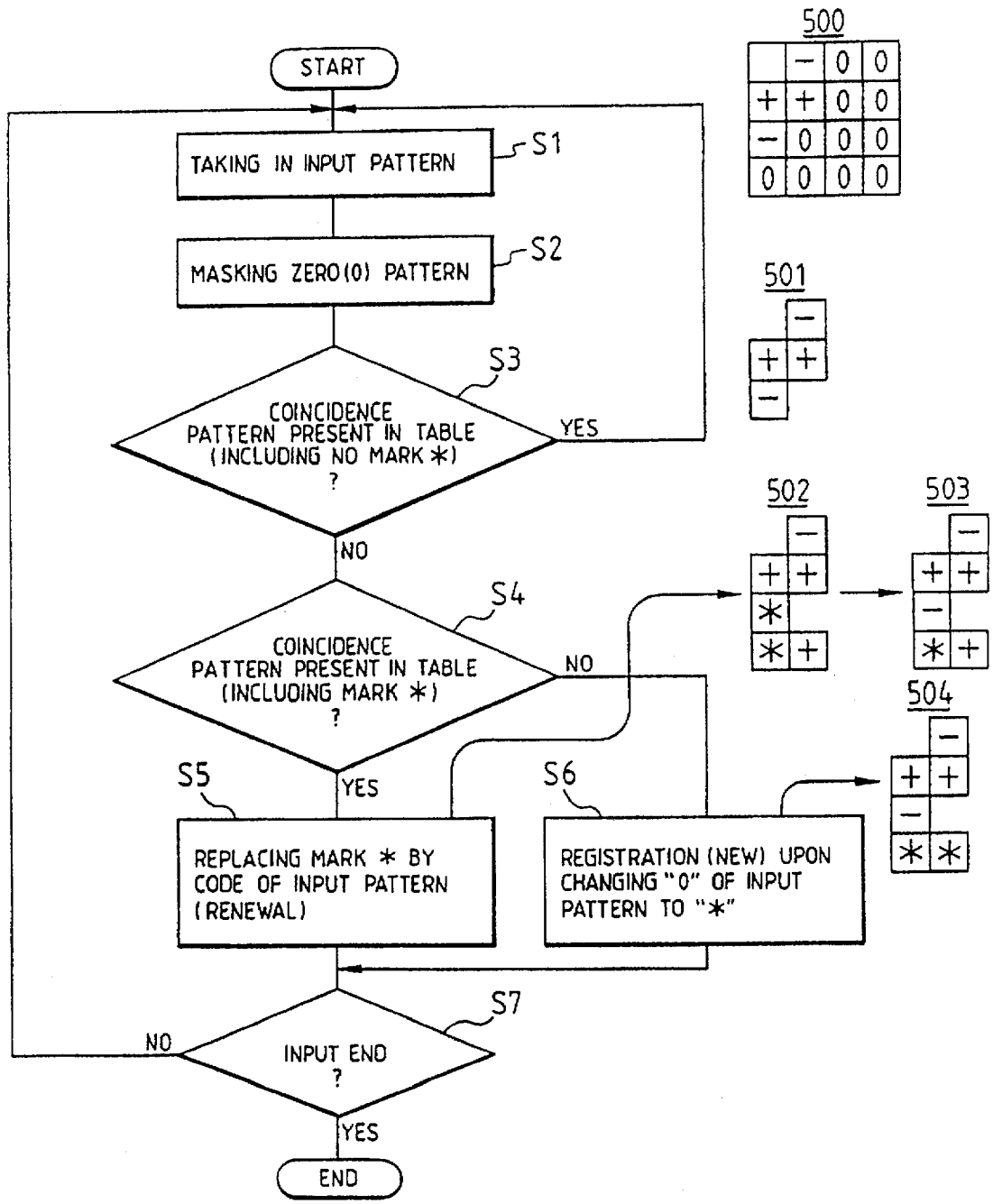
FIGS. 19, 22A, 22B, 23, and 24 are flow charts for explaining control procedures associated with code book generation.

FIG. 19 is a flow chart showing generation of a code book used for vector quantization in this embodiment by using phase information P.

In step S1, an input pattern is taken in. This input pattern corresponds to, e.g., the general vector X in the case of FIG. 2. More specifically, a predetermined image is input to, e.g., the coding apparatus of FIG. 1 in accordance with a training sequence. Orthogonal transformation, scalar quantization, and separation of this input pattern are performed to obtain the phase information P. An example of this input pattern is shown as an input pattern 500 in FIG. 19. In step S2, a zero (0) pattern of the pattern extracted in step S1 is masked, so that a pattern of only +/− codes can be obtained. This pattern is referred to as an "input+/−pattern". The input+/−pattern of the input pattern 500 can be derived as a pattern 501 in FIG. 19.

It is checked in step S3 whether a coincidence pattern with the "input+/−pattern" is present in a table. This table constitutes a code book. This comparison is not performed for an element without a mark * (to be described later) in the table. If YES in step S3, the flow returns to step S1, and the next "input+/−pattern" is taken in.

However, if NO in step S3, the flow advances to step S4. If a coincidence pattern is present in the table under the condition that part of the "input+/−pattern" is replaced with the mark * (don't care), the flow advances to step S5. If NO in step S4, the flow advances to step S6.

If YES in step S5, the coincidence pattern is present under the condition that part of the "input+/−pattern" is replaced with the mark *, the mark * in the registration pattern is replaced with a code of the corresponding element in the "input+/−pattern" to renew the pattern. In this case, the masked elements are not renewed.

However, if no coincidence pattern is present in the registration patterns in the table, a new pattern obtained upon replacement of the masked elements with the marks "*" in the "input+/−pattern" is registered in step S6.

Figure 20:
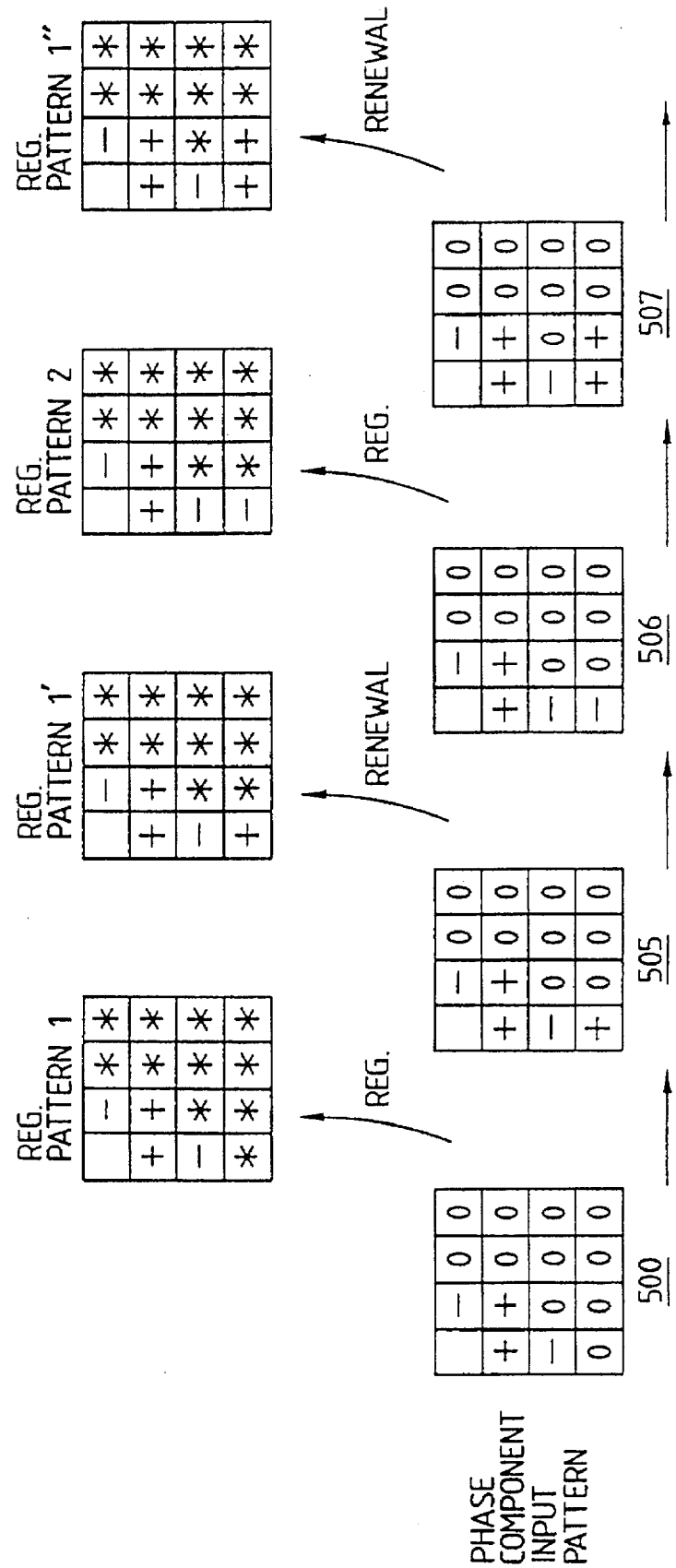

The above operations will be described in more detail with reference to FIG. 20.

When an "input+/−pattern" such as the pattern 500 is input, this pattern is registered because it is not yet registered before. This pattern is called a "pattern 1" for illustrative convenience. At this time, if zeros are included in the "input+/−pattern", the zeros are respectively replaced with the marks * (don't care), and the resultant pattern is registered (step S6). When another "input+/−pattern" 505 is taken in, the "registration pattern 1" is compared with the pattern 505. Only elements (4,1) of these patterns are different from each other except for the elements with marks *. In addition, the element (4,1) in the "registration pattern 1" is given as the mark *. Therefore, the second input pattern 505 is regarded to be similar to the "registration pattern 1". Therefore, the element (4,1) of the second input pattern 505 is changed to "+", and the resultant pattern is registered as a "registration pattern 1'" (step S5).

When the next "input+/−pattern" 506 is taken in, the elements (4,1) of the "registration pattern 1'" and the input pattern 506 are different. However, the element (4,1) of the "registration pattern 1'" is not given as the mark *. Therefore, the input pattern 506 can be regarded as a new one and is registered as a new pattern (step S6). In this case, zeros are respectively replaced with the marks *.

The above operations are repeated to generate a table. The marks * can be eliminated from most of the registration patterns by the operation in step S6, and patterns as combinations of + and − codes are obtained. In addition, some patterns having low generation frequencies may include the marks *.

Round-Off

Since a code book, i.e., the capacity of the table is limited, the number of vectors must be reduced within the capacity of the table. For this purpose, elements are taken into consideration. Unnecessary vectors in the code book are rounded off. This operation is required under the following circumstances. During generation of the table by the procedures of FIG. 19, if output vectors are registered in an external memory device such as a large-capacity magnetic disk, the capacity need not be taken into consideration because it has a large capacity. However, when an image information coding apparatus is actually operated, its coding rate is the most important issue. Therefore, the memory capacity must be kept within a predetermined value.

"Round-off" is basically performed according to the following rules. In order to determine that a given registration pattern (or a pattern to be registered) is required to be rounded off, (1) a specific element of a given registration pattern is masked, and a registered pattern having elements coinciding with the remaining elements (including the masked element) of the given registration pattern is searched. If a coincidence pattern is present, the given registration and the registered pattern are "rounded off" into a new pattern in which the masked element is replaced with "0";

(2) Elements subjected to "round-off" are weighted, and "round-off" is performed in an order of heavily weighted elements because the elements which exhibit features in accordance with types of image are limited;

(3) Elements subjected to "round-off" are limited to prevent extreme structural changes by "round-off"; and (4) Patterns having high generation (use) frequencies are not "rounded off", and patterns having low generation frequencies are "rounded off".

The above method will be described in more detail with reference to FIGS. 21A to 21D.

FIG. 21A shows elements subjected to "round-off" and their weighting. The elements surrounded by the thick line, i.e., $y_{12}$, $y_{13}$, $y_{21}$, $y_{22}$, and $y_{31}$ are excluded from the elements subjected to "round-off" according to rule (3) because the structure of the initial image blocks usually depend on the codes of these elements. Elements subjected to "round-off" must be weighted in consideration of dependency on the structure of the initial image blocks. The elements are "rounded off" in an order of lightly weighted elements. For example, "round-off" is performed in the following order:

$$y_{44} < y_{34} = y_{43} < y_{33} < y_{42} = y_{24} < y_{23} = y_{32} < y_{14} = y_{41}$$

In an embodiment to be described later, features are extracted from an image, and elements are distributed or classified into "categories" in accordance with the features. In such an embodiment, the order of weighting varies depending on the categories.

FIGS. 21B to 21D show detailed "round-off" operations. A pattern 110 in FIG. 21B is the same as a pattern 111 except for elements $y_{44}$. A pattern 112 obtained by replacing the element $y_{44}$ with "0" is defined as a new pattern which is representative of the patterns 110 and 111. Similarly, FIG. 21C shows a case wherein two elements $y_{43}$ and $y_{44}$ are simultaneously masked, and FIG. 21D shows a case wherein the four elements $y_{24}$, $y_{34}$, $y_{43}$, and $y_{44}$ are simultaneously masked. With these operations, masking is performed one by one, two by two, three by three, .... six by six, and seven by seven in an order of lightly weighted elements.

Figure 22A:
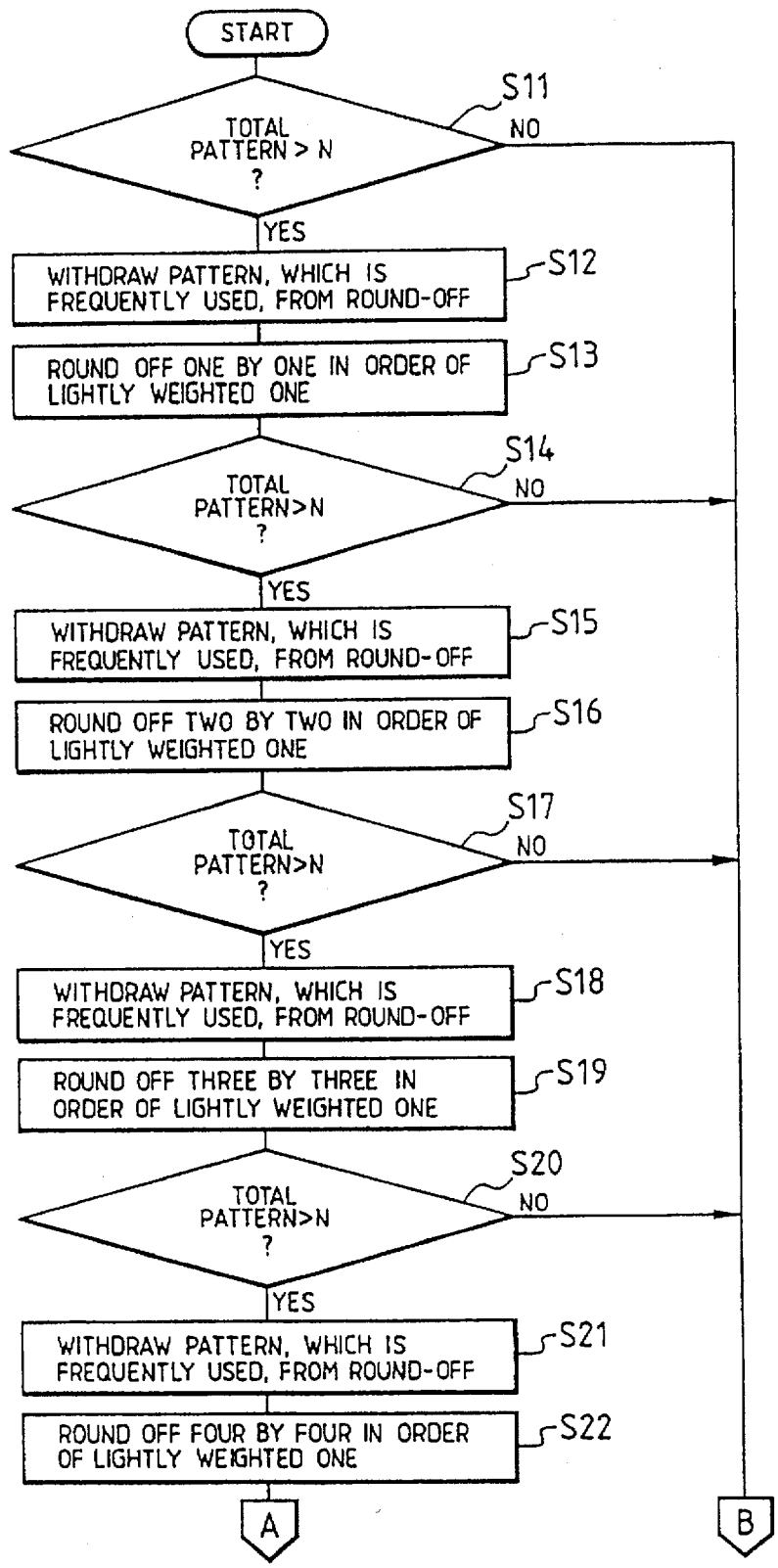
Figure 22B:
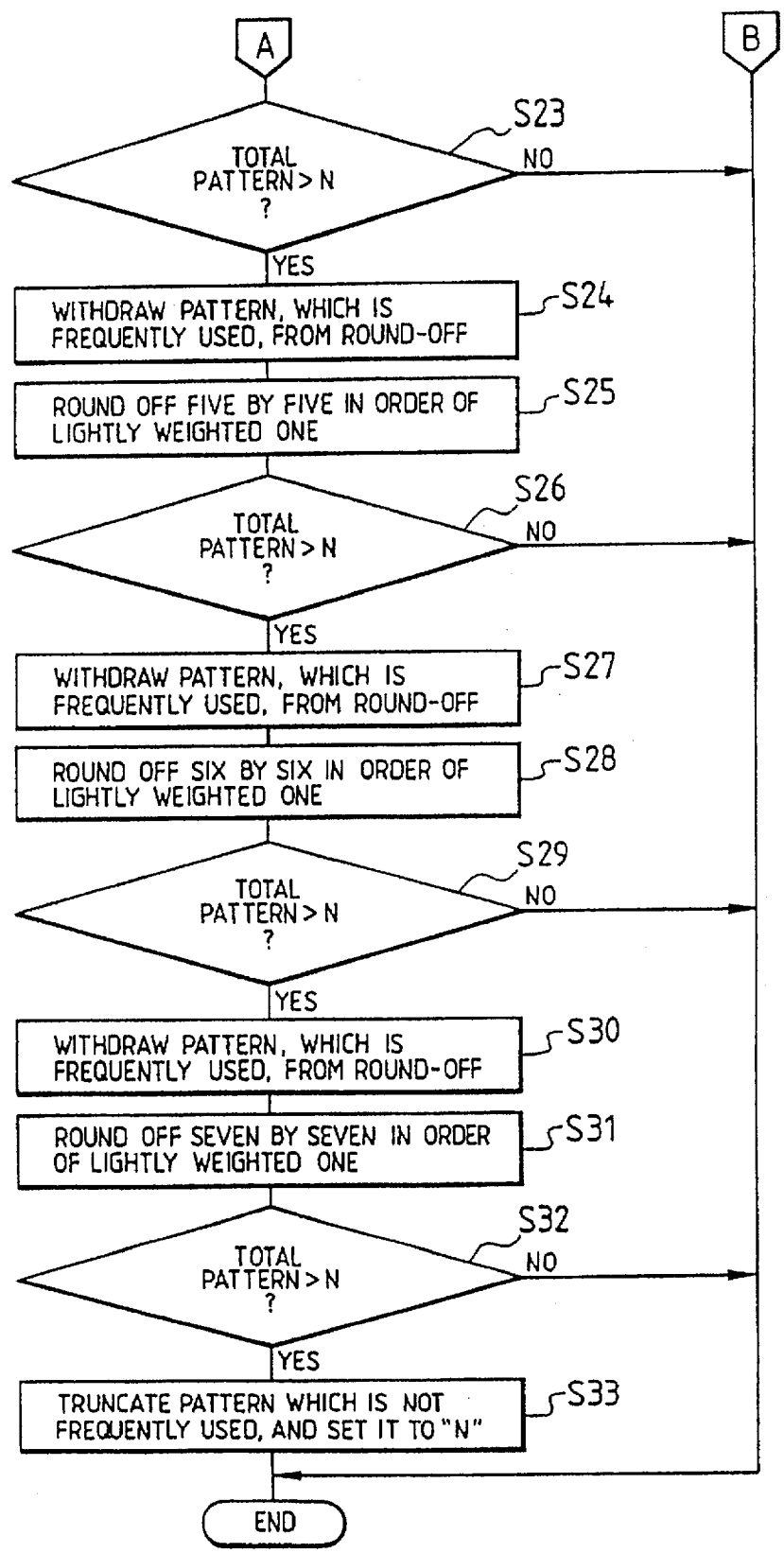

FIGS. 22A and 22B are flow charts for explaining "round-off" operations. These operations will be described with reference to these flow charts. Assume that the "round-off" target, i.e., the number of vectors or a total number of registration patterns is given as N. In the flow charts, the number of elements to be "rounded off" is given as one so as to set the total pattern number to be N. If the total pattern number is larger than N, the number of elements to be "rounded off" is increased to 2. Under this condition, if the total pattern number is larger than N, then the number of elements to be "rounded off" is increased to 3, .... If the total pattern number exceeds N in step S11, the flow advances to step S12, and the "round-off" operations are started. In step S12, patterns which are frequently used (generated) are withdrawn from round-off in order to prevent the pattern which is frequently used from being rounded off together with a pattern which is not frequently used. In step S13, masking is performed one by one in the order of lightly weighted elements, as described above with reference to FIGS. 21B to 21D. If the total pattern number is N or less in step S14, the flow is ended. However, if the total pattern number is larger than N, the flow advances to step S15.

In step S15, in addition to the elements withdrawn in step S12, elements having higher generation frequencies are withdrawn from the round-off result in step S13. In step S16, masking is performed two by two in the order of lightly weighted elements in the same manner as in step S13. The operation in step S17 is similar to that in step S14.

Masking is repeated until the number of elements to be rounded off becomes 7 before an operation in step S33 is started.

In step S33, the patterns which are not frequently used (most of the patterns have a generation frequency of 1) are truncated from the patterns having lower generation frequencies until the total registration pattern number is N.

The above operations are defined as "generation of a code book". The resultant N registration patterns are called "output vectors", and a set of these vectors is called a "code book".

Mapping is performed using the generated code book in association with the first embodiment, as shown in FIG. 6. Referring back to FIG. 6, the code book output vector on which the input patterns P, $P_1$, and $P_2$ are mapped is $P_{P(k)}$. This index number k is a coding result by vector quantization.

Generation of Code Book of Zero Information

Figure 23:
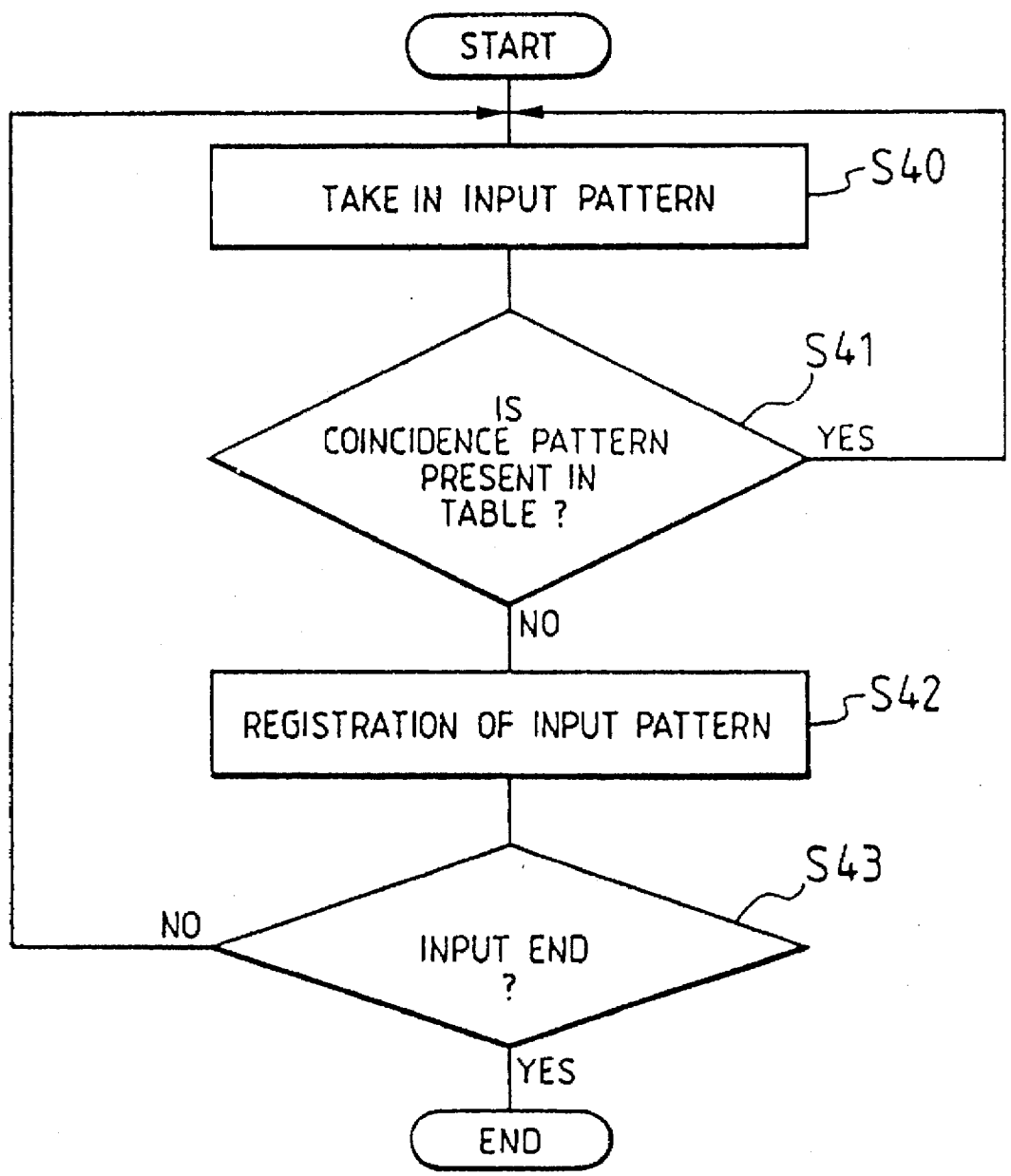

Generation of a code book of zero information by vector quantization of the zero information Z will be described below. A table is generated in the same manner as in the phase information P. FIG. 23 is a flow chart showing procedures for generating a table for generating a code book for zero information vector quantization. All pieces of zero information in the training sequence are extracted.

If the total pattern number of zero information registered in the table is M or less, compression ("round-off") of the zero information Z need not be performed. However, if the target number of vectors is larger than M, "round-off" is performed to set the target number to be M in the same manner as in the phase information P.

In the same manner as in the phase information P, nonzero portions are replaced with "0s" in accordance with basic rules (2) to (4) of "round-off", and the patterns are compared with the patterns in the table. If a coincidence pattern is found, it is registered in a new table. These operations are repeated to obtain M output vectors $P_{Z(h)}$ in accordance with the flow charts in FIGS. 22A and 22B.

Generation of Code Book of Amplitude Information

Generation of a code book for vector quantization of the amplitude information A will be described. A table is generated in the same manner as in the phase information P. A table is generated in accordance with a flow chart of FIG. 23 in the same manner as in the zero information Z. In this case, if the number of pieces of zero information Z is L or less, i.e., the target number of vectors, compression (round-off) of the amplitude information A need not be performed. However, if the number of pieces of zero information Z is more than L, the elements are taken into consideration for round-off in the same manner as in the phase information P. Round-off operations are performed according to basic rules (2) to (4) of round-off in the same manner as in the phase information P.

Figure 24:
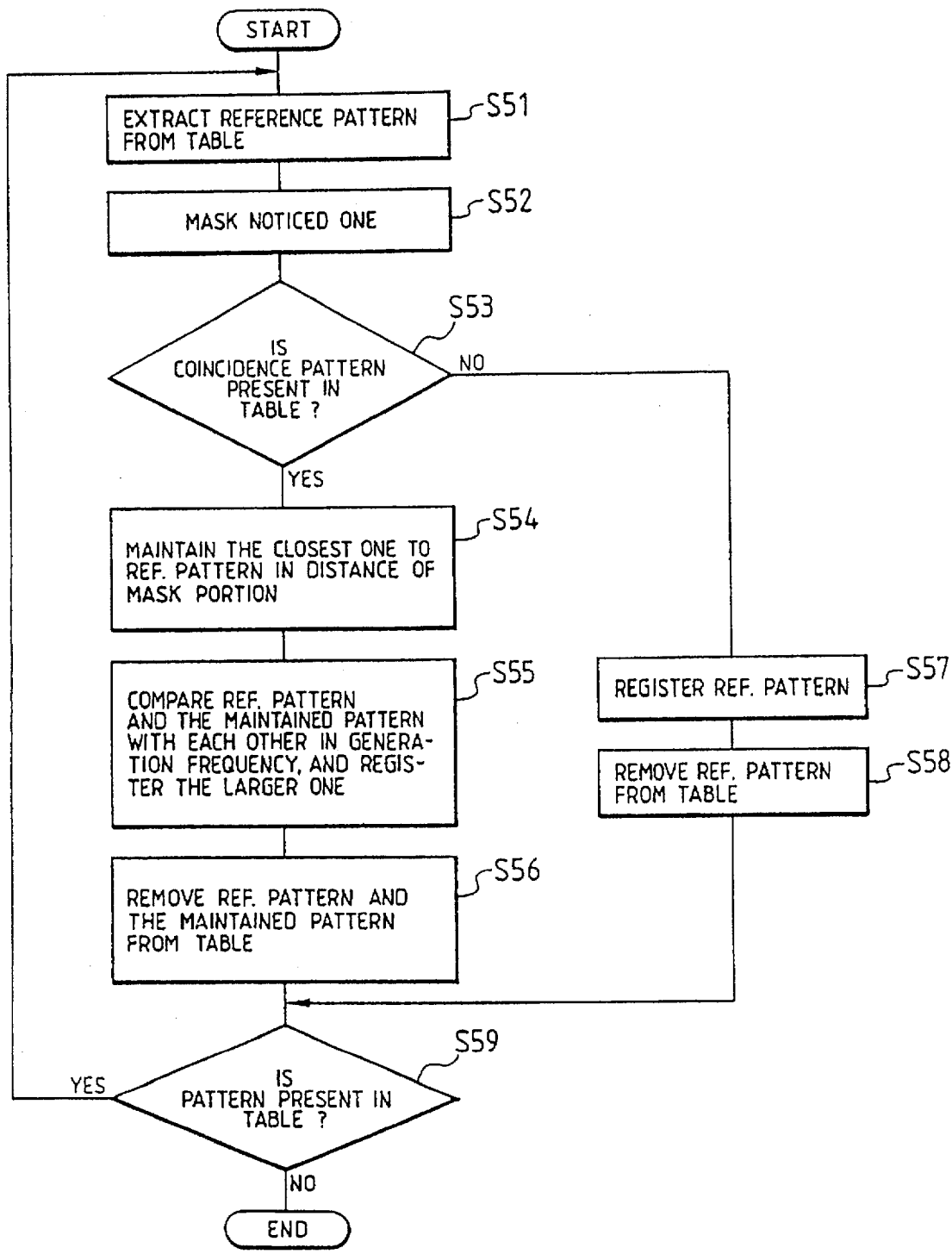

FIG. 24 is a flow chart for explaining operations of "round-off" of the amplitude information A, and these operations will be described in detail below.

In step S51, a registered pattern (an extracted pattern is referred to as a reference pattern hereinafter) is extracted from the table. In step S52, A noticed element of the reference pattern is masked. It is checked in step S53 whether any registered pattern having elements which coincide with unmasked elements or an unmasked portion of the reference pattern is present in the table. If YES in step S53, the flow advances to step S54. Otherwise, the flow advances to step S58.

In step S54, the registered patterns having elements all of which coincide with all the unmasked elements of the reference pattern are obtained from the table. A distance between the masked element or mask portion of the reference pattern and that of the coincidence pattern is calculated. The closest pattern to the reference pattern in distance of the mask portion is maintained. The flow then advances to step S55.

In step S55, the reference pattern and the maintained pattern are compared with each other in generation frequency, and the larger one is registered in a new table. The flow advances to step S56.

In step S56, the reference pattern and the maintained pattern are removed from the old table. The flow advances to step S59.

If no coincidence pattern is present in step S53, the reference pattern is registered in the new table. In step S58, the reference pattern is removed from the old table.

In step S59, if the pattern is not present in the old table, the flow is ended. However, if the pattern is present, the flow returns to step S51.

Masking of the noticed pixels is performed one by one, two by two, . . . until the target number of vectors becomes L. These operations are repeated to obtain L output vectors $P_{A(l)}$.

The three types of code books can be generated prior to coding, and high-speed vector quantization can be performed in the first to fifth embodiments.

(Sixth Embodiment of Coding)

Figure 25:
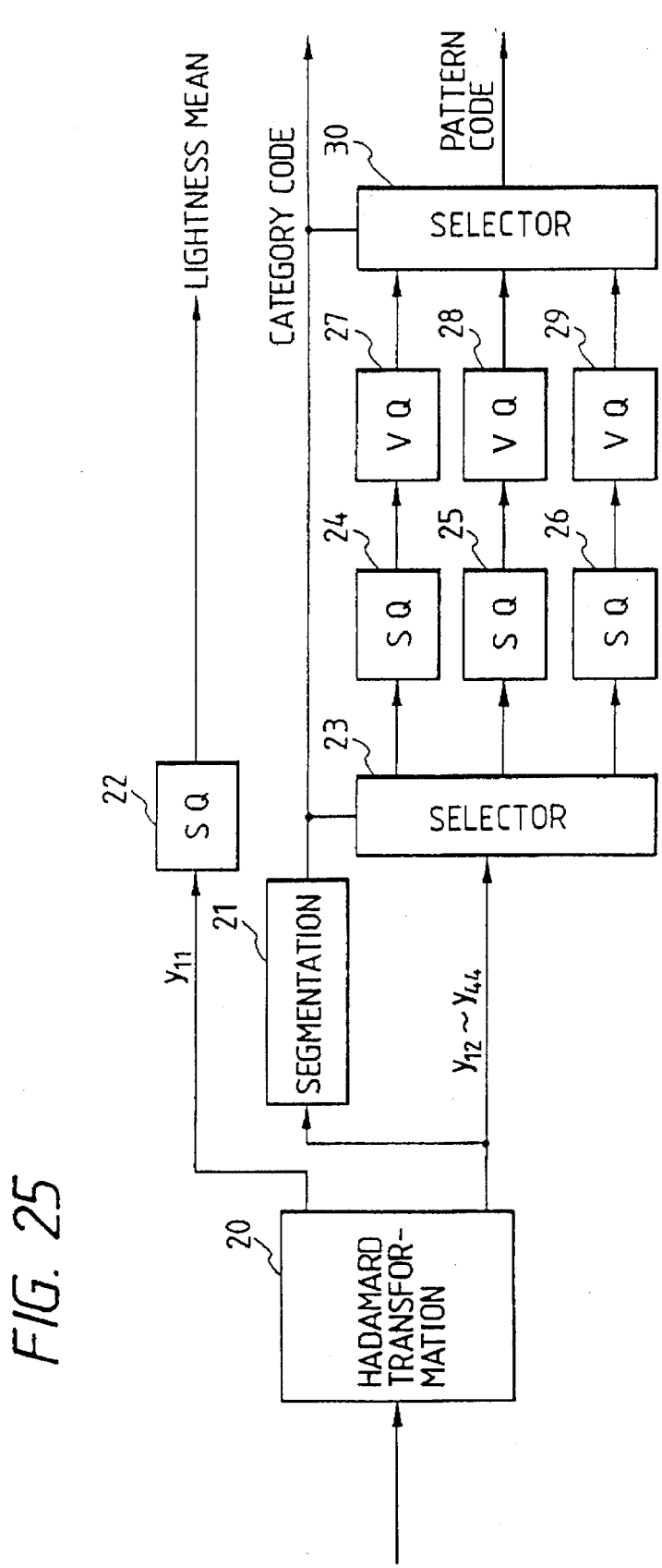

A sixth embodiment of coding will be described below. FIG. 25 is a block diagram showing an image information coding apparatus for coding image information by using code books generated by the above-mentioned code book generation method according to the sixth embodiment.

The image information coding apparatus includes an Hadamard transformation unit 20 which is identical with the orthogonal transformer of the first embodiment. A selector 23 selects one of the quantization units which corresponds to a category code output from a segmentation section 21 for performing category distribution. A scalar quantizer (SQ) 22 scalar-quantizes an element $y_{11}$ representing a mean value in the block. Scalar quantizers (SQ) 24, 25, and 26 perform scalar quantization operations suitable for the respective categories. These scalar quantizers are equivalent to that of the first embodiment. Vector quantizers (VQ) 27, 28, and 29 are suitable for the respective categories. A selector 30 selects an output corresponding to a block subjected to processing from outputs from the vector quantizers of the respective categories in accordance with the category code from the segmentation section 21. The selector 30 is operated in the same manner as the selector 23. The segmentation section 21 calculates several types of feature amount from outputs from the Hadamard transformation unit 20 in units of blocks, extracts features of pixels within each block, and classifies categories having identical features.

Figures 26, 27A, 27B:
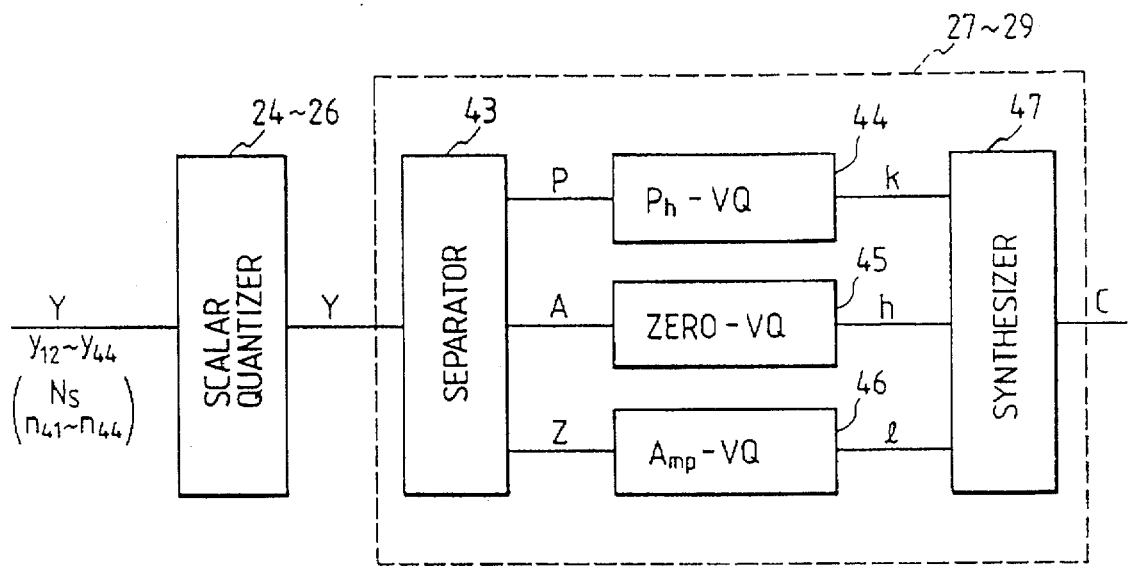
FIG. 26 is a detailed block diagram showing part of the coding apparatus shown in FIG. 25.
FIGS. 27A and 27B are formats showing data coded by the coding apparatuses of the sixth and seventh embodiments, respectively.

Such coding is performed to obtain coded data consisting of a lightness mean value, a category code representing the type of category, and a pattern code representing the Hadamard transformation pattern in the block, as shown in FIG. 27A.

The vector quantizers 27 to 29 transform Hadamard transformation results Y into vectors, and scalar quantization results $Y_s$ into vectors. An arrangement of the vector quantizer 27, 28, or 29 is shown in FIG. 26.

The vector quantizer surrounded by the broken line in FIG. 26 is equivalent to that of the first embodiment (FIG. 1), and a description thereof will be briefly made. A separator 43 separates each scalar quantization result from the scalar quantizer 24, 25, or 26 into the following pieces of information:

Phase information P, each element value of which is positive, negative or 0;

Zero information Z, each element value of which is zero or not; and

Amplitude information A, each element value of which is an absolute value.

The information P, the information Z, and the information A are defined as follows:

$$P=[p_{12},p_{13},p_{14},p_{21}, \ldots, p_{24},p_{31}, \ldots, p_{34}, p_{41}, \ldots, p_{44}]^T$$

$$Z=[z_{12},z_{13},z_{14},z_{21}, \ldots, z_{24},z_{31}, \ldots, z_{34}, z_{41}, \ldots, z_{44}]^T$$

$$A=[a_{12},a_{13},a_{14},a_{21}, \ldots, a_{24},a_{31}, \ldots, a_{34}, a_{41}, \ldots, a_{44}]^T$$

An element $y_{sij}$ (i=1, . . . 4, j=1, . . . 4, and i,j≠1) is given by:

$$y_{sij}=p_{ij} \times a_{ij} \times z_{ij}$$

The separated pieces of information are respectively supplied to vector quantizers, i.e., a Ph-VQ 44, a zero-VQ 45, and an Amp-VQ 46. The ph-VQ 44, the zero-VQ 45, and the Amp-VQ 46 output index codes k, h, and l to a synthesizer 47 for synthesizing these index codes, thereby obtaining a pattern code (FIG. 27A). The code books used in the previous embodiments can be applied to those of the coding apparatus of the sixth embodiment. However, in view of vector quantization in accordance with categories in the sixth embodiment, code books suitable for the sixth embodiment are obtained by changing the contents (e.g., a weighting order, and a position of an element subjected to round-off) of the "round-off" rules previously described.

(Seventh Embodiment of Coding)

Figure 28:
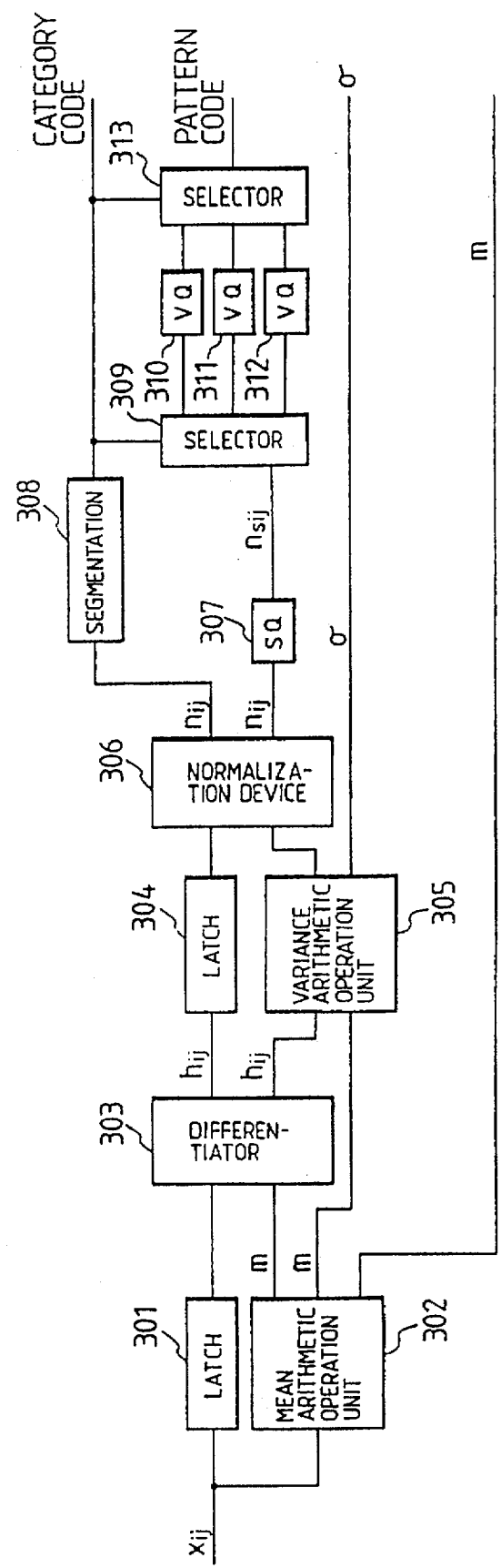

FIG. 28 is a block diagram of an image information coding apparatus according to a seventh embodiment. In the seventh embodiment, image information is normalized by a predetermined method. Vector quantization of a normalized value $n_{ij}$ is performed according to the types of category.

The image information coding apparatus comprises a mean arithmetic operation unit 302, a differentiator 303, a variance ($\delta$) arithmetic operation unit 305, and a normalization device 306. All these circuit components calculate the normalized value $n_{ij}$. The image information coding apparatus also includes a scalar quantizer (SQ) 307, a segmentation section 308, selectors 309 and 313, and vector quantizers (VQ) 310 to 312. These vector quantizers are equivalent to those shown in FIG. 26. Latches 301 and 304 are used to synchronize processing in units of blocks.

The normalized value is calculated as follows. The mean arithmetic operation unit 302 calculates a mean value m in the block. The differentiator 303 calculates a difference $h_{ij}$ between each pixel value $x_{ij}$ and the mean value m:

$$h_{ij}=x_{ij}-m$$

The variance arithmetic operation unit 305 calculates a variance $\delta$ by using the difference $h_{ij}$ and the mean value m in the block:

$$\delta=(\Sigma h_{ij}^2/16)^{1/2}$$

The normalization device 306 divides each difference $h_{ij}$ by the variance $\delta$ to obtain the normalized value $n_{ij}$:

$$n_{ij}=h_{ij}/\delta$$

The normalized value $n_{ij}$ has a positive or negative value. This value is quantized into a scalar value by the scalar quantizer 307. The scalar value is transformed into a vector by the vector quantizer, thereby obtaining a code (klh) of the pattern of the normalized value in the block.

The vector quantizer 310, 311 or 312 vector-quantizes the pattern representing the intrablock position of the scalar-quantized normalized value $n_{sij}$ to obtain a code. The arrangement of this vector quantizer is shown in FIG. 26.

As described above, the normalized value $n_{ij}$ is a positive or negative value. This value is quantized into the scalar value by the scalar quantizer 307 to obtain a code having a (2n+1) value. For illustrative convenience, the value $n_{sij}$ is five-value data. Therefore, the scalar-quantized result $n_{sij}$ corresponding to each pixel of the scalar quantizer 307 represents value $-2, -1, 0, 1$, or 2.

As described with reference to the sixth embodiment, the vector quantizers 310 to 312 receive the scalar-quantized result $n_{sij}$ and separates it into the following three pieces of information:

Phase information P representing a positive value, a negative value, or zero;

Zero information Z representing whether the result $n_{sij}$ is zero; and

Amplitude information A representing the absolute value (0 1, or 2) of the result $n_{sij}$.

Vector quantization of the information P, the information Z, and the information A is the same as that as described above. As a result, pattern codes k, h, and l can be output.

As shown in FIG. 27B, the lightness mean value m in the block, the variance $\delta$ in the block, the category code, and the pattern codes k, h, and l representing the position of the normalized value are obtained as coded results.

The pixel-corresponding value $n_{sij}$ of the scalar quantization result $N_s$ is represented by:

$$n_{sij}=p_{ij}\times a_{ij}\times z_{ij}$$

Decoding of the coded result can be performed by the above equation.

(Second Method of Generating Code Book)

In the seventh embodiment, the scalar-quantized normalized value $n_{sij}$ is transformed into a vector. The first method of generating the code book cannot be used without modifications.

In order to generate a code book suitable for the seventh embodiment, the respective pieces of information in the training sequence are extracted from an output $N_s$ of the scalar quantizer 307.

Input patterns in the training sequence are distributed into patterns having a 90° rotation relationship, and patterns having a mirror image relationship. For example, if input patterns shown in FIG. 29 are to be processed, patterns (b) to (h) are represented by a pattern (a) in FIG. 29.

The segmentation section 308 detects general layout in the block with reference to the coded information $n_{ij}$ as the normalized result and distributes the input patterns having the similar structures into identical categories in the training sequence. The general layout is defined as a structure of each category shown in FIG. 30. In category distribution, the mark "*" represents "−" or "0". The selectors 309 and 313 are switched in response to an output from the segmentation section 308 in accordance with the general layout of the scalar-quantized normalized value $n_{sij}$ in the block, thereby performing optimum vector quantization in each category.

Generation of a code book in a category, the general layout of which is represented in (a) in FIG. 30, will be described below.

Generation of a code book of phase information P is the same as that of the first method. In this case, $y_{11}, y_{12}, y_{13}, y_{14}, y_{21}, y_{22}, y_{23}, y_{31}, y_{32}$, and $Y_{41}$ are not subjected to "round-off" due to the reasons described in the first method of generating the table. Weighting is performed based on dependency of the initial image on a simple image, and "round-off" is performed in an order of lightly weighted elements.

Weighting for the category (a) in FIG. 30 is performed in the following order:

$$y_{23}=y_{32}<y_{14}=y_{41}<y_{22}=y_{33}$$

The order of weighting varies depending on the categories.

The method of "round-off" follows the first method of generating the code book.

Generation of a code book for vector quantization of the zero information Z will be described below.

A table of zero information Z is generated and "round-off" of elements is performed. In "round-off" of the zero information Z, $y_{11}, y_{12}, y_{13}, y_{34}, y_{43}$, and $y_{44}$ are not subjected to "round-off". Weighting is performed based on the above-mentioned dependency and "round-off" is performed in an order of lightly weighted elements in the same manner as in the phase information.

For example, an order of weighting is defined as follows:

$$y_{23}=y_{32}<y_{14}=y_{41}<y_{22}=y_{33}<y_{31}=y_{13}=y_{42}=y_{24}$$

The "round-off" method follows the first method of generating the code book.

Generation of a code book for vector quantization of the amplitude information A will be described below. This is the same as in the first method. The order of mask weighting is given as follows:

$$y_{23}=y_{32}<y_{14}=y_{41}<y_{22}=y_{33}<y_{31}=y_{13}=y_{42}=y_{24}$$

In this case, the elements $y_{11}$, $y_{12}$, $y_{21}$, $y_{34}$, $y_{43}$, and $y_{44}$ are not subjected to "round-off".

Therefore, optimum code books for coding of the seventh embodiment are obtained.

(Other Modifications)

In the seven embodiments of coding described above, the Hadamard transformation is used as the orthogonal transformation in view of simple operations and simple hardware arrangements. However, other orthogonal transformation techniques (e.g., discrete cosine transformation and slant transformation) capable of separating the input data into phase information and amplitude information or phase information, amplitude information, and zero information may be employed in preprocessing. In addition, the Hadamard matrix, the block size, the order of weighting, category segmentation, and the like are not limited to the ones described in the above embodiments.

In the vector quantization unit, scalar quantization is performed before the input data is separated into the amplitude and phase components. However, scalar quantization may be performed for the separated amplitude information.

The coded data is obtained by using the synthesizer. However, a vector quantizer may be arranged between the amplitude information and the phase information to perform suppression of redundancy.

In each of the above embodiments, the block size is a 4×4 pixel matrix. Each pixel data of a monochromatic image is 8-bit data and color pixel data comprise a total of 24-bit data. However, the block size and the data length are not limited to these. The hardware arrangements are not limited to the ones in the above embodiments.

In the above embodiments, color information inputs are R, G, and B signals. However, the color components are not limited to these. The Y, I, and Q signals are used as a signal system consisting of the luminance signal and the two color difference signals. However, space information such as a CIE 1976 L*-a*-b* or L*-u*-v* color system may be used.

In the above embodiments, the color information is separated into luminance and color difference signals which are then coded. However, coding of each input signal can be performed.

In the above embodiment, the Hadamard-transformed elements $y_{11}$ and $a_{11}$ are not subjected to vector quantization. However, vector quantization of the elements including the elements $y_{11}$ and $a_{11}$ may be performed.

The image information is not limited to any specific type such as a color image. In category segmentation, parameters for determining category separation are not limited to inter-block or intrablock parameters.

In the second embodiment, the quantization result of the noncode information Z is superposed on the amplitude information. However, the quantization result of the noncode information Z may be superposed on the phase information P.

In particular, in the method of generating the code book in the above embodiments, the input data is separated into the phase information P, the amplitude information A, and the zero information Z after preprocessing. However, the following modification may be employed. The input data may be separated into phase information P and amplitude information A including zero information Z. Generation of the code book of the phase information P is performed in the same manner as in the above embodiments. In the case of the amplitude information A, the following rule (6) is added to basic rules (1) to (5) of round-off to generate code books of the respective pieces of information.

Rule (6) is defined as follows. A nonzero coefficient is set to be zero to round off a pattern, but a zero coefficient is not rounded off into a nonzero pattern.

According to the image information coding apparatuses of the embodiments as has been described above, vector quantization is performed in addition to scalar quantization in units of m×n blocks, so that coding can be performed with high efficiency. Therefore, redundancy can be greatly reduced.

In coding of the embodiments described above, no phase inversion occurs between the phase information prior to coding and the phase information after decoding. Therefore, great degradation of an edge shape in the block does not occur because the edge shape mainly depends on a code and inversion between the positive and negative codes is prevented. Therefore, even if a general document image and a photographic image are coded, degradation is reduced.

As a result of coding, coding of a fixed length can be performed. Editing of an image can be facilitated at high speed. Image information in a compressed state can be processed. For example, the pattern code of the input phase information P is replaced with codes obtained by inverting the positive and negative codes or signs of the elements of the phase information P, and the mean value in the block is subtracted from the maximum value, thereby performing bright inversion between the negative and positive images at high speed.

According to the method of generating the code books in the above embodiments, the processed coefficients are separated into phase information and amplitude information or phase information, amplitude information, and zero information. The resultant pieces of information are vector-quantized. In generation of the code books for obtaining a coded result, the code book which rarely includes zero is generated for the phase information, the code book in which element values of the output pattern are not smaller than those of the input pattern is generated for the zero information, and the code book for outputting a pattern similar to the input pattern is generated for the amplitude information. Therefore, coding free from visual degradation of the image can be performed.

In a hardware arrangement, the code books can be generated by separating the input information into two or three pieces of information (P and A, or P, Z, and A), e.g., by reducing the number of address lines even if each quantizer is made of a ROM, thereby reducing the hardware capacity.

In a system for coding image information according to the embodiments as has been described above, the preprocessed data is separated into a plurality of components, and the components are independently coded to improve coding efficiency without causing great degradation of the multi-value data of the image.

As has been described above, in order to effectively perform vector quantization, an image is subjected to orthogonal transformation in units of blocks. Correlation of the transformed image is utilized to perform vector quantization. That is, the transformed components in the block are defined as elements of vectors which are then vector-quantized. However, vector quantization poses the following problem. That is, when the number of dimensions of the vector is increased, the number of calculations for obtaining optimum reproduction vectors becomes abundant. The number of calculations for selecting the optimum reproduction vectors of the image also becomes abundant. In order to obtain hardware arrangements of these calculations, a large LUT (Look-Up Table) is required.

The vector elements in the block are divided by a plurality of frequency bands to reduce the number of vector dimensions, and vector quantization is performed in units of bands to be described below.

However, if such band division is performed at a predetermined division rate, inconvenience may occur depending on the characteristics of image blocks. For example, a power of a specific vector is extremely low in an image block having a low frequency. Powers of the respective elements in the vector are locally concentrated in an image (e.g., a line image) having directivity, resulting in inconvenient vector quantization.

An image information processing apparatus for performing high-quality vector quantization using a relatively small look-up table at a high compression ratio will be described below.

An eighth embodiment of the present invention will be described in detail with reference to the accompanying drawings.

The eighth embodiment will be generally described. This embodiment is based on the following assumption. When an information source such as an image having a high correlation is frequency-analyzed, powers tend to be concentrated on the low-frequency components. This nature is utilized and an image is transformed into frequency regions in units of blocks. In particular, the low-frequency components are coded to perform highly efficient coding.

However, in order to perform frequency analysis to obtain a sufficiently high correlation, a transformation block size must be relatively large. Therefore, when the transformed block is vector-quantized without processing, a vector quantization LUT (Look-Up Table) must have an extremely large capacity.

This embodiment solves the above problem on the basis of the following two ideas. The correlation of the image is utilized to perform the orthogonal transformation, and the elements are distributed into categories in units of blocks in accordance with the magnitude of the frequency. In addition, an image in the category is adaptively band-divided, and the divided regions are vector-quantized to reduce the number of dimensions of the vector. That is, category distribution and band division allow reduction of the capacity of the LUT in a hardware arrangement. In addition, band division is performed in accordance with the characteristics of the image, and necessary orthogonal transformation components are vector-quantized in accordance with the types of image.

In this embodiment, the orthogonally transformed blocks are subjected to category distribution in accordance with the magnitude of the frequency. A smaller number of vectors is assigned to a category having a low frequency, and a larger number of vectors is assigned to a category having a high frequency. Therefore, a higher resolution can be obtained for an image having a higher frequency. At the same time, good gradation can be obtained for an image having a low frequency. Moreover, band division is performed to reduce the number of dimensions of the vector to improve efficiency of vector quantization. In band division, the number of dimensions of the vector of the low-frequency band is set to be smaller than that of the high-frequency band. In this manner, vector quantization for especially weighting the low-frequency component is performed to obtain high coding efficiency which cannot be achieved by the conventional techniques.

Figure 31:
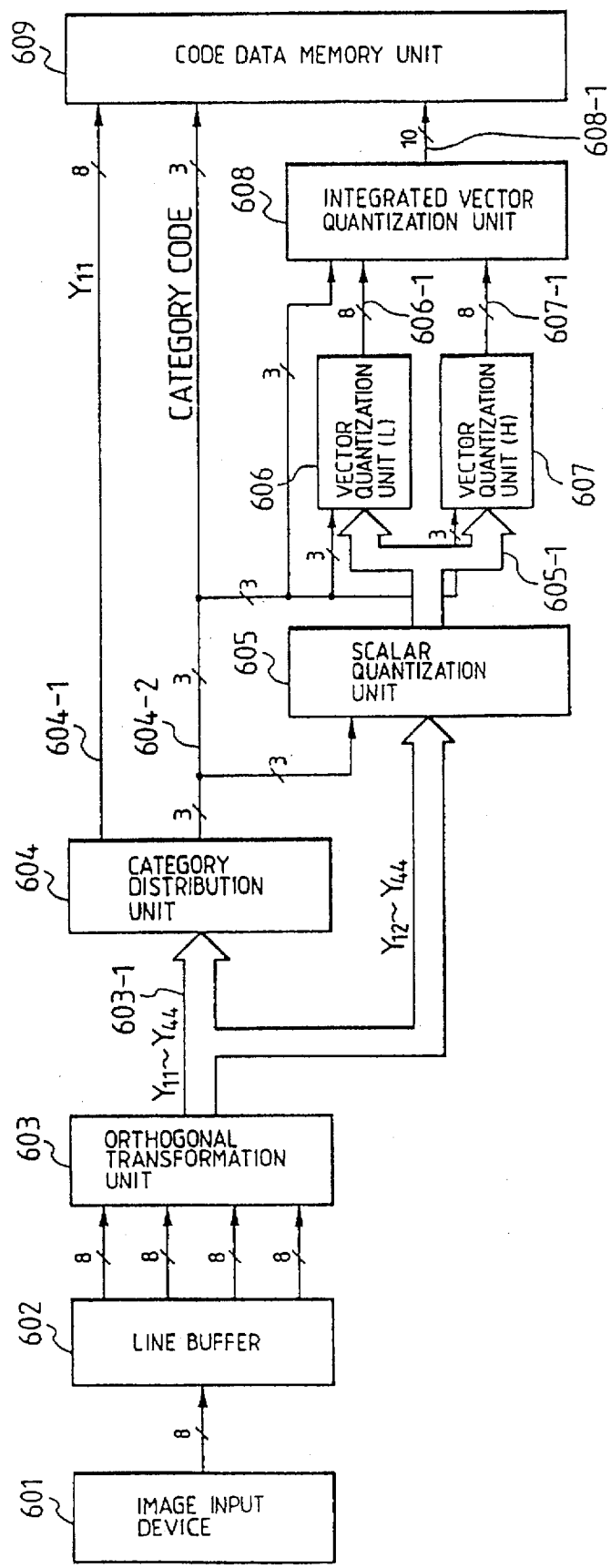
FIG. 31 is a block diagram of an image information processing apparatus according to an eighth embodiment.

FIG. 31 is a block diagram of the image information processing apparatus of the eighth embodiment. Referring to FIG. 31, the processing apparatus includes an image input device 601 for receiving digital image data having a density of 8 bits and a resolution of 16 pixels/mm. A line buffer 602 is connected to the image input device 601. The line buffer 602 stores digital image data of every four lines input along the read scanning line and sequentially outputs parallel block image data. In this case, each block has 4×4 pixels.

Figures 32A, 32B, 33:
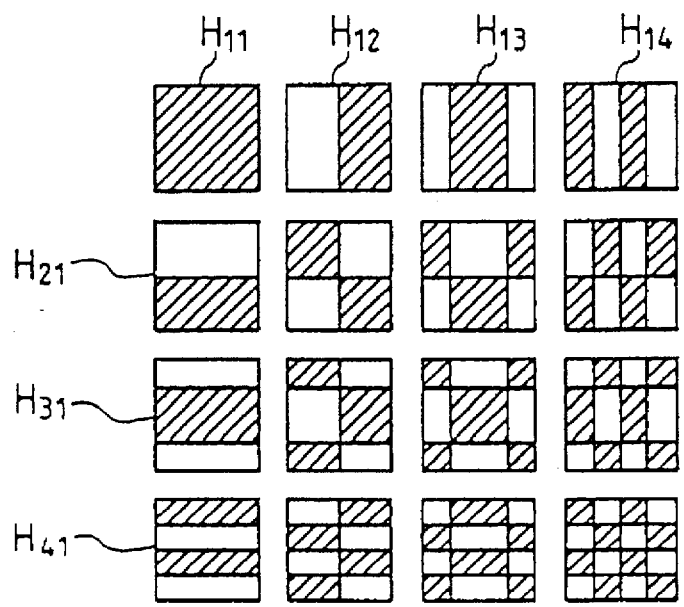
FIG. 32A is a matrix showing block image data $X_1$, $X_2$, ... $X_{16}$ input to an orthogonal transformation unit 603.
FIG. 32B is a matrix showing vector data (sequence components) $Y_{11}$, $Y_{12}$, ... $Y_{44}$ Hadamard-transformed by the orthogonal transformation unit 603.
FIG. 33 shows two-dimensional Walsh transformation patterns employed in Hadamard transformation of the eighth embodiment.

An orthogonal transformation unit 603 is connected to the 8-bit output terminals of the line buffer 602 and performs Hadamard transformation in a 4×4 matrix in this embodiment. FIG. 32A shows block image data $X_1, X_2, \ldots, X_{16}$ (8-bit data each) input to the orthogonal transformation unit 603. FIG. 32(B) shows vector data (sequence components) $Y_{11}, Y_{12}, \ldots Y_{44}$ (10-bit data each) Hadamard-transformed by the orthogonal transformation unit 603. FIG. 33 shows two-dimensional Walsh transformation patterns employed in the Hadamard transformation in this embodiment. Referring back to FIG. 31, a category distribution unit 604 is connected to the output of the orthogonal transformation unit 603. The category distribution unit 604 detects powers and the like of the predetermined sequence components in the block and distributes the image blocks into eight categories (eight features of the image blocks). The category distribution unit 604 extracts a DC component $Y_{11}$ of sequence components $Y_{11}$ to $Y_{44}$ in the block and outputs the DC component $Y_{11}$ without processing.

A scalar quantization unit 605 inputs the sequence components $Y_{12}$ to $Y_{44}$ except for the DC component $Y_{11}$. According to a conventional technique, 15 sequence components $Y_{12}$ to $Y_{44}$ are scalar-quantized by a proper number of bits to obtain 15-dimensional vector elements. These elements are quantized. However, a very large look-up table (LUT) is required, resulting in an impractical application. In general, the information source such as an image having a high correction is frequency-analyzed, the powers are concentrated on the low-frequency components. By utilizing this nature, the image is transformed into frequency regions in units of blocks, and coding is concentrated on the low-frequency components, thereby performing highly efficient coding. However, in order to obtain a sufficiently high correlation by frequency analysis, the size of the orthogonally transformed block must be relatively large. Therefore, the number of dimensions of the vector data generated by this transformation is increased. When the vector data are simultaneously quantized, a very large LUT is required. The scalar quantization unit 605 in this embodiment band-divides the input sequence components $Y_{12}$ to $Y_{44}$ into predetermined sequence components (low sequence components) having low frequencies and predetermined sequence components (high sequence components) having high frequencies. Scalar quantization of each band is performed by using predetermined numbers of bits. The quantized low sequence vector elements and the quantized high sequence vector elements are supplied to separate vector quantization units (LUTs).

A vector quantization unit (L) 606 is connected to the outputs of the category distribution unit 604 and the scalar quantization unit 605. The vector quantization unit (L) 606 vector-quantizes low sequence vector elements formed by the category distribution data. A vector quantization unit (H) 607 is connected the outputs of the category distribution unit 604 and the scalar quantization unit 605. The vector quantization unit (H) 607 vector-quantizes the high sequence vector elements formed by the category distribution data. In order to perform vector quantization in this embodiment, 256 reproduction low sequence vector elements and 256 reproduction high sequence vector elements are collected on the basis of the training sequence performed using different types of typical images. The 256 reproduction high or low sequence vector components are associated with 8-bit vector quantization code data, respectively. The vector quantization unit (L) 606 or (H) 607 compares the input low or high sequence vector elements with the 256 reproduction low or high sequence vector components obtained by the training sequence to store in a look-up table (LUT) 8-bit vector quantization code data which exhibits a minimum distortion. The high or low sequence vector elements have different sequence components in units of categories, as will be described later. The category distribution code data is input from the category distribution unit 604 to the vector quantization unit (L) 606 and the vector quantization unit (H) 607, respectively, through signal lines 604-2. Therefore, different LUTs prepared in units of categories are selectively used. The predetermined sequence vector in the block is transformed by the vector quantization unit (L) 606 and the vector quantization unit (H) 607 into 8-bit vector quantization code data which are then output onto signal lines 606-1 and 607-1.

An integrated vector quantization unit 608 integrates the 8-bit vector quantization code data obtained by quantizing the low and high sequence vector elements to generate 10-bit integrated code data. A code data memory unit 609 stores upper eight bits of the sequence component $Y_{11}$ (i.e., the DC component) on signal lines 604-1, three bits of the category distribution code on the signal lines 604-2, and the 10-bit integrated vector quantization code data on signal lines 608-1.

FIG. 34 is a view showing an information structure of the block coded code of this embodiment. Referring to FIG. 34, the code consists of 21 bits. Eight bits of the integrated code data from the MSB are assigned as data of the sequence component $Y_{11}$ (mean value). The next three bits are assigned as the category distribution code data. The next 10 bits are assigned as code data of predetermined sequence components except for $Y_{11}$. The digital image data of 128 (=4×4 (pixels)×8 (bits)) bits per block is compressed into the block coded data having a fixed length of 21 bits. The data compression ratio is about 1/6.

FIG. 35A is a view for explaining the principle of a category distribution method of this embodiment. Category distribution of this embodiment is performed by the magnitude of the power on the basis of the predetermined sequence components having low frequencies. When various block image data are generally Hadamard-transformed and their frequency components are checked, sequence components having lower powers are concentrated on the edge portion of the image, and their absolute values are large. An edge amount ED is defined as follows in this embodiment by utilizing the above nature:

$$ED=|Y_{12}|+|Y_{13}|+|Y_{21}|+|Y_{22}|+|Y_{31}|$$

Figure 36A:
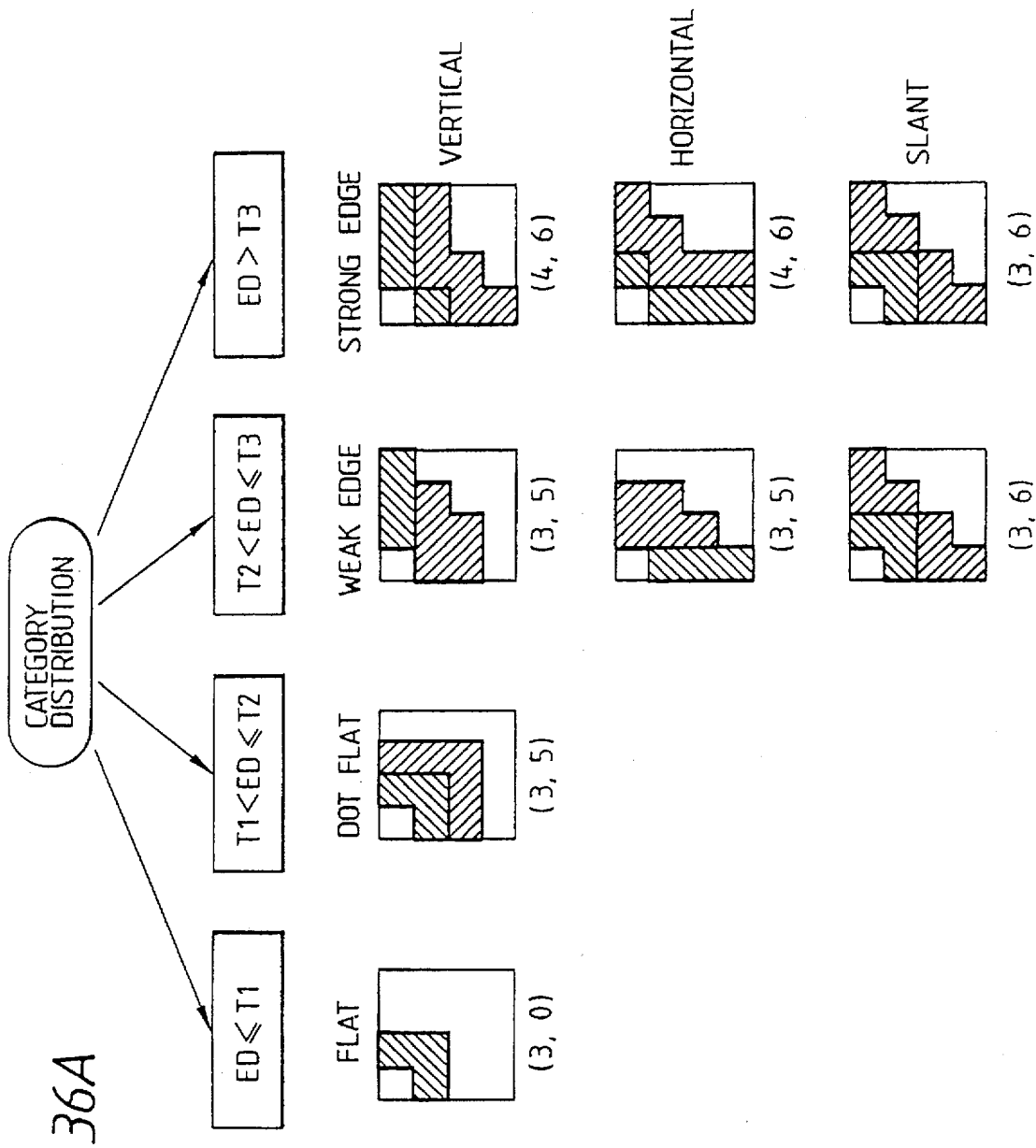
FIG. 36A is a detailed view showing the category distribution method of the eighth embodiment.

FIG. 36A is a view showing detailed procedures of the category distribution method of this embodiment. Three threshold values are set to satisfy inequality T1<T2<T3 according to statistical techniques. If ED≦T1, then a flat portion is detected. T1<ED≦T2, then a dot flat portion is detected. If T2<ED≦T3, then a weak edge portion is detected. If T3<ED, then a strong edge portion is detected. In addition, the weak and strong edge portions further include horizontal, vertical, and slant patterns, thereby providing a total of eight category distribution patterns, as shown in FIG. 36A.

FIGS. 35B and 35C show methods of distributing weak and strong edge patterns. In an image having a strong edge in the vertical direction, the power of a hatched area in FIG. 35B is increased. In an image having a strong edge in the horizontal direction, the power of the hatched portion in FIG. 35C is increased. This embodiment utilizes this nature, so that vertical and horizontal edge amounts VE and HE are defined as follows:

$$VE=|Y_{12}|+|Y_{13}|+|Y_{14}|$$

$$HE=|Y_{21}|+|Y_{31}|+|Y_{41}|$$

By utilizing these equations, the weak and strong edge portions are further distributed into three categories. That is, if |VD|−|HE|>E1 and |VE|≧|HE|, then a vertical edge is detected. However if |VE|−|HE|>E1 and |VE|<|HE|, then a horizontal edge is detected. Otherwise, a slant edge is detected. In the above relations, E1 is a constant. If the weak edge constant and the strong edge constant are defined as E1 and E2, respectively, the parameters E1 and E2 are determined to satisfy inequality E1<E2.

Hatched portions in FIG. 36A are sequence components without being masked according to the corresponding categories. The positions of these portions correspond to those of the sequence components in FIG. 35. Referring to FIG. 36A, the hatched sequence components are band-divided into sequence components having low frequencies (portions hatched upward to the right) and sequence components having high frequencies (portions hatched downward to the right). Numeric values within parentheses are numbers of dimensions when the category patterns are regarded as low sequence vector elements and high sequence vector elements. The category representing a flat portion includes only the low sequence vector elements $Y_{12}$, $Y_{21}$, and $Y_{22}$, i.e. three-dimensional vector elements, which are then coded into any one of 1024 (10 bits) vector quantization code data. In categories except for the category of the flat portion, low and high sequence vector elements are present. These vector elements are coded into any one of 256 (8 bits) vector quantization code data. In this embodiment, the number of dimensions of the sequence vector is increased when the edge component is stronger so as to emphasize a resolution component. However, the number of gradation or gray scale levels is increased for the category of flat portion.

Figure 36B:
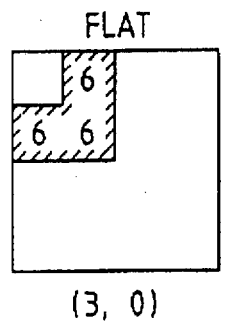
FIG. 36B is a view showing scalar-quantized bit distributions of low and high sequence components defined in units of categories of the eighth embodiment.
Figure 36B:
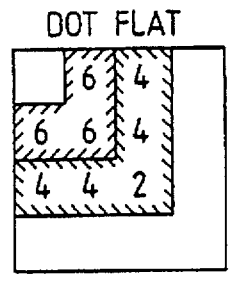
Figure 36B:
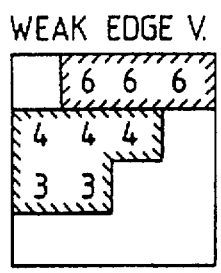
Figure 36B:
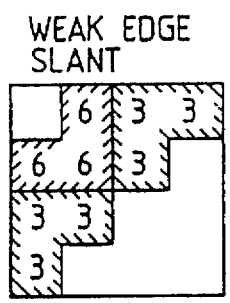
Figure 36B:
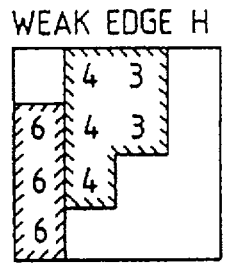
Figure 36B:
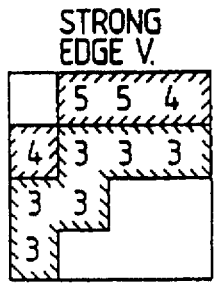
Figure 36B:
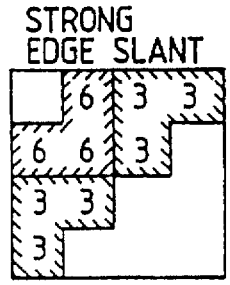
Figure 36B:
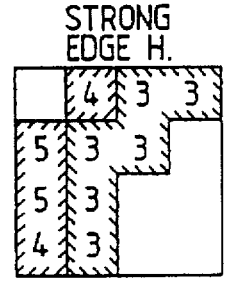

FIG. 36B shows bit layout of scalar quantization of the low and high sequence elements defined in units of categories. Each of the scalar-quantized low and high sequence vectors has a fixed length of 18 bits. The number of dimensions of the vector of the low sequence vector is smaller than that of the high sequence vector. The number of bits is increased for a sequence element having a lower frequency. Therefore, coding is performed such that gradation of the low-frequency component of the image has priority over the resolution thereof.

FIG. 37 is a block diagram showing only a vector quantizing means of this embodiment. The 18-bit low sequence vector and the 18-bit high sequence vector which are band-divided in units of categories are input to the vector quantization units (L) 606 and (H) 607, respectively. Each of the vectors is coded into one of 256 8-bit quantization code data by the corresponding quantization unit. At the same time, the vector quantization units 606 and 607 receive 3-bit category distribution code data. Therefore, the vector quantization units (L) 606 and (H) 607 can be constituted by LUTs each of which receives 21-bit data and generates 8-bit quantization code data.

Figure 38:
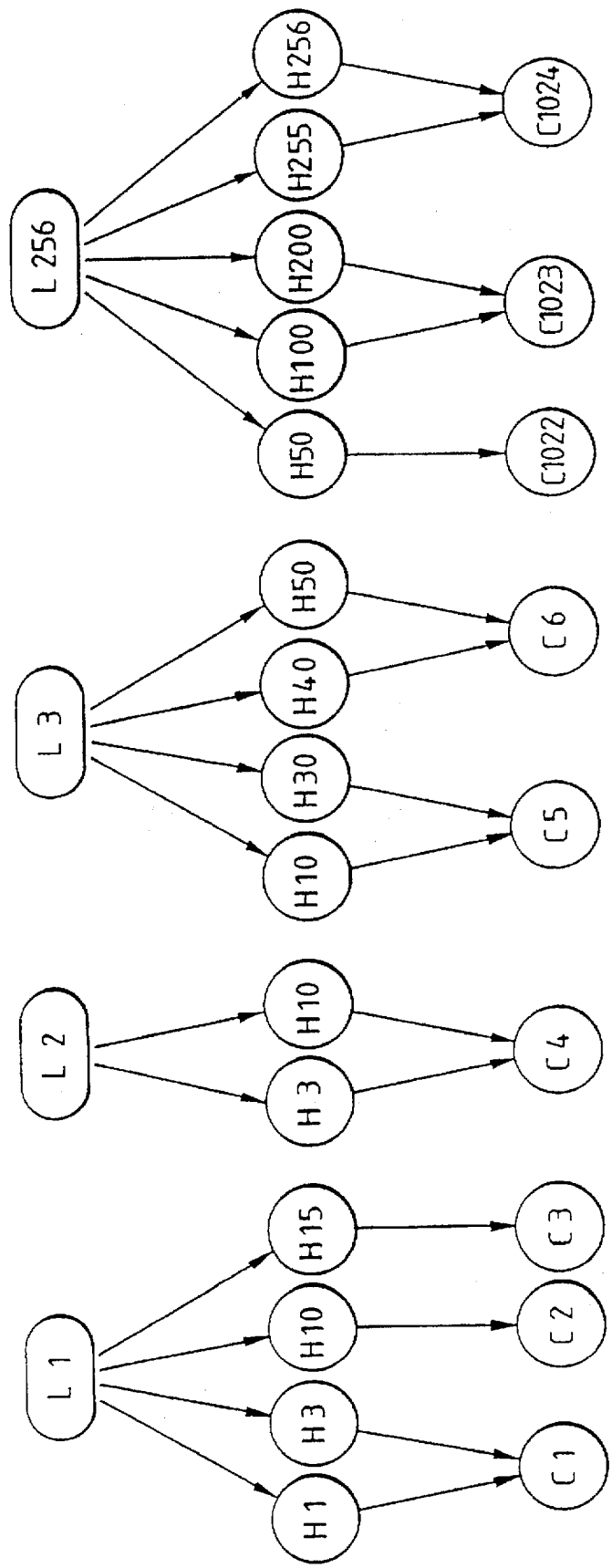
FIG. 38 is a view showing an operational principle of an integrated vector quantization unit 608 of the eighth embodiment.

FIG. 38 is a view showing the principle of operation of the integrated vector quantization unit 608 of this embodiment. Referring to FIG. 38, the vector quantization code data of the low sequence vectors are given as L1, L2, ... L256, and the vector quantization code data of the high sequence vectors are represented by H1, H2, ... H256. Therefore, the number of combinations of the vector quantization code data of the low and high sequence vectors is 256 or more. However, the correlation of the general image is taken into consideration, a correlation is present between the low and high sequence vectors, so that all possible combinations are not available, i.e., 65,536 (=256×256). When sample images are analyzed in a training sequence. For example, possible combinations given between the upper and middle rows in FIG. 38 are obtained, and vector quantization of these combinations having similar distortion values is performed under the condition that the number of all combinations is 1024 (10 bits). Finally, integrated (combination) vector quantization codes (10 bits) C1 to C1024 are prepared. In order to realize this, an LUT can be employed to generate 10-bit integrated vector quantization code data according to a vector quantization method using the 8-bit low sequence vector quantization code data, the 8-bit high sequence vector quantization code data, and the 3-bit category distribution code data.

A method of obtaining a reproduction vector of this embodiment will be described below. In this embodiment, a plurality of sample images having different frequencies are scanned and read to obtain optimum reproduction vectors by a known LBG method in units of categories and band divisions which are described with reference to FIGS. 35A to 36B. A training sequence is performed in the same manner as in FIGS. 31 to 38 to obtain a predetermined code length (21 bits in this embodiment). In this case, there is no hardware limitation in the training sequence. In practice, an optimum solution of the reproduction vector is obtained by computer simulation. After the sample image data is transformed, scalar quantization described with reference to FIG. 36B is not performed. Instead, the sequence vector elements in units of categories, as described with reference to FIG. 36A, are extracted. The extracted vector elements are band-divided into low and high sequence vectors, thereby obtaining optimum reproduction vectors according to the LBG method. Therefore, scalar quantization errors in FIG. 36B do not adversely affect design of the optimum reproduction vectors.

At the time of design of optimum reproduction vectors, the category distribution parameters T1, T2, and T3 based on the edge amount ED described with reference to FIG. 36A are determined as follows. A plurality of sample images are used to determine four categories according to the parameters T1, T2, and T3 of FIG. 36A. In this case, the number of blocks each having 4×4 pixels is defined as follows:

Category: Flat
If ED≦T1, then B1
Category: Dot Flat
If T1<ED≦T2, then B2
Category: Weak Edge
If T2<ED≦T3, then B3
Category: Strong Edge
If ED>T3, then B4

The parameters T1, T2, and T3 are determined to satisfy condition B1>B2>B3>B4. When vector quantization is performed in units of categories and the edge portion becomes strong, the above method is proposed to prevent abnormal expansion of the Euclidean space of vectors. That is, since the number of reproduction vectors in units of categories is determined, the above method is used to prevent an abnormal increase in errors of the reproduction vectors with respect to the input image. Furthermore, since a flat portion of the image is frequently used, the above method is employed to prevent optimum solutions reproduction vectors from being concentrated on the flat portion.

Figure 39:
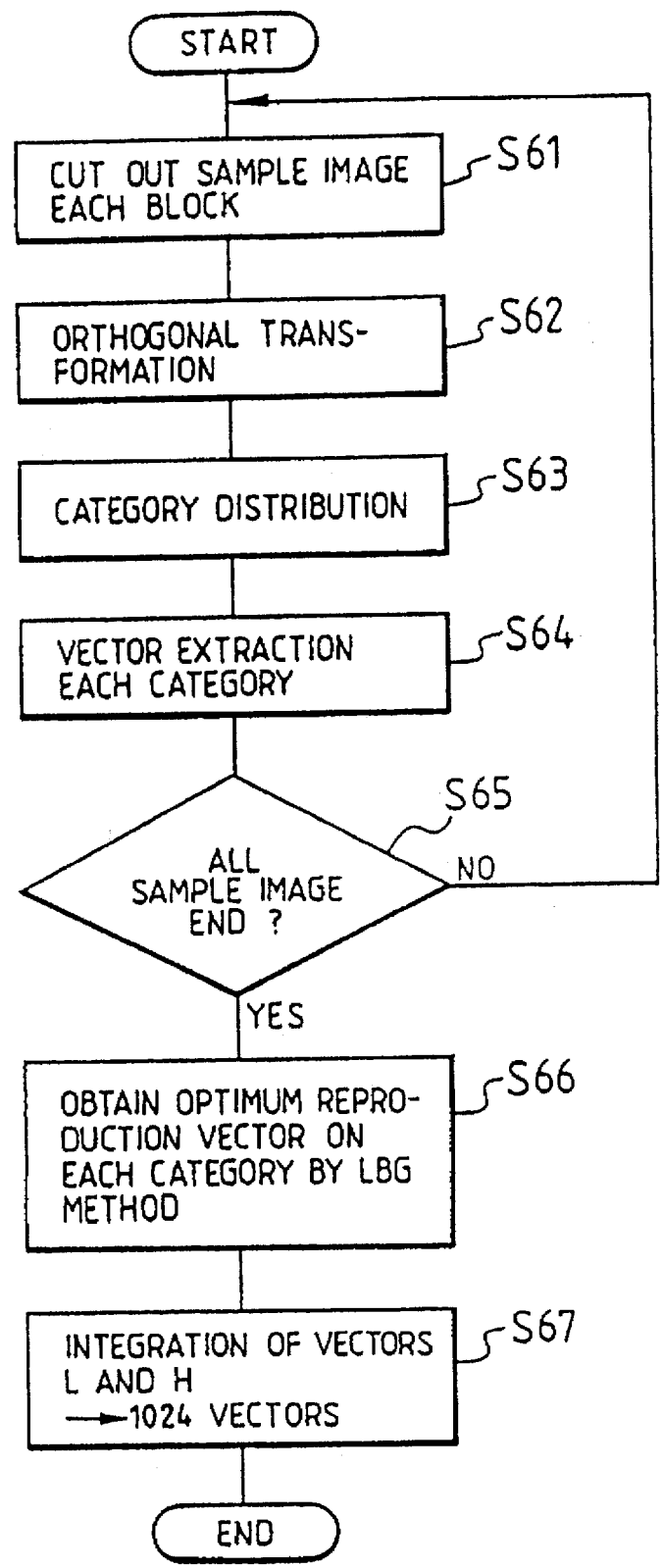
FIG. 39 is a flow chart for explaining calculations of reproduction vectors.

FIG. 39 is a flow chart showing a method of obtaining a reproduction vector of this embodiment. Referring to FIG. 39, in step S61, a sample image is cut out or extracted in units of blocks each having 4×4 pixels. In step S62, the orthogonal transformation is performed (the Hadamard transformation in this embodiment). In step S63, category distribution is performed using orthogonally transformed sequence data $Y_{11}$ to $Y_{44}$ with reference to the edge amount ED in units of blocks. In step S64, band division is performed in units of categories to extract the low and high sequence vectors, as shown in FIG. 36A. In step S65, the steps from step S61 to step S64 are repeated until all sample images (several typical images having different frequencies in this embodiment) are completely scanned, sample vectors of the low and high sequence vectors in units of categories are formatted into tables. In step S66, 256 optimum vectors together with the low and high sequence vectors are derived in units of categories by the LBG method using all the sample vectors of the low and high sequence vectors which are obtained in steps S61 to S65. In step S67, the low sequence vector quantization code data and the high sequence vector quantization code data are integrated by the integrated vector quantization described with reference to FIG. 38 to obtain 1024 integrated vector quantization code data. Therefore, the reproduction vectors are obtained of this embodiment by steps S61 to S67.

In the above embodiment, the Hadamard transformation is used as a means for analyzing the frequency, but is not limited thereto. Other orthogonal transformation techniques such as cosine transformation and K-L transformation may be used.

According to this embodiment as has been described above, the correlation of the image is utilized to distribute the image into categories, and band division is adaptively performed. Therefore, high-resolution vector coding of an image having a high frequency is performed, while coding having a large number of gray level scales of an image having a low frequency is performed.

Unlike in the conventional technique, generation of reproduction vectors, the generation frequency of which is concentrated on a given image pattern, can be prevented.

The capacity of the LUT in a hardware arrangement, and hardware can be facilitated.

As has been described above, in order to improve coding efficiency of the image and prevent an increase in size of the coding apparatus, image blocks are classified into categories and are coded in units of categories.

Large hardware is, however, required in orthogonal transformation for category distribution, and the block size for orthogonal transformation is undesirably limited.

If orthogonal transformation is performed in a small block (e.g., a block having 4×4 pixels), features of the image, i.e., features such as a dot image, a line image, and a continuous tone or halftone image can hardly be distributed or classified, and great degradation may occur by vector quantization. Even if an orthogonal transformation region is increased and image distribution and vector quantization are respectively performed in units of features and in units of blocks, the number of vector quantization data is abundant to fail to solve the above problem.

An image information coding scheme capable of improving precision of category distribution of a dot image, a line image and a continuous tone or halftone image and hence improving vector quantization efficiency will be described below.

According to this scheme, improper coding caused by feature extractions only in units of blocks can be solved. At the same time, overload of hardware for orthogonal transformation and vector quantization can be reduced.

A ninth embodiment of the present invention will be described with reference to the accompanying drawings.

Figure 40:
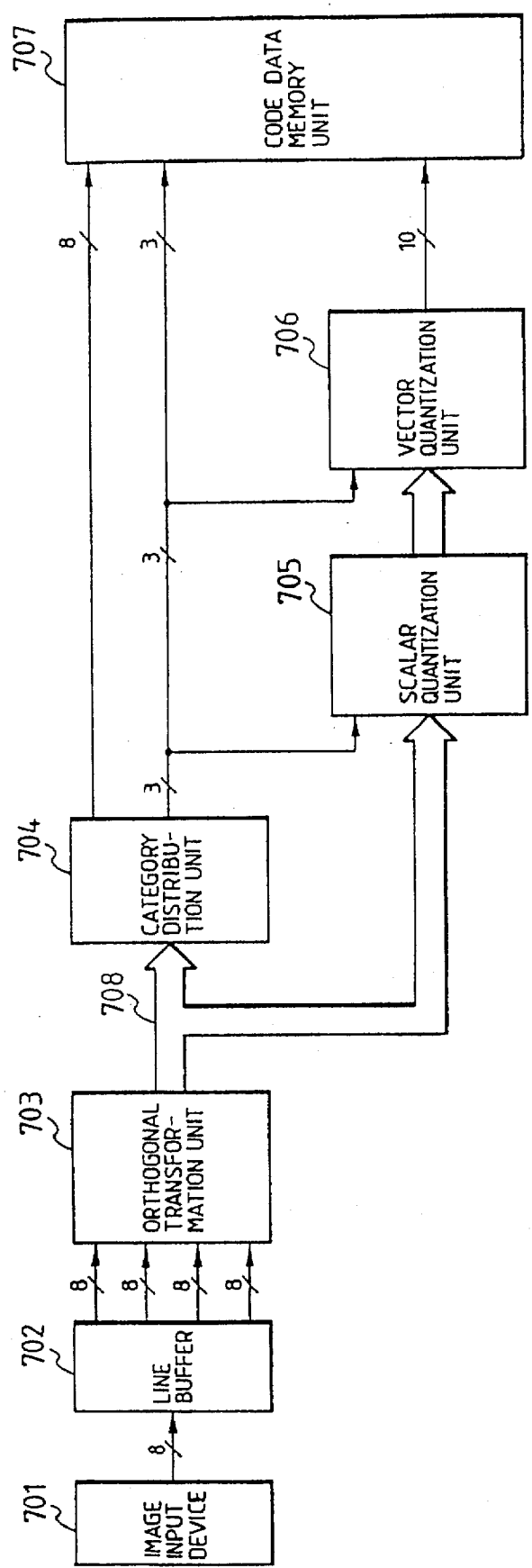
FIG. 40 is a block diagram of an image processing apparatus employing an image coding scheme according to a ninth embodiment.

An arrangement of an image information processing apparatus for realizing an image coding scheme of the ninth embodiment is shown in FIG. 40. In this image processing apparatus, an image input device 701 receives 8-bit pixel data by raster scanning at a resolution of 16 pixels/mm. A line buffer 702 receives the 8-bit pixel data train and outputs 4-line parallel data to be orthogonally transformed in units of blocks each consisting of 4×4 pixels. The orthogonal transformation unit 703 performs a 4×4 Hadamard transformation to transform the 4×4 pixel data into an orthogonal transformation region.

Figures 41A, 41B, 42:
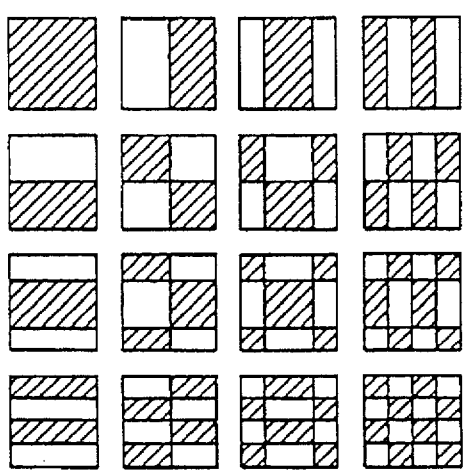
FIGS. 41A and 41B are views for explaining the principle of orthogonal transformation.
FIG. 42 is a matrix showing sequence components.

FIGS. 41A and 41B are views showing the principle of the orthogonal transformation (Hadamard transformation in this embodiment). FIG. 42 shows sequence components. The principle of the orthogonal transformation of this embodiment will be described with reference to FIGS. 41A, 41B, and 42. In this embodiment, each block is divided into 4×4 pixels.

Referring to FIG. 41A, a noticed block is given as X, the immediately preceding block is given as C, a block of the immediately previous line at the same position as the noticed block X is given as B, and the immediately preceding block on the immediately preceding line is given as A. Image densities $X_1, \ldots, X_{16}$ of the noticed block X are represented by 8-bit signals, respectively.

4×4 pixel data $X_1, X_2, \ldots, X_{16}$ in FIG. 41A are Hadamard-transformed to obtain sequence components $Y_{11}$, $Y_{12}, \ldots, Y_{44}$ in FIG. 41B. In this embodiment, the sequence components $Y_{11}$ to $Y_{44}$ are transformed into 10-bit sequence components. In this case, Walsh-Hadamard transformation is performed. The elements $Y_{11}$ to $Y_{44}$ serve as sequence components at positions corresponding to those in FIG. 42. The sequence components $Y_{11}$ to $Y_{16}$ transformed by the orthogonal transformation unit 703 are output to a category distribution unit 704 and a scalar quantization unit 705 through signal lines 708.

The category distribution unit 704 distributes the sequence components $Y_{11}$ to $Y_{16}$ of one Hadamard-transformed block (4×4 pixels) into eight categories in accordance with the features of the image data of this block.

The scalar quantization unit 705 performs scalar quantization unique to each category distributed by the category distribution unit 704. Assume that the elements $Y_{12}$ to $Y_{44}$ except for the direct current component (to be referred to as a DC component) $Y_{11}$ of the elements $Y_{11}$ to $Y_{44}$ of one block are given as a 15-dimensional vector Y=($Y_{12}$, $Y_{13}, \ldots, Y_{44}$). Under this assumption, each component is subjected to scalar quantization. The scalar quantization unit 705 receives eight 3-bit category distribution codes from the category distribution unit 704. The scalar-quantized vector Y=($Y_{12}, Y_{13}, \ldots, Y_{44}$) in units of blocks is vector-quantized by a vector quantization unit 706.

The vector quantization unit 706 stores 10-bit data of the sequence component of each category which is coded by a training sequence. The input sequence vector Y=($Y_{12}$, $Y_{13}, \ldots, Y_{44}$) is compared with the stored training sequence, and a vector having a smallest distortion is selected from the training sequence. In practice, the vector quantization unit 706 includes a look-up table for storing input vectors.

The vector quantization unit 706 performs processing in units of categories and receives the the vector quantization unit 706 serves as 10-bit code data which is then stored in a code data memory unit 707. At the same time, upper eight bits of the sequence component $Y_{11}$ which is not vector-quantized, i.e., the DC component, and three bits of the category distribution code are input from the category distribution unit 704 to the code data memory unit 707.

FIG. 43 shows a data format of the coded 4×4 pixel block. Eight bits from the MSB are assigned as $Y_{11}$ (mean value), the next three bits are assigned as the category distribution code, and the remaining ten bits are assigned as code data. Therefore, the coded data has a total of 21 bits. Therefore, 128-bit (=4×4 (pixels)×8 (bits)) data is compressed to 21-bit data, and the compression ratio is about 6.1.

A category distribution method of this embodiment will be described. Category distribution of this embodiment is performed by a power of a low sequence component because the powers can be concentrated on the low-frequency elements by orthogonally transforming information such an image having a high correlation value. By utilizing the powers of the low sequence components, image features such as an edge/nonedge portion are discriminated.

In this embodiment, an edge amount is defined as shown in FIG. 44 to perform category distribution. As shown in FIG. 44, an edge amount is defined as a sum of shown in FIG. 44, an edge amount is defined as a sum of absolute values of components represented by the hatched portion. If an edge amount ED exceeds a threshold value, an edge is detected. In this embodiment, two threshold levels T1 and T2 (T1<T2) are given.

$$\left. \begin{array}{l} \text{If } ED \leq T1, \text{ then flat portion} \\ \text{If } T1 < ED \leq T2, \text{ then weak edge portion} \\ \text{If } T2 < ED, \text{ then strong edge portion} \end{array} \right\} \quad (13)$$

In this case, the threshold values T1 and T2 are determined such that a flat portion of a photographic image and a background portion of a character image are defined as flat portions, a weak edge portion and a flat portion of a dot image are defined as weak edge portions, and a character portion and a strong edge of an image are defined as strong edge portions. However, it is difficult to distinguish a weak edge portion of an edge of a photograph from a flat portion of the dot image. In order to eliminate this drawback, mean values of the blocks are compared with each other, as shown in FIG. 45.

Referring to FIG. 45, $Y_{11}$ to $Y_{44}$ are values of Hadamard-transformed components of the noticed block X in the same manner as in FIG. 44. $Y_{11}$ has a value proportional to the mean value of the densities in the block.

$Y_{11a}$, $Y_{11b}$, and $Y_{11c}$ are mean values of adjacent blocks, as shown in FIG. 41A. In this embodiment, no edge is present between the blocks if the following conditions are satisfied:

$$\left.\begin{array}{ll} & |Y_{11} - Y_{11a}| \leq T_4 \\ \text{and} & |Y_{11} - Y_{11b}| \leq T4 \\ \text{and} & |Y_{11} - Y_{11c}| \leq T4 \end{array}\right\} \quad (14)$$

where T4 is a predetermined threshold value.

Figures 46, 48, 50:
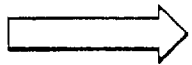
FIG. 46 is a table showing the category distribution of the image.
FIG. 48 is a view showing Hadamard transformation.
FIG. 50 is a view for explaining segmentation parameters.

If the predetermined threshold value is defined as $Y_{DEF} \leq T4$, a case wherein an edge is present between the blocks is a case wherein any one of the above conditions is not established, i.e., $Y_{DEF} > T4$. A flat portion of a high-precision dot image (e.g., 150 lines or 175 lines) is determined as an edge in the 4×4 block, but the mean values of the blocks are not greatly different from each other. Edge determination in the block and edge determination between the blocks are used to distribute images, as shown in FIG. 46. An image is determined to include a flat portion, a weak edge portion, and a strong edge portion according to hypothetical propositions (13), as shown in FIG. 46. Inequalities (14) are used to determine whether an edge is present between the blocks. The blocks can be distributed into categories (1) to (6) in FIG. 46 according to hypothetical propositions (13) and inequalities (14). Therefore, features of image portions distributed into categories (1) to (6) in FIG. 46 are defined as follows:

(1) Flat portion . . . a flat portion of a photograph, a background of a character image, and the like (2) Flat portion in block . . . flat portions adjacent to edges of a character portion and a line image (3) Dot portion . . . a flat portion of a dot image (4) Weak edge portion . . . a weak edge portion of a photograph and the like (5) Strong edge portion in block . . . a complex pattern within a character, and the like (6) Strong edge portion . . . an edge of a character and the like In this embodiment, in order to reduce vector quantization distortions of the strong edges of categories (5) and (6), these categories (5) and (6) can be distributed into subcategories. This can be achieved by a low sequence distribution method shown in FIG. 44.

In this embodiment, category distribution is performed not only by the presence/absence of the edge of the image but also by category distribution in units of features of the image. Vector quantization is performed in units of categories to perform vector quantization having minimum distortion. In category distribution in units of blocks, sequence components of the adjacent blocks are referred to, thereby obtaining information corresponding to Hadamard transformation of 8×8 pixels in this embodiment although the Hadamard transformation of 4×4 pixels is actually performed, thereby reducing hardware.

This embodiment performs detection of image features such as a dot image, a continuous tone image, and a line image, and coding in units of categories such as portions inside and outside a character, a photographic flat portion, and an edge. Therefore, coding efficiency can be improved. Furthermore, in this embodiment, although the Hadamard transformation is performed in the orthogonal transformation unit, other orthogonal transformation techniques such as a Karhunen-Loeve transformation and a Haar transformation may be used to obtain the same effect as in the above embodiment.

As described above, improper coding caused by feature extraction in units of blocks in the conventional technique can be eliminated, and coding having high coding efficiency can be realized.

By utilizing the nature wherein powers are concentrated on low-frequency components in an information source such as an image having a high correlation, the images are distributed in units of features to improve category distribution accuracy. Vector quantization is performed in units of categories, thereby providing an image information coding system having high image information coding efficiency. There is also provided an image coding system which can eliminate improper coding caused by feature extraction in units of blocks.

Furthermore, there is provided an image information coding system capable of improving distribution precision of categories such as a dot image, a line image, and a continuous tone image and hence improving vector quantization efficiency.

Furthermore, there is provided an image information coding system capable of solving improper coding caused by feature extraction only in units of blocks and reducing load of orthogonal transformation and vector quantization hardware.

An image information coding method capable of effectively coding multivalue data including a document image, a dot image or a photographic image without causing great degradation will be described below.

Figure 47:
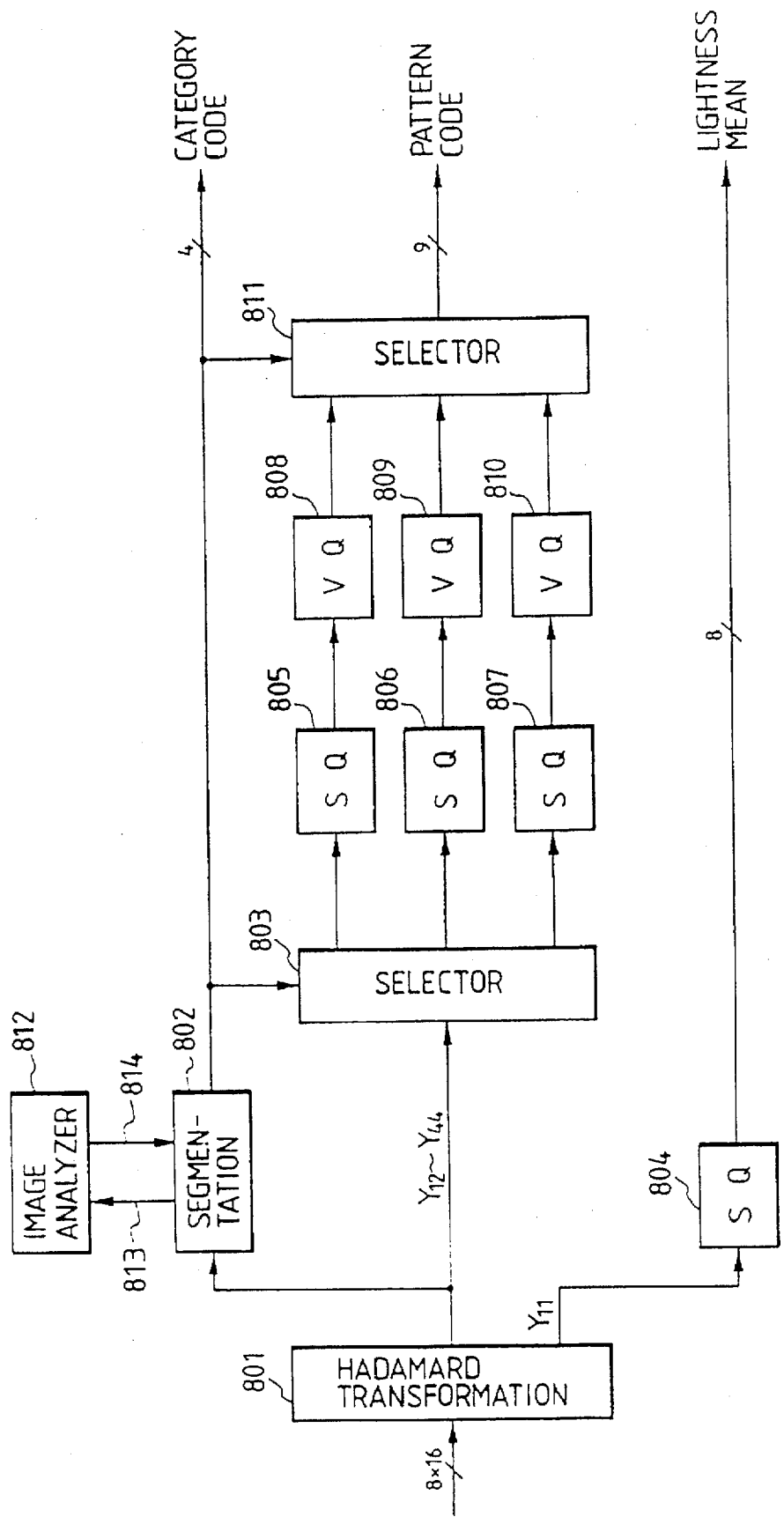
FIG. 47 is a block diagram showing an image information coding apparatus for realizing an image coding scheme according to a tenth embodiment of the present invention.

FIG. 47 is a block diagram of an image information coding apparatus for realizing the above image coding method according to a tenth embodiment of the present invention.

The image information coding apparatus includes an Hadamard transformation unit 801 for performing an Hadamard transformation, a segmentation section 802 for performing category distribution of an image into categories to be described in detail later, and a selector 803 for selecting one quantizer corresponding to the category in response to an output from the segmentation section 802. A scalar quantization unit (SQ) 804 outputs a lightness mean value. Scalar quantization units (SQs) 805, 806, and 807 perform scalar quantization suitable for categories. Vector quantization units (VQs) 808, 809, and 810 perform vector quantization suitable for categories. A selector 811 selects one of the outputs from the category vector quantizers in response to an output from the segmentation section 802. The selected output corresponds to the block subjected to processing. The function of the selector 811 is the same as that of the selector 803.

An image analyzer 812 performs image analysis by preliminary scanning performed prior to image coding, so that types of image to be coded can be classified as follows:

1. Dot image

2. Character image

3. Photographic image (continuous tone image)

Preliminary scanning is the same operation as actual coding. However, during preliminary scanning, the generation frequency of the categories distributed by the segmentation section 802 is measured by the image analyzer 812 through singal lines 813, and the type of image is determined. Subsequent operations after the selector 803 are not performed. During actual coding, the types of image (three types) determined by the image analyzer 812 in preliminary scanning are output to the segmentation unit 802 through signal lines 814 of 2 bits, thereby feeding back the category distribution.

The above operation will be described in more detail. An image is cut out into blocks each having 4×4 pixels each consisting of 8 bits. The pixel data of one block are given as X ($X_{11}$ to $X_{44}$) shown in FIG. 48. The pixel data of one block are Hadamard-transformed into data Y ($y_{11}$ to $y_{44}$) in FIG.

48. Data $Y_{11}$ represents a value falling within the range of 0 to 1020. The data $Y_{11}$ can be represented by 10-bit data. Data $Y_{12}$ to $Y_{44}$ can represent −510 to +510 and can be represented by 10-bit data.

The data $Y_{11}$ is quantized into 8-bit data by the scalar quantization unit 804, and this data represents a lightness mean value in the block. The data $Y_{12}$ to $Y_{44}$ are distributed by the segmentation section 802 into several categories according to the magnitudes of the coefficients and the features of the initial image.

The selectors 803 and 811 select scalar and vector quantization units corresponding to the category and output the selected data as 9-bit codes (pattern codes).

The Hadamard transformation, segmentation, scalar quantization, and vector quantization will be described below.

FIG. 48 shows an Hadamard transformation of 4×4 pixels. A signal X represents data before the transformation, while a signal Y represents data after the transformation. This transformation is represented as follows:

$$Y = (1/16)^{1/2} H_{16} \cdot X$$

where $H_{16}$ is a 16-dimensional Hadamard matrix.
If $$X = \begin{pmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{pmatrix}$$

$$= [X_{11}, X_{12}, X_{13}, X_{14}, X_{21}, X_{22}, \ldots, X_{43}, X_{44}]^T$$

$$Y = \begin{pmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{pmatrix}$$

$$= [Y_{11}, Y_{12}, Y_{13}, Y_{14}, Y_{21}, Y_{22}, \ldots, Y_{43}, Y_{44}]^T$$

then

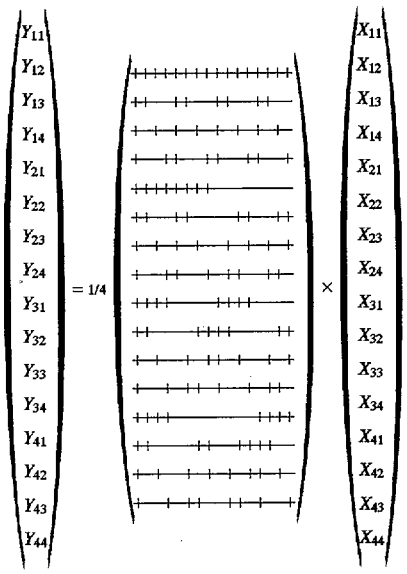

Figure 49I:
FIGS. 49A to 49P are views showing Hadamard transformation outputs.
Figure 49J:
Figure 49K:
Figure 49L:

FIGS. 49A to 49P show detailed operations of the Hadamard transformation. If a vertical edge is present in a block, as shown in FIG. 49A, the coefficient $Y_{12}$ (i.e., $y_{12}$ in FIG. 48) represents a large value. The code has a negative value when the left half coefficients are "0s" and the right half coefficients are "255s" on the basis of a gradient of the lightness of X. The code has a positive value when the left half coefficients are "255s" and the right half coefficients are "0s" on the basis of the above gradient. It should be noted that the coefficient $Y_{11}$ (i.e., $y_{11}$ in FIG. 48) will not be further described here because it represents the lightness mean value.

Similarly, FIG. 49B shows a case wherein a horizontal edge is present in a block. The coefficient $Y_{21}$ ($y_{21}$ in FIG. 48) represents a large value. FIGS. 49C to 49P represent other patterns such as a vertical line, a horizontal line, a hook-like pattern, a slant edge, a slant line, and the like.

FIG. 50 shows segmentation parameters. These parameters are determined on the basis of pattern features shown in FIGS. 49A to 49P. A parameter UFE is a vertical edge component parameter; ULE, a vertical line component parameter; HEE, a horizontal edge component parameter; HLE, a horizontal line component parameter; OTH, a component parameter of a slant edge or the like; and EF, a parameter representing the edge density. If the parameter EF is large, a strong edge is present in the block. Similarly, a parameter LF represents a line segment thickness.

Figure 51:
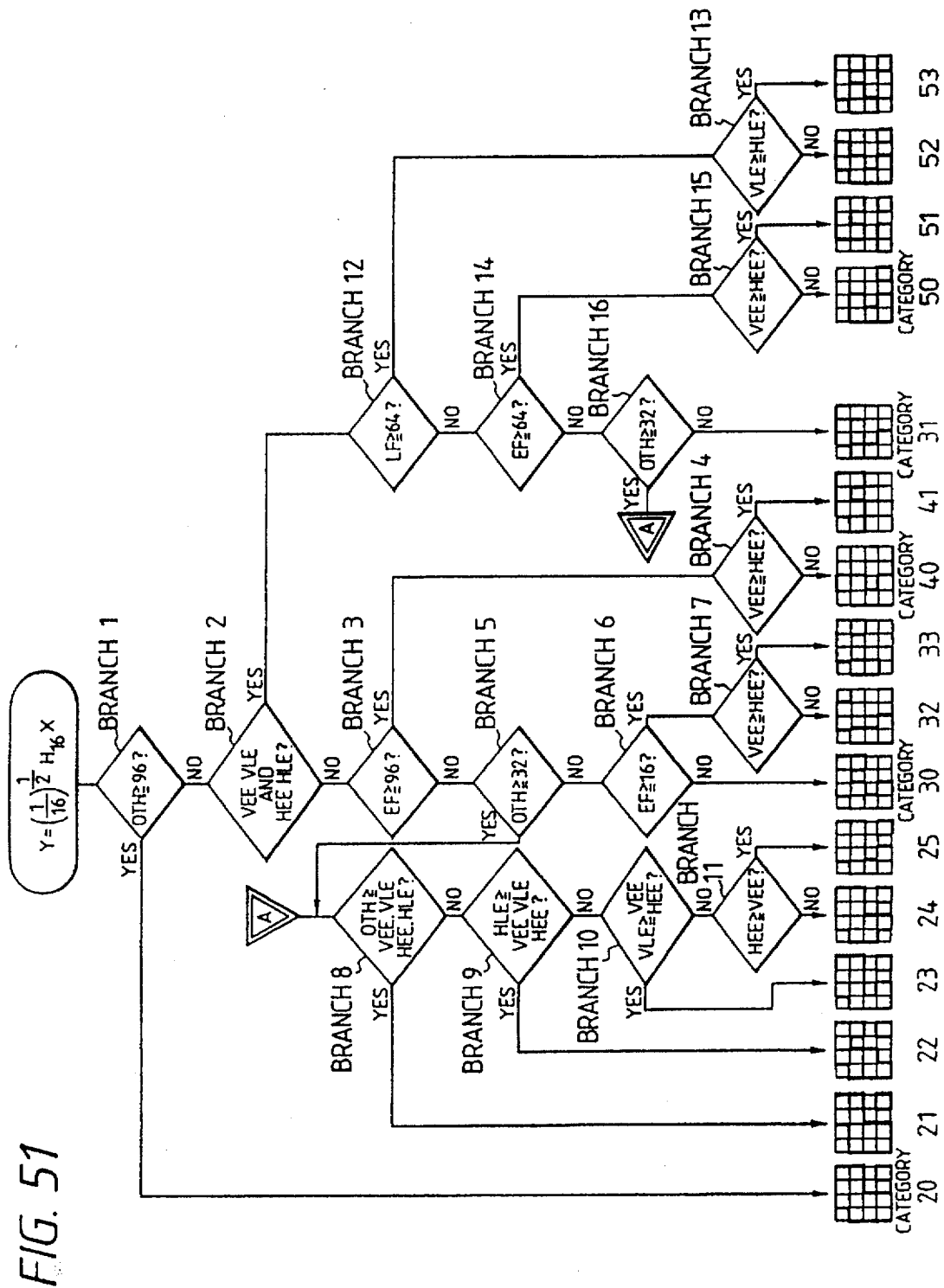
FIG. 51 is flow chart showing segmentation.

FIG. 51 is a flow chart for distributing data into 16 categories. Each branch and each category has the following meanings, which is called segmentation.

| | |
|---|---|
| Category 20: | Slant edge, line |
| 21: | Slant edge, line + complex pattern |
| 22: | Horizontal edge + complex pattern |
| 23: | Vertical edge + complex pattern |
| 24: | Horizontal line + complex pattern |
| 25: | Vertical line + complex pattern |
| Category 30: | Monotonous flat portion |
| 31: | Almost flat |
| 32: | Horizontal edge with a small gradation difference |
| 33: | Vertical edge with a small gradation difference |
| Category 40: | Horizontal edge with a large gradation difference |
| 41: | Vertical edge with a large gradation difference |
| Category 50: | Horizontal edge type pattern with a large gradation difference |
| 51: | Vertical edge type pattern with a large gradation difference |
| 52: | Horizontal line type pattern with a large gradation difference |
| 53: | Vertical line type pattern with a large gradation difference |

The branches in FIG. 51 have the following meanings.

| | |
|---|---|
| (Branch 1) | Separation of a strong slant line (a large OTH) |
| (Branch 2) | Separation between the edge type patterns (large VEE and HEE) and the line type patterns (large VLE and HLE) |
| (Branch 3) | Extraction of the strong horizontal edge pattern (a large EF) |
| (Branch 4) | Separation between the vertical edge (a large VEE) and the horizontal edge (a large HEE) |
| (Branch 5) | Extraction of the complex pattern (a large OTH) including the slant edge |
| (Branch 6) | Separation between the weak vertical and horizontal patterns (a large EF) and the flat portion |
| (Branch 7) | Separation between the vertical edge (a large VEE) and the horizontal edge (a large FEE) |

| | |
|---|---|
| (Branch 8) | Extraction of a pattern having a large OTH from complex patterns |
| (Branch 9) | Extraction of a pattern having a large HLE from complex patterns |
| (Branch 10) | Extraction of a pattern having a large BLE from complex patterns |
| (Branch 11) | Extraction of a pattern having a large HEE from complex patterns |
| (Branch 12) | Extraction of the strong vertical and horizontal line patterns (a large LF) |
| (Branch 13) | Separation between the vertical line pattern (a large VLE) and the horizontal line pattern (a large HLE) |
| (Branch 14) | Extraction of a pattern having an edge component (a relatively large EF) from line patterns separated in branch 2 |
| (Branch 15) | Separation between the vertical edge (a large VEE) and the horizontal edge (a large HEE) |
| (Branch 16) | Separation between the complex pattern (a large OTH) including a slant edge and the flat portion |

Figure 52:
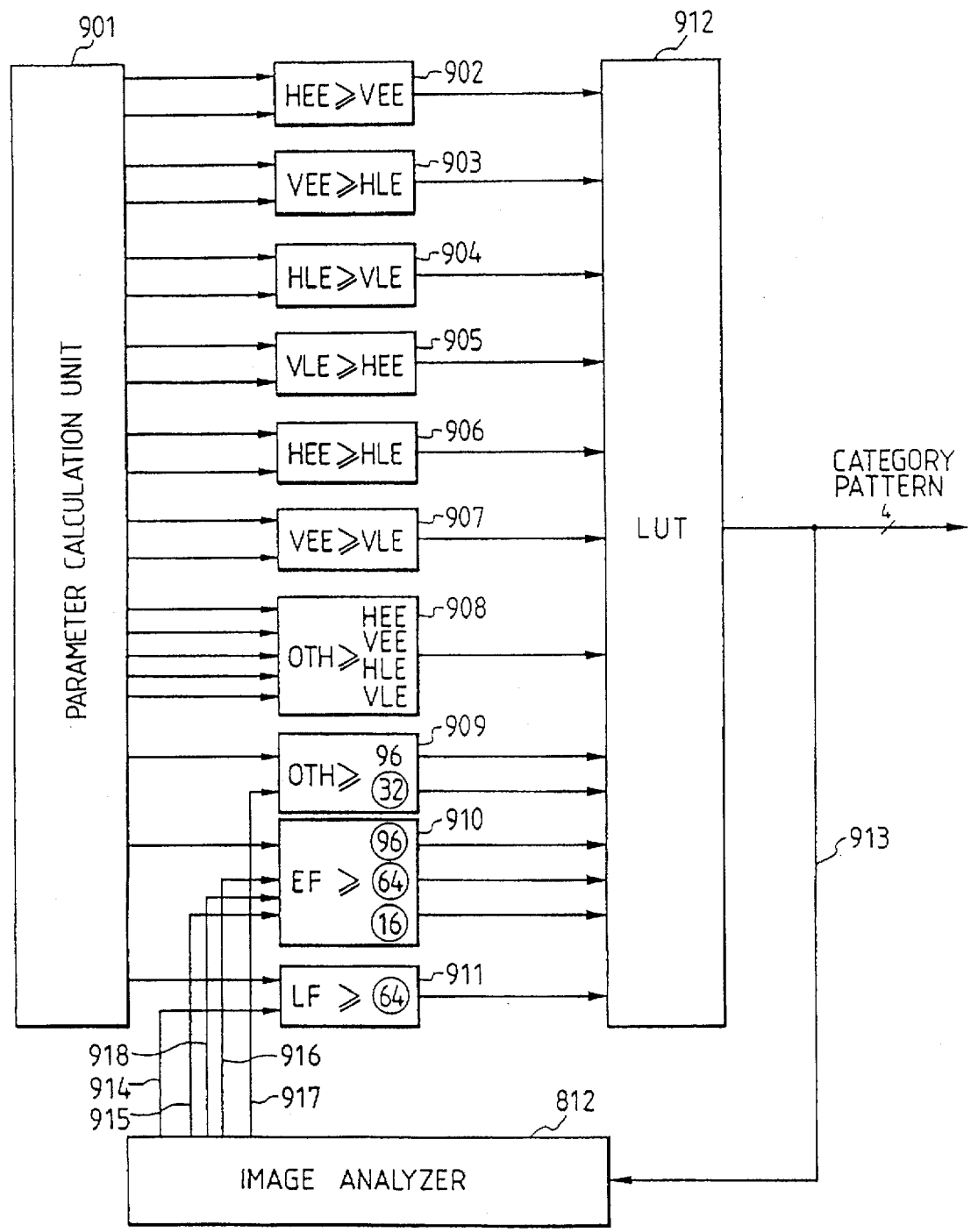
FIG. 52 is a block diagram showing arrangements of a segmentation section and an image analyzer.

A hardware block diagram for realizing an algorithm for category distribution shown in FIG. 51 is shown in FIG. 52. This hardware includes a parameter calculation unit 901 for calculating the parameters shown in FIG. 50, comparators 902 to 911 for determining the branches 1 to 16 shown in FIG. 51, and a look-up table (to be referred to as an LUT hereinafter) 912 for generating 16 4-bit category patterns according to the branch data.

The category is determined in accordance with the image information, as previously described. Categories of the dot images tend to be concentrated on the categories 21 to 25. Categories of the continuous tone images such as a photograph tend to be concentrated on the categories 30 to 33. A category of the background portions of the character images tends to be concentrated on the category 30, and categories of the character portions tend to be concentrated on the categories 40, 41, and 50 to 53.

When only small areas in the block of, e.g., a dot image are categorized, they are distributed as edge or line areas. When this category distribution is utilized, a dot is edge-emphasized to result in a coarse reproduction image. Therefore, in the case of a dot image, the categories 30 to 33 are mainly used and coding as in a photograph is performed to reduce image quality degradation.

The category patterns stored in the LUT 912 are supplied to the image analyzer 812 through signal lines 913 and the generation frequencies of the categories are calculated in the image analyzer 812. If the categories 21 to 25 are detected as ones which are frequently used, an image of interest is determined as a dot image, thereby reducing the branches for the categories 21 to 25 and increasing the branches for the categories 30 to 33. In practice, a comparison value "32" is increased in the branches 5 and 16 to correct branching into the categories.

Referring to FIG. 52, during image coding, the comparison value 32 of the the comparator 909, i.e., OTH≧32 is changed by the image analyzer 812 through signal lines 917. For example, an output of "64" is output to change the comparison into "OTH≧64". In the case of a photographic image, the categories 31 to 33 must be increased. For this purpose, the comparison is changed into "OTH≧96" in the branches 5 and 16. In this case, this output is supplied from the image analyzer 812 through the signal lines 917.

In the case of a character image, the category 30 must be mainly selected for the background portions, the categories 40, 41, and 50 to 53 must be mainly selected for the character portions. For this purpose, the comparison "EF≧96" is changed into a comparison "EF≧64" in the branch 3, the comparion "EF≧16" is changed into a comparion "EF≧32" in the branch 6, the comparison "LF≧64" is changed into a comparison "LF≧32" in the branch 13, and the comparison "EF≧64" into a comparison "EF≧32" in the branch 14. In this manner, the comparion data of the comparators are changed to achieve the proper correction.

Figure 53:
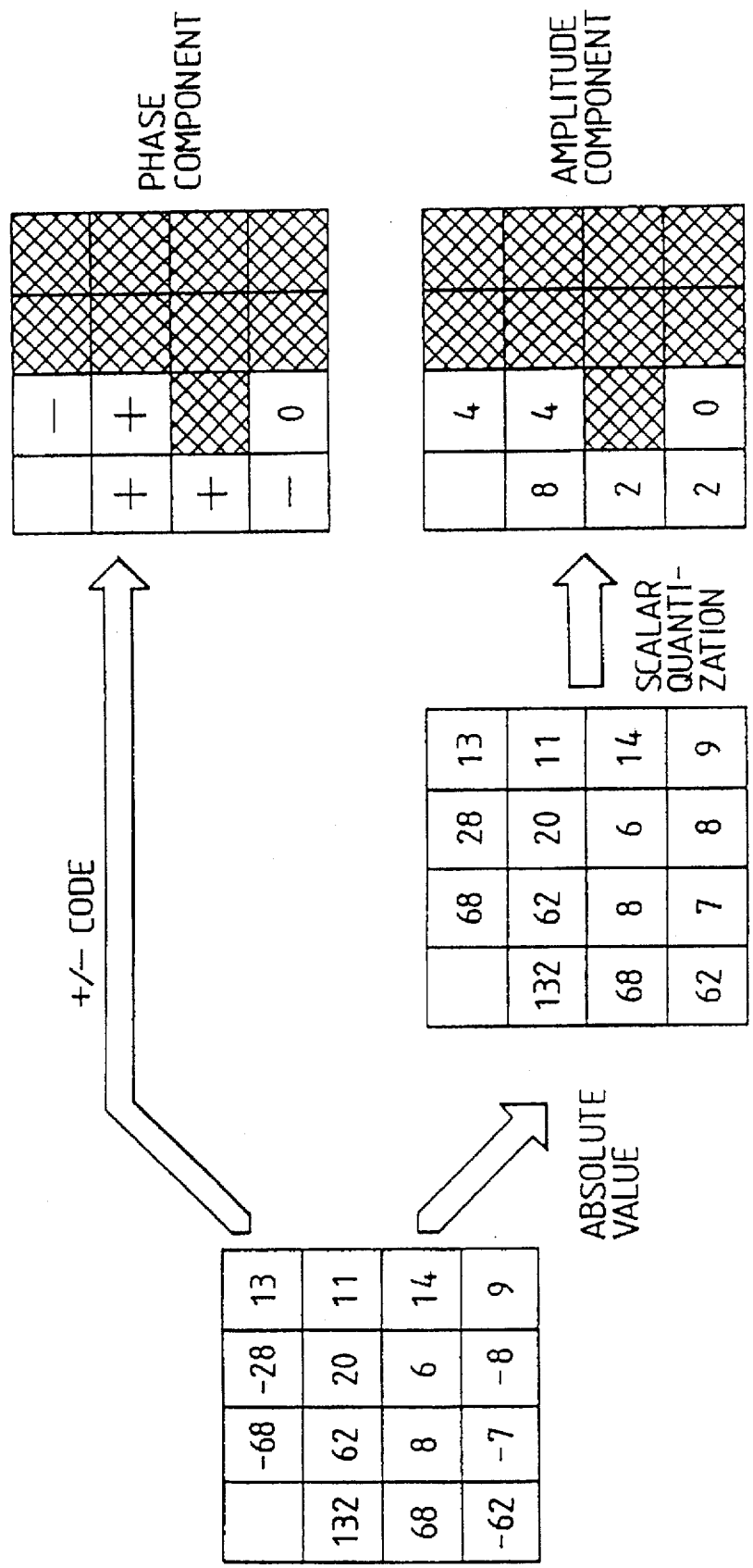
FIG. 53 is a flow for explaining separation of input data into a phase component and an amplitude component.

FIG. 53 is a schematic view for explaining quantization. One pattern of the category 40 is exemplified in FIG. 53. The +/− codes (i.e., signs) and absolute values of the coefficients except for the coefficient $Y_{11}$ are separated from the patterns distributed by segmentation, and the resultant patterns are respectively called "phase components" and "amplitude components". Each amplitude component of the coefficient is weighted to perform nonlinear scalar quantization. The crosshatched coefficients in FIG. 53 are neglected, and numeric values in squares are round-off results.

FIGS. 54A to 54P show nonlinear scalar quantization results of the sixteen categories. The hatched coefficients are neglected in the same manner as described above, and numeric values are the numbers of bits assigned to the respective coefficients.

Figure 55:
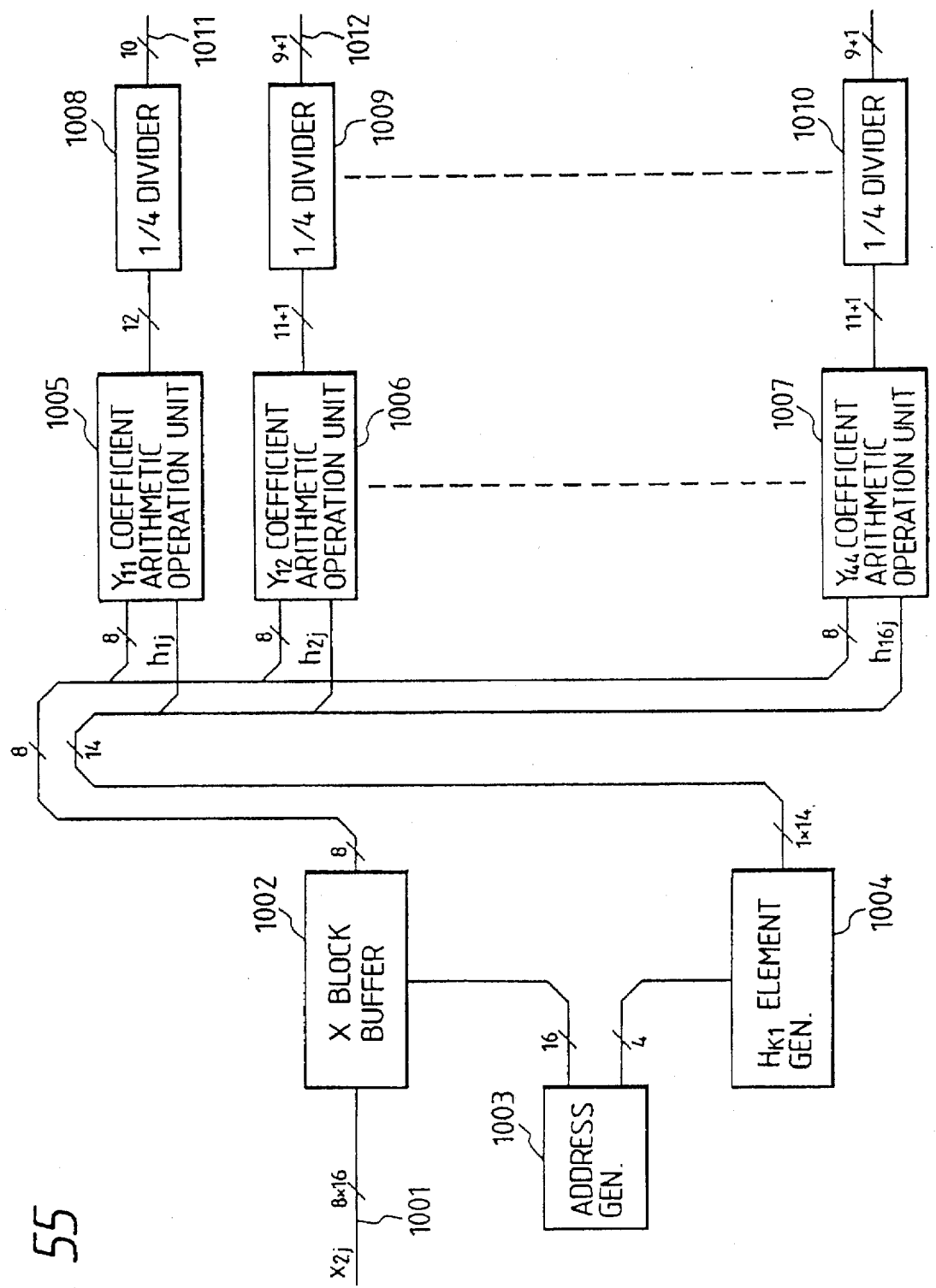
FIG. 55 is a block diagram of Hadamard transformation hardware.

FIG. 55 is a block diagram for realizing the Hadamard transformation. All the coefficients are subjected to parallel processing so as to achieve high-speed processing. This hardware arrangement includes data input lines 1001 which receive 16 8-bit data, a block buffer 1002 of 16 (=4×4) latches, and an address generator 1003 for designating a pixel in the X block buffer 1002 and an element of an $H_{kl}$ element generator 1004. That is, the address generator 1003 designates $h_{kl}$ and $x_{ij}$ in the Hadamard transformation calculation as follows:

$$Y = \tfrac{1}{4} \times H_{16} X (4\times4 \text{ block size})$$

The $H_{kl}$ element generator 1004 generates the coefficient $h_{ij}$ and comprises a ROM (Read-Only Memory). The $H_{kl}$ element generator 1004 generates 16 parallel outputs $h_{11}$, $h_{21}$, $h_{31}$, ... $h_{161}$. 4-bit ROM address singal from the address generator is input to the $H_{kl}$ element generator 1004, and the address l is updated from 1 to 16. In the above equation, i, j=1 to 4, and l=1 to 16.

A $Y_{11}$ coefficient arithmetic operation unit 1005 calculates the coefficient $Y_{11}$ of the Y matrix and comprises an adder, as has been apparent from the calculation equation described above. Coefficient arithmetic operation units 1006 and 1007 are used to calculate the coefficients except for the coefficient $Y_{11}$. Each of ¼ dividers 1008, 1009, and 1010 performs truncation of lower two bits. The ¼ dividers 1008, 1009, and 1010 generate calculation results 1011, 1012, and 1013, respectively. The coefficient $Y_{11}$ is 10-bit data representing a positive value, and each of other coefficients generates a flag bit representing a +/− code and a 9-bit complementary number.

This circuit performs parallel processing of the 16 coefficients, as described above. The calculation contents are shown in the equation. That is, data is read out from the block buffer 1002 pixel by pixel and is subjected to an addition or subtraction in accordance with the +/− code output from the $H_{kl}$ element generator 1004.

In this embodiment, the Hadamard transformation is used to facilitate the arithmetic operations and hardware. However, other orthogonal transformation techniques (e.g., a discrete COS transformation or a slant transformation) belonging to the Hadamard transformation techniques may be used and the same concept as described above can be applied thereto.

In this embodiment, five parameters, i.e., VEE, VLE, HEE, HLE, and OTH, are used in segmentation. If a method is employed to perform category distribution on the basis of a vertical edge, a horizontal edge, vertical and horizontal lines, a slant edge, and the like, this method can be replaced with the one in this embodiment. For example, VEE=($Y_{12}$), VLE=($Y_{14}$), HEE=($Y_{21}$), HLE=($Y_{41}$), and OTH=($Y_{22}$).

In the above embodiment, both scalar quantization and vector quantization are used as quantization techniques. However, the quantization techniques are not limited to these techniques. Either scalar quantization or vector quantization may be used. Furthermore, in the above embodiment, a technique for separating the input data into the "phase component" and the "amplitude component" is used, but the present invention is not limited thereto.

In the above embodiment, preliminary scanning of the image is performed to discriminate the dot image, the photographic image, and the character image by utilizing the features of the images. The results are fed back to category distribution during image coding. However, the following embodiment may be proposed.

Figure 56:
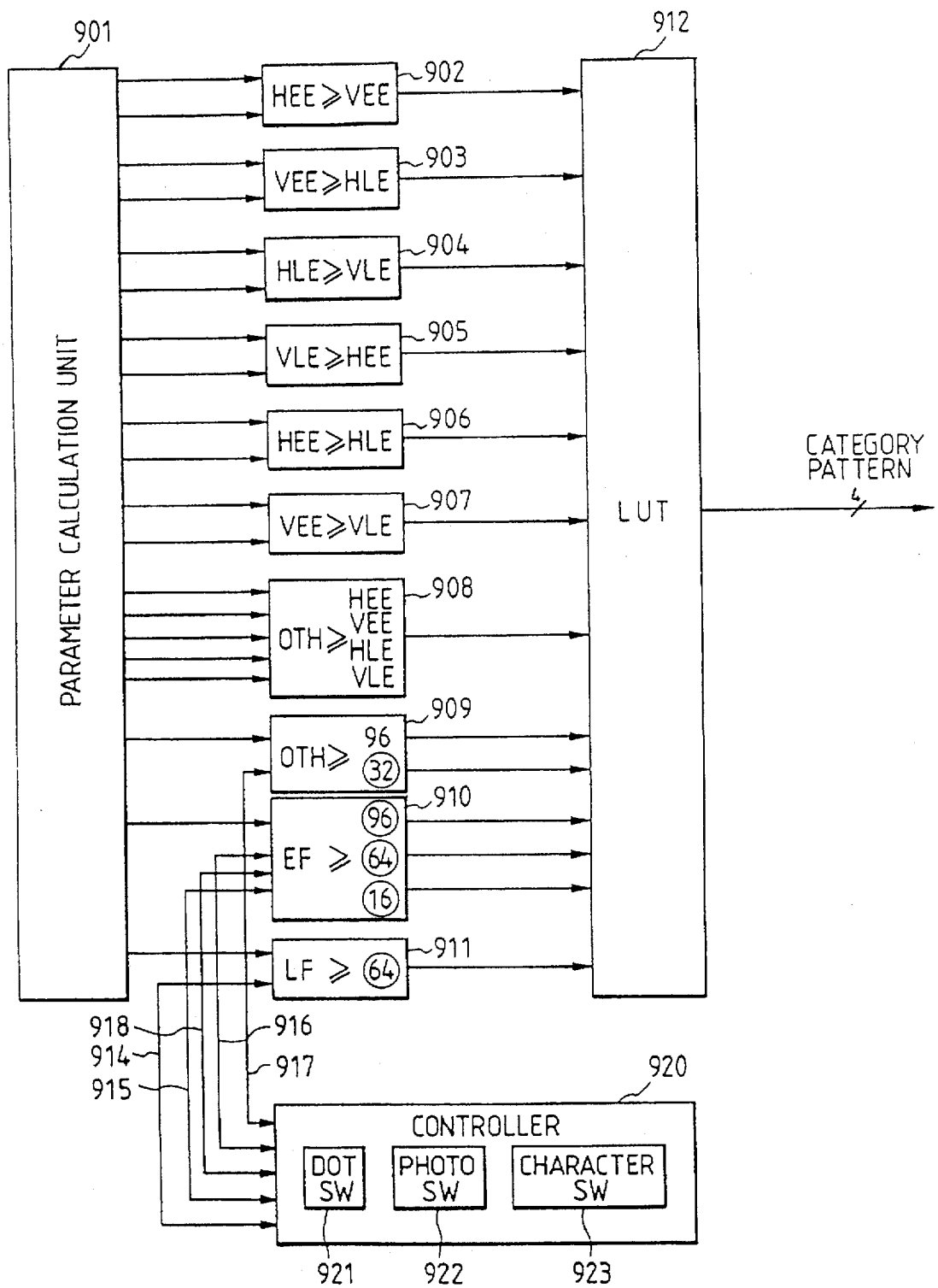
FIG. 56 is a block diagram showing other arrangements of the segmentation section and the image analyzer.

If a user intends to designate the type of image, preliminary scanning need not be performed. In this case, comparisons in the segmentation unit are manually performed. For this purpose, the segmentation unit is arranged, as shown in FIG. 56. Referring to FIG. 56, the segmentation unit includes a controller 920 which includes manual switches 921, 922, and 923 for designating a dot image (DOT), a photograph (PHOTO), and a character image (CH). Outputs are generated by the controller 921 through signal lines 914 to 918 in the same manner as in FIG. 52 to achieve the same effect as in FIG. 52. The circuit elements (901 to 912) in FIG. 56 are identical to those in FIG. 52.

As described above, in this embodiment, preliminary scanning is performed prior to coding. Category distribution of the image is then performed to measure the generation frequencies of the categories, thereby determining the type of image. At the time of coding, the measurement results are fed back to the category distribution information. Image quality degradation by improper coding caused by coding in units of small blocks can be eliminated. The category distribution is performed using scalar quantization and vector quantization, thereby preventing extreme degradation of edge shapes in the blocks.

According to this embodiment, there is provided an image information coding apparatus capable of performing efficient coding of the multivalue data including a document image, a dot image or a photographic image without causing extreme degradation of image quality.

The image category distribution of blocks for efficient image coding can be applied to other image processing operations in addition to coding.

In recent years, facsimile systems have been very popular, and along the developments of high-precision printers such as laser printers, strong demand has arisen for image communication or output processing of images including characters and photographs such as newspapers and catalogs in addition to line images such as character and graphic images. In order to answer such needs, binary processing of the image is generally performed.

A dither method is conventionally used to produce binary data of an image including a halftone image portion, thereby expressing the halftone image. However, the gradation expression of the dither method has the following disadvantages.

(a) Moiré occurs between dots and a dither matrix when a dot original is processed, thereby greatly degrading image quality.

(b) Each character is cut into pieces to degrade image quality.

Figures 63, 64:
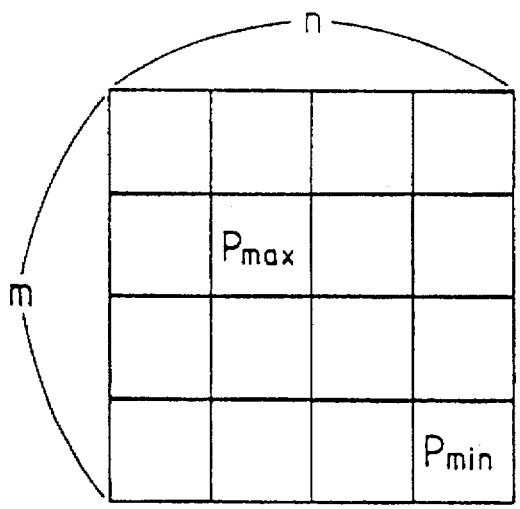
FIG. 63 is a table for explaining the image distribution of the eleventh embodiment.
FIG. 64 is a matrix for explaining detection of the edge amount by a difference between the maximum and minimum density values in the block.

In order to solve the above problems, an image is separated into a halftone portion and a character and line image portion. The former image portion is subjected to dither processing, and the latter image portion is subjected to binary processing using a permanent threshold value. For example, as shown in FIG. 64, a component having a maximum density is given as Pmax and a component having a minimum density is given as Pmin in an m×n block.

If Pmax−Pmin>T, then edge portion→binary processing using the permanent value

If Pmax−Pmin≦T, then flat portion→binary processing by the dither method

Although the disadvantage (b) can be eliminated by the above technique, the disadvantage (a) cannot be improved. In order to eliminate the disadvantage (a), if a flat portion is detected, smoothing and then dither processing may be performed. However, the flat portion of the dot image tends to be detected as an edge portion due to its high-frequency component. Therefore, a dot portion results in a coarse image due to binary processing using the permanent threshold value.

If a condition for detecting a dot flat portion as a flat portion is given, the edge of the character portion tends to be detected as a flat portion. Therefore, the disadvantage (b) cannot be eliminated.

An image processing apparatus will be described in which a halftone image can be properly expressed without degrading edges of various types of image such as a document image, a dot image, and a photographic image.

In this apparatus, moiré occurring between the dots of the dot portion and the dither matrix can be eliminated by smoothing, and the edge portion of the character can be emphasized to obtain a high-quality image.

An eleventh embodiment of the present invention will be described with reference to the accompanying drawings.

Figure 57:
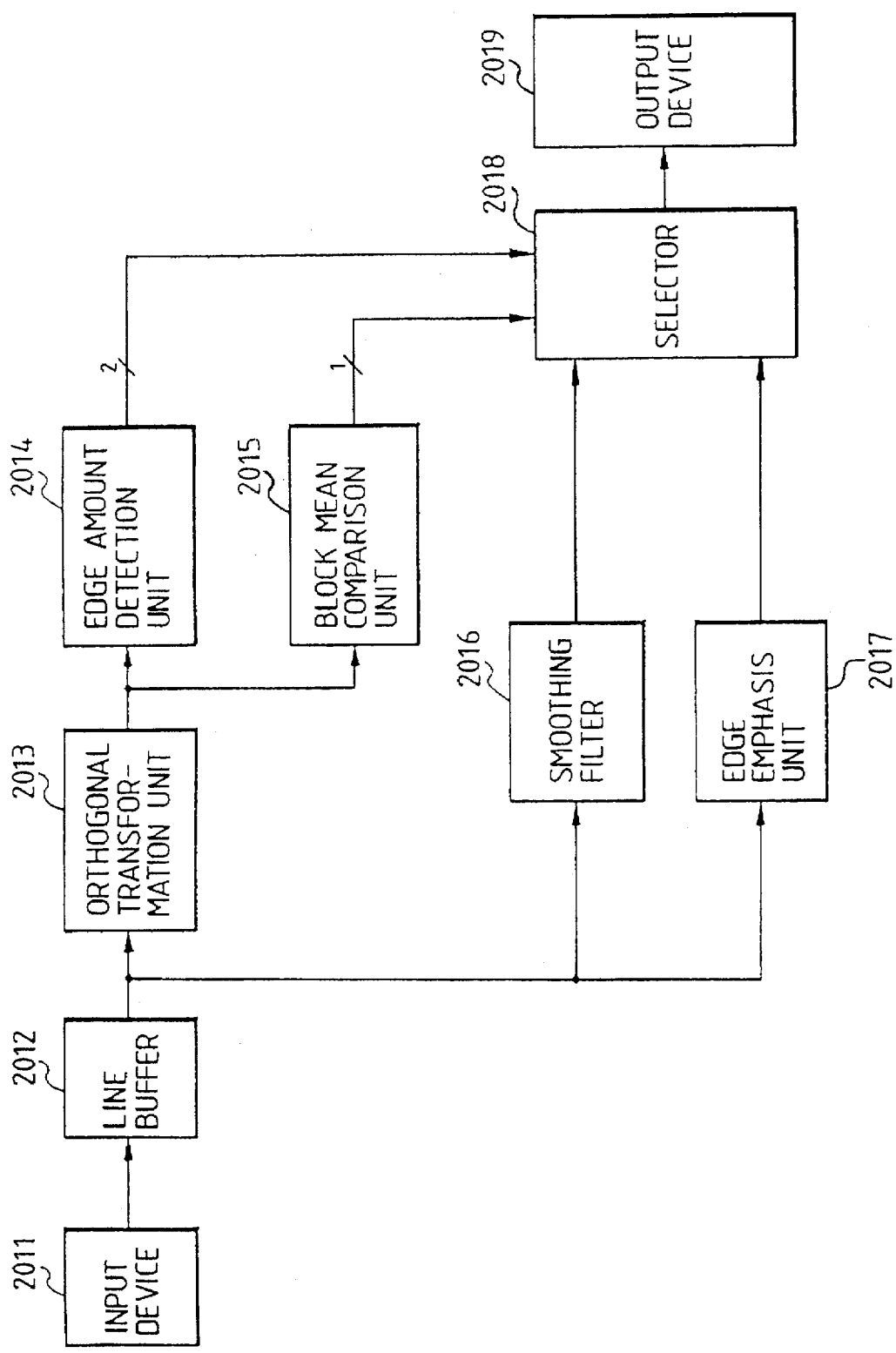
FIG. 57 is a block diagram of an image processing apparatus according to an eleventh embodiment.

FIG. 57 is a block diagram of an image information processing apparatus according to the eleventh embodiment of the present invention. An image signal is input to a line buffer 2012 from an image input device 2011 and is input to an orthogonal transformation unit 2013. The orthogonal transformation unit 2013 performs the orthogonal transformation of a noticed block consisting of 4×4 pixels. The transformed signal is input to an edge amount detection unit 2014, so that an edge amount in the block is detected. Meanwhile, the signal from the line buffer 2012 is input to a block mean comparison unit 2015, so that correlation of the noticed block and adjacent blocks is determined. In this case, the block mean comparison unit incorporates a memory (not shown) for storing a mean value of the block of the previous line and the mean value of the previous block. A detection result from the edge amount detection unit 2014 is output as a 2-bit signal. A detection result of the block mean comparison unit 2015 is output as a 1-bit signal. These signals are input to a selector 2018 so that one of the signals is selected.

The image data is stored in the line buffer 2012, and is then smoothed by a smoothing filter 2016. At the same time, the data from the line buffer 2012 is edge-emphasized by an edge emphasis unit 2017. Two types of image data are input to the selector 2018. One of the image data is selected by the selector 2018 in accordance with one of the outputs from the edge amount detection unit 2014 and the block mean comparison unit 2015. The selected image data is output from an output device 2019.

Transformation processing in the orthogonal transformation unit 2013 will be described. In this embodiment, each block is divided into 4×4 pixels and the Hadamard transformation is performed.

FIG. 58 shows a division into a 4×4 block in this embodiment. FIGS. 59A and 59B are views showing the principle of the orthogonal transformation (the Hadamard transformation in this embodiment). FIG. 60 is a view showing sequence components. The principle of the orthogonal transformation in this embodiment will be described with reference to FIGS. 59A and 59B and 60.

Referring to FIG. 58, a noticed block is given as X, the immediately preceding block is given as C, the block of the immediately preceding line at the same position as that of the noticed block X is given as B, and the immediately preceding block of the immediately preceding line is given as A. $P_1, \ldots P_{16}$ are 8-bit data representing densities of the noticed block X;

The 4×4 pixel data $P_1, P_2, \ldots P_{16}$ in FIG. 59A are Hadamard-transformed to obtain sequence components $Y_{11}$, $Y_{12}, \ldots Y_{44}$ in FIG. 59B. In this embodiment, the sequence components $Y_{11}$ to $Y_{44}$ are transformed into 10-bit data. In the above transformation, an Hadamard-Walsh transformation is performed, and $Y_{11}$ to $Y_{44}$ are the sequence components at corresponding positions of FIG. 60. The sequence components $Y_{11}$ to $Y_{16}$ of the Hadamard-transformed block (4×4 pixels) are used to detect an edge amount of image data of one block.

The orthogonal transformation of information such as an image having a high correlation is performed to concentrate powers on low-frequency components. The image features such as an edge portion and a nonedge portion can be distributed in accordance with the magnitude of powers of low sequence components.

A method of detecting the edge amount by the edge amount detection unit 2014 will be described in detail below. In this embodiment, the edge amount is defined, as shown in FIG. 61. As shown in FIG. 61, the edge amount is defined as a sum of absolute values of the hatches components. If an edge amount ED exceeds a given threshold value, the block is detected to include an edge portion. In this embodiment, two threshold values T1 and T2 (T1<T2) are given.

If ED≦T1, then flat portion

If T1<ED≦T2, then weak edge portion . . . (16)

If T2<ED, then strong edge portion

In this case, the threshold values T1 and T2 are determined such that the flat portion of the photographic image and the background portion of the character image are detected as the flat portions, the weak edge or the flat portion of the dot is detected as a weak edge portion, and the character portion and the strong edge portion of the graphic image are detected as the strong edge portions. However, the weak edge such as the edge of the photograph cannot be easily discriminated from the flat portion of the dot.

Mean values between the blocks are compared by the block mean comparison unit 2015, as shown in FIG. 62. Referring to FIG. 62, $Y_{11}$ to $Y_{44}$ are values of the Hadamard-transformed components of the noticed block X as in FIG. 61. $Y_{11}$ is a value proportional to the mean value of the densities in the block.

$Y_{11a}$, $Y_{11b}$, and $Y_{11c}$ are mean values of adjacent blocks, as shown in FIG. 58. In this embodiment, no edge is present between the blocks if the following conditions are satisfied:

$|Y_{11} - Y_{11a}| \leq T_4$ (17)

-continued and
$|Y_{11} - Y_{11b}| \leq T4$
and
$|Y_{11} - Y_{11c}| \leq T4$ where T4 is a predetermined threshold value.

If the predetermined threshold value is defined as $Y_{DEF} \leq T4$, a case wherein an edge is present between the blocks is a case wherein any one of the above conditions is not established, i.e., $Y_{DEF} > T4$. A flat portion of a high-precision dot image (e.g., 150 lines or 175 lines) is determined as an edge in the 4×4 block, but the mean values of the blocks are not greatly different from each other. Edge determination in the block and edge determination between the blocks are used to distribute images, as shown in FIG. 63. An image is determined to include a flat portion, a weak edge portion, and a strong edge portion according to hypothetical propositions (16). Inequalities (17) are used to determine whether an edge is present between the blocks. The blocks can be distributed into categories (1) to (6) in FIG. 63 according to hypothetical propositions (16) and inequalities (17). Therefore, features of image portions distributed into categories (1) to (6) are defined as follows:

(1) Flat portion . . . a flat portion of a photograph, a background of a character image, and the like (2) Flat portion in block . . . flat portions adjacent to edges of a character portion and a line image (3) Dot portion . . . a flat portion of a dot image (4) Weak edge portion . . . a weak edge portion of a photograph and the like (5) Strong edge portion in block . . . a complex pattern within a character, and the like (6) Strong edge portion . . . an edge of a character and the like In the categories, the categories (1), (2), and (3) are regarded to represent flat portions, and the categories (4), (5), and (6) are regarded to represent edge portions. In particular, if the dot flat portion of the category (3) is regarded as an edge portion, moiré occurs and a coarse image is formed. In this embodiment, in the categories (1), (2), and (3) representing the flat portions, smoothed outputs from the smoothing filter 2016 are selected to prevent degradation of characters and thin lines. Similarly, in the categories (4), (5), and (6) representing the edge portion, edge emphasis outputs from the edge emphasis unit 2017 are selected to prevent the above-mentioned degradation. At the same time, the moiré effect by dots can be suppressed to improve image quality.

In this embodiment, a distribution shown in FIG. 63 is obtained as a result of determination by hypothetical propositions (16) and inequalities (17). Smoothing or edge emphasis is performed in accordance with the distribution, and the following problems are solved:

(a) Moiré occurs between the dots and the dither matrix for the dot image, and image quality is greatly degraded.

(b) Each character is divided by the dither method, and character image quality is degraded.

In the above embodiment, the Hadamard transformation is performed in detection of an edge portion. However, as shown in FIG. 64 and hypothetical propositions (15), a difference between the maximum density and the minimum density in the block may be utilized. In this case, in FIG. 57, the Hadamard transformation is not performed in the Hadamard transformation unit 2013, but hypothetical propositions (15) are judged by the edge amount detection unit 2014. The block mean comparison unit 2015 must calculate a mean value of the blocks. The same operations as in FIG. 57 can thus be performed. In addition, the edge amount is not limited to the definition of this embodiment. The edge amount detection unit may be replaced with a unit for detecting any other edge amount such as a Laplacian edge.

According to this embodiment, as has been described above, degradation of characters and thin lines can be prevented while image quality of a halftone image can be improved. At the same time, moiré of the dot image which has never been solved by any conventional techniques can be suppressed.

According to this embodiment, there is provided an image information processing apparatus capable of expressing a halftone image without causing degradation of edges of various types of image such as a document image, a dot image, and a photographic image.

The moiré occurring between the dots of the dot portion and the dither matrix can be eliminated by smoothing, and at the same time, the edge portion of the character is emphasized to provide a high-quality image.

The present invention has been exemplified by the preferred embodiments but is not limited thereto. Various changes and modifications may be made within the spirit and scope of the appended claims.

What is claimed is:

1. An image processing apparatus comprising:

input means for inputting image data;

dividing means for dividing the image data into predetermined blocks;

transforming means for performing orthogonal transformation on the image data and generating vector data of a predetermined number of dimensions for each block;

separating means for separating the vector data into a plurality of bands based on a spatial frequency of the vector data, each of said plurality of bands including a plurality of dimensions;

scalar quantizing means for performing scalar quantization on the vector data for each block; and encoding means for encoding the vector data of each band independently, wherein said scalar quantizing means quantizes the vector data such that a number of bits per dimension of quantized vector data in a low frequency band is larger than that in a high frequency band and wherein a number of bits per dimension of quantized low frequency vector data in a band is larger than that of quantized high frequency vector data in the band.

2. An apparatus according to claim 1, wherein said dividing means divides the image data into n×n blocks.

3. An apparatus according to claim 1, wherein said transforming means performs Hadamard transformation.

4. An apparatus according to claim 1, wherein said encoding means extracts average information in each block and encodes the average information independently.

5. An apparatus according to claim 1, wherein said encoding means extracts a plurality of values in each block and encodes them together.

6. An image processing method comprising the steps of:

input step of inputting image data;

dividing step of dividing the image data into predetermined blocks;

transforming step of performing orthogonal transformation on the image data and generating vector data of a predetermined number of dimensions for each block;

separating step of generating the vector data into a plurality of bands based on a spatial frequency of the vector data, each Of said plurality of bands including a plurality of dimensions;

scalar quantizing step of performing scalar quantization on the vector data for each block; and encoding step of encoding the vector data of each band independently, wherein the vector data is quantized in said scalar quantizing step such that a number of bits per dimension of quantized vector data in a low frequency band is larger than that in a high frequency band and wherein a number of bits per dimensions of quantized low frequency vector data in a band is larger than that of quantized high frequency vector data in the band.

7. A method according to claim 6, wherein in said dividing step the image data is divided into n×n blocks.

8. A method according to claim 6, wherein in said transforming step Hadamard transformation is performed.

9. A method according to claim 6, wherein in said encoding step average information is extracted in each block and it is encoded independently.

10. A method according to claim 6, wherein in said encoding step a plurality of zero values are extracted in each block and they are encoded together.

* * * * *

UNITED STATES PATENT AND TRADEMARK OFFICE
CERTIFICATE OF CORRECTION

PATENT NO. : 5,721,791

DATED : February 24, 1998

INVENTOR(S) : MITSURU MAEDA, et el.

It is certified that error appears in the above-identified patent and that said Letters Patent is hereby corrected as shown below:

COLUMN 24:

Line 3, "T1<ED≤T2," should read --If T1<ED≤T2,--.
Line 25, "|VD|⁻|HE|>E1" should read --|VE|⁻|HE|>E1--.

COLUMN 34:

Line 52, "of" should read --of the--.

COLUMN 36:

Line 31, "image" should read --images--.

COLUMN 37:

Line 18, "X;" should read --X.--.
Line 44, "portion...(16)" should read --portion ...(16)--.

Signed and Sealed this

Twelfth Day of January, 1999

Attest:

*Attesting Officer*   *Acting Commissioner of Patents and Trademarks*